US008521488B2

(12) United States Patent
Kirby et al.

(10) Patent No.: US 8,521,488 B2
(45) Date of Patent: *Aug. 27, 2013

(54) NONLINEAR FUNCTION APPROXIMATION OVER HIGH-DIMENSIONAL DOMAINS

(75) Inventors: Michael J. Kirby, Fort Collins, CO (US); Arthur A. Jamshidi, Plainsboro, NJ (US)

(73) Assignee: National Science Foundation, Arlington, VA (US)

( * ) Notice: Subject to any disclaimer, the term of this patent is extended or adjusted under 35 U.S.C. 154(b) by 132 days.

This patent is subject to a terminal disclaimer.

(21) Appl. No.: 13/134,597

(22) Filed: Jun. 10, 2011

(65) Prior Publication Data
US 2011/0257950 A1 Oct. 20, 2011

Related U.S. Application Data

(63) Continuation of application No. 11/899,625, filed on Sep. 25, 2007, now Pat. No. 8,046,200.

(60) Provisional application No. 60/969,903, filed on Sep. 4, 2007, provisional application No. 60/842,401, filed on Sep. 5, 2006.

(51) Int. Cl.
G06F 17/10 (2006.01)
(52) U.S. Cl.
USPC .................................. 703/2; 702/183; 714/47
(58) Field of Classification Search
USPC ................................................................. 703/2
See application file for complete search history.

(56) References Cited

U.S. PATENT DOCUMENTS

| | | | |
|---|---|---|---|
| 4,752,957 A | 6/1988 | Maeda | |
| 5,223,207 A | 6/1993 | Gross et al. | |
| 5,377,306 A | 12/1994 | Broomhead et al. | |
| 5,453,940 A | 9/1995 | Broomhead et al. | |
| 5,475,793 A | 12/1995 | Broomhead et al. | |
| 5,493,516 A | 2/1996 | Broomhead et al. | |
| 5,566,002 A | 10/1996 | Shikakura | |
| 5,586,066 A | 12/1996 | White et al. | |

(Continued)

FOREIGN PATENT DOCUMENTS
WO WO 02/095534 11/2002

OTHER PUBLICATIONS

"Estimation of the Mean and the Autocovariance Function," Time series: Theory and Methods, 1991, pp. 218-237.

(Continued)

Primary Examiner — Mary C Jacob
(74) Attorney, Agent, or Firm — Sheridan Ross PC

(57) ABSTRACT

An algorithm is disclosed for constructing nonlinear models from high-dimensional scattered data. The algorithm progresses iteratively adding a new basis function at each step to refine the model. The placement of the basis functions is driven by a statistical hypothesis test that reveals geometric structure when it fails. At each step the added function is fit to data contained in a spatio-temporally defined local region to determine the parameters, in particular, the scale of the local model. The proposed method requires no ad hoc parameters. Thus, the number of basis functions required for an accurate fit is determined automatically by the algorithm. The approach may be applied to problems including modeling data on manifolds and the prediction of financial time-series. The algorithm is presented in the context of radial basis functions but in principle can be employed with other methods for function approximation such as multi-layer perceptrons.

20 Claims, 31 Drawing Sheets
(3 of 31 Drawing Sheet(s) Filed in Color)

(a) The first RBF in relation with the training data set.

(b) The second RBF in relation with the training data set.

(56) References Cited

U.S. PATENT DOCUMENTS

| | | |
|---|---|---|
| 5,629,872 A | 5/1997 | Gross et al. |
| 5,667,837 A | 9/1997 | Broomhead et al. |
| 5,731,989 A | 3/1998 | Tenny et al. |
| 5,745,382 A | 4/1998 | Vilim et al. |
| 5,761,090 A | 6/1998 | Gross et al. |
| 5,764,509 A | 6/1998 | Gross et al. |
| 5,835,682 A | 11/1998 | Broomhead et al. |
| 5,842,194 A | 11/1998 | Arbuckle |
| 5,845,123 A | 12/1998 | Johnson et al. |
| 6,118,549 A | 9/2000 | Katougi et al. |
| 6,119,111 A | 9/2000 | Gross et al. |
| 6,131,076 A | 10/2000 | Stephan et al. |
| RE37,488 E | 12/2001 | Broomhead et al. |
| 6,466,685 B1 | 10/2002 | Fukui et al. |
| 6,493,465 B2 | 12/2002 | Mori et al. |
| 6,625,569 B2 | 9/2003 | James et al. |
| 6,636,628 B1 | 10/2003 | Wang et al. |
| 6,636,862 B2 | 10/2003 | Lundahl et al. |
| 6,751,348 B2 | 6/2004 | Buzuloiu et al. |
| 6,754,675 B2 | 6/2004 | Abdel-Mottaleb et al. |
| 6,758,574 B1 | 7/2004 | Roberts |
| 6,775,417 B2 | 8/2004 | Hong et al. |
| 6,798,539 B1 | 9/2004 | Wang et al. |
| 6,873,730 B2 | 3/2005 | Chen |
| 6,996,257 B2 | 2/2006 | Wang |
| 7,023,577 B2 | 4/2006 | Watanabe et al. |
| 7,068,838 B2 | 6/2006 | Manbeck et al. |
| 7,080,290 B2 | 7/2006 | James et al. |
| 7,142,697 B2 | 11/2006 | Huang et al. |
| 7,224,835 B2 | 5/2007 | Maeda et al. |
| 7,262,881 B2 | 8/2007 | Livens et al. |
| 7,917,540 B2 | 3/2011 | Kirby et al. |
| 7,921,146 B2 | 4/2011 | Qiao et al. |
| 2002/0010691 A1 | 1/2002 | Chen |
| 2002/0140985 A1 | 10/2002 | Hudson |
| 2002/0191034 A1 | 12/2002 | Sowizral et al. |
| 2003/0065409 A1 | 4/2003 | Raeth et al. |
| 2004/0130546 A1 | 7/2004 | Porikli |
| 2008/0175446 A1 | 7/2008 | Kirby et al. |
| 2009/0043547 A1 | 2/2009 | Kirby et al. |

OTHER PUBLICATIONS

Ahmed et al., "Adaptive RBF Neural Network in Signal Detection," In 1994 IEEE International Symposium on Circuits and Systems, ISCAS, vol. 6, pp. 265-268, May-Jun. 1994.
Aiyar et al., "Minimal Resource Allocation Network for Call Admission control (CAC) of ATM Networks," IEEE, 2000, p. 498.
Akaike "A New Look at the Statistical Model Identificaiton," IEEE Transactions on Automatic Control, Dec. 1974, vol. AC-19, No. 6, pp. 716-723.
Allasia "Approximating Potential Integrals by Cardinal Basis Interpolants on Multivariate Scattered Data," Computers and Mathematics with Applications 43 (2002), pp. 275-287.
Anderle "Modeling Geometric Structure in Noisy Data," Dissertation for Colorado State University, Summer 2001, 117 pages.
Anderle et al., "Correlation Feedback Resource Allocation RBF," IEEE, 2001, pp. 1949-1953.
Andrieu et al., "Robust Full Bayesian Learning for Radial Basis Networks," Neural Computation, 2001, vol. 13, pp. 2359-2407.
Arakawa et al., "Optimum Design Using Radial Basis Function Networks by Adaptive Range Genetic Algorithms," IEEE 2000, pp. 1219-1224.
Arandjelovic et al., "Face Recognition from Video using the Generic Shape-Illumination Manifold," Department of Engineering, University of Cambridge, Cambridge, UK, 2006, 15 pages.
Arellano-Valle et al., "On fundamental skew distributions," Journal of Multivariate Analysis, 2005, vol. 96, pp. 93-116.
Arnold et al., "The skew-Cauchy distribution," Statistics & Probability Letters, 2000, vol. 49, pp. 285-290.
Azam et al., "An Alternate Radial Basis Function Neural Network Model," In 2000 IEEE International Conference on Systems, Man, and Cybernetics, vol. 4, pp. 2679-2684, Oct. 8-11, 2000.

Azzalini "Further Results on a Class of Distributions which Includes the Normal Ones," Statistica, 1986, anno XLVI, No. 2, pp. 199-208.
Azzalini "Statistical applications of the multivariate skew normal distribution," J. R. Statist. Soc. B, 1999, vol. 61, Part 3, pp. 579-602.
Azzalini et al., "A Class of Distributions which Includes the Normal Ones," Scand J Statist, 1985, vol. 12, pp. 171-178.
Azzalini et al., "Distributions generated by perturbation of symmetry with emphasis on a multivariate skew t distribution," Journal of Royal Statistical Society, 65(B) :367-389, 2003.
Azzalini et al., "The Multivariate Skew-Normal Distribution," Biometrika, Dec. 1996, vol. 83, No. 4, pp. 715-726.
Balakrishnan et al., "An Operator Splitting-Radial Basis Function method for the Solution of Transient Nonlinear Poisson Problems," Computers and Mathematics with Applications 43 (2002), pp. 289-304.
Ball et al., "Eigenvalues of Euclidean Distance Matrices," Journal of Approximation Theory, 1992, vol. 68, pp. 74-82.
Ball et al., "On the Sensitivity of Radial Basis Interpolation to Minimal Data Separation Distance," Constr. Approx., 1992, vol. 8, pp. 401-426.
Barden et al., An Introduction to Differential Manifolds, Imperial College Press, 2003, pp. 1-41.
Barnett et al., "Zero-Crossing Rates of Functions of Gaussian Processes," IEEE Transactions on Information Theory, Jul. 1991, vol. 37, No. 4, pp. 1188-1194.
Barnett et al., "Zero-Crossing Rates of Mixtures and Products of Gaussian Processes," IEEE Transactions on Information Theory, Jul. 1998, vol. 44, No. 4, pp. 1672-1677.
Baxter et al., "Preconditioned Conjugate Gradients, Radial Basis Functions, and Toeplitz Matrices," Computers and Mathematics with Applications 43 (2002), pp. 305-318.
Behboodian et al., "A new class of skew-Cauchy distributions," Statistics & Probability Letters, 2006, vol. 76, pp. 1488-1493.
Behrens et al., "Grid-Free Adaptive Semi-Lagrangian Advection Using Radial Basis Functions," Computers and Mathematics with Applications 43 (2002), pp. 319-327.
Belytschko et al., "Stability Analysis of Particle Methods with Corrected Derivatives," Computers and Mathematics with Applications 43 (2002), pp. 329-350.
Bishop, "Radial Basis Functions," Neural Networks for Pattern Recognition, Oxford University Press, Oxford, U.K., 1995, pp. 164-193.
Blachman, "Zero-Crossing Rate for the Sum of Two Sinusoids or a Signal Plus Noise," IEEE Transactions on Information Theory, Nov. 1975, pp. 671-675.
Bozzini et al., "Interpolation by basis functions of different scales and shapes," Calcolo, 2004, vol. 41, pp. 77-87.
Branco et al., "A General Class of Multivariate Skew-Elliptical Distributions," Journal of Multivariate Analysis, 2001, vol. 79, pp. 99-113.
Brand, "Charting a manifold," Oct. 2002, 8 pages.
Brand, "Continuous nonlinear dimensionality reduction by kernel eigenmaps," MERL, Apr. 2003, 8 pages.
Brass et al., "Hybrid Monte Carlo Simulations Theory and Initial Comparison with Molecular Dynamics," Biopolymers, 1993, vol. 33, No. 8, pp. 1307-1315.
Brockwell et al., "Multivariate Time Series," Time series: Theory and Methods, Springer Series in Statistics. Springer, second edition, 1991, pp. 401-462.
Broomhead et al., "A New Approach to Dimensionality Reduction: Theory and Algorithms," SIAM J. Appl. Math., 2000, vol. 60(6), pp. 2114-2142.
Broomhead et al., "Dimensionality Reduction Using Secant-based Projection Methods: The Induced Dynamics in Projected Systems," Kluwer Academic Publishers, Apr. 24, 2004, 21 pages.
Broomhead et al., "Dimensionality Reduction Using Secant-based Projection Methods: The Induced Dynamics in Projected Systems," Nonlinear Dynamics, 2005, vol. 41, pp. 47-67.
Broomhead et al., "Multivariable Functional Interpolation and Adaptive Networks," Complex Systems, 1988, vol. 2, pp. 321-355.
Broomhead et al., "The Whitney Reduction Network: A Method for Computing Autoassociative Graphs," Neural Computation, 2001, vol. 13, pp. 2595-2616.

Buhmann et al., "A New Class of Radial Basis Functions with Compact Support," Mathematics of Computation, Mar. 16, 2000, vol. 70, No. 233, pp. 307-318.

Buhmann, "Radial Basis Functions on Scattered Data," Radial Basis Functions; Theory and Implementations, 2003, pp. 99-146.

Buntine et al., "Bayesian Back-Propagation," Complex Systems, 1991, vol. 5, pp. 603-643.

Cha et al., "Nonlinear Color Image Restoration Using Extended Radial Basis Function Networks," IEEE, 1996, pp. 3402-3405.

Chan et al., "Numerical Computations for Singular Semilinear Elliptic Boundary Value Problems," Computers and Mathematics with Applications 43 (2002), pp. 351-358.

Chang et al., "Illumination Face Spaces Are Idiosyncratic," Colorado State University, Departments of Computer Science and Mathematics, Ft. Collins, Colorado, 2008, 7 pages.

Chen et al., "A Meshless, Integration-Free, and Boundary-Only RBF Technique," Computers and Mathematics with Applications, 2002, vol. 43, pp. 379-391.

Chen et al., "Multilevel Compact Radial Functions Based Computational Schemes for Some Elliptic Problems," Computers and Mathematics with Applications, 2002, vol. 43, pp. 359-378.

Cun et al., "Optimal brain damage," In D. S. Touretzky, editor, Advances in Neural Information Processing Systems, 1990, vol. 2, pp. 598-605.

Dodu et al., "Vectorial Interpolation Using Radial-Basis-Like Functions," Computers and Mathematics with Applications 43 (2002), pp. 393-411.

Driscoll et al., "Interpolation in the Limit of Increasingly Flat Radial Basis Functions," Computers and Mathematics with Applications 43 (2002), pp. 413.

Einstein, "Method for the Determination of the Statistical Values of Observations Concerning Quantities Subject to Irregular Fluctuations," IEEE ASSP Magazine, Oct. 1987, p. 6, originally published in Archive des Science Physiques et Naturelles, 1914, vol. 37, pp. 254-256.

Erfanian et al., "EEG Signals Can Be Used to Detect the Voluntary Hand Movements by Using an Enhanced Resource-allocating Neural Network," 2001 Proceedings of the 23rd Annual EMBS International Conference, Oct. 25-28, Istanbul, Turkey, pp. 721-724.

Fahlman et al., "The Cascade-Correlation Learning Architecture," Carnegie Mellon University, Aug. 29, 1991, 14 pages.

Fahlman et al., "The Cascade-Correlation Learning Architecture," in Advances in Neural Information Processing Systems 2, D. S. Touretzky (ed.), Morgan-Kaufmann, Los Altos CA, 1990, pp. 524-532.

Fahlman, Scott E., "An Empirical Study of Learning Speed in Back-Propagation Networks," Technical Report CMU-CS-88-162, Computer Science Department, Carnegie Mellon University, Pittsburgh, PA, 1988.

Fasshauer, "Newton Interation with Multiquadrics for the Solution of Nonlinear PDEs," Computers and Mathematics with Applications 43 (2002), pp. 423-438.

Fedoseyev et al., "Improved Multiquadric method for Elliptic Partial Differential Equations via PDE Collocation on the Boundary," Computers and Mathematics with Applications, 2002, vol. 43, pp. 439-455.

Fisher, "Iterative Optimization and Simplification of Hierarchical Clusterings," Journal of Artificial Intelligence Research, 1996, vol. 4, pp. 147-179, http://arxiv.org/PS_cache/cs/pdf/9604/9604103v1.pdf.

Florez et al., "DRM Multidomain Mass Conservative Interpolation Approach for the BEM Solution of the Two-Dimensional Navier-Stokes Equations," Computers and Mathematics with Applications 43 (2002), pp. 457-472.

Fornberg et al., "A new class of oscillatory radial basis functions," Computers and Mathematics with Applications, 2006, vol. 51, pp. 1209-1222.

Fornberg et al., "Observations on the Behavior of Radial Basis Function Approximations Near Boundaries," Computers and Mathematics with Applications, 2002, vol. 43, pp. 473-490.

Fraser et al., "Classification Modulo Invariance, with Application to Face Recognition," Journal of Computational and Graphical Statistics, 2003, 19 pages.

Frean et al., "The Upstart Algorithm: A Method for Constructing and Training Feedforward Neural Networks," Neural Computation, 1990, vol. 2, pp. 198-209.

Fritzke "Fast learning with incremental RBF Networks," Neural Processing Letters, 1994, vol. 1, No. 1, pp. 1-5.

Fritzke, Supervised Learning with Growing Cell Structures. In G. Tesauro J. Cowan and J. Alspector, editors, Advances in Neural Information Processing Systems, vol. 6, pp. 255-262. Morgan Kaufmann, San Mateo, CA, 1994.

Galperin et al., "Application of Global Optimization and Radial Basis Functions to Numerical Solutions of Weakly Singular volterra Integral Equations," Computers and Mathematics with Applications 43 (2002), pp. 491-499.

Gardner, "Introduction to Einstein's Contribution to Time-series Analysis," IEEE ASSP Magazine, Oct. 1987, pp. 4-5.

Gates, "A New Harmonic Analyser," Jun. 17, 1932, pp. 380-386.

Georghiades et al., "From Few to Many: Generative Models for Recognition Under Variable Pose and Illumination," Departments of Electrical Engineering and Computer Science, Yale University, New Haven, Connecticut, and Beckman Institute, University of Illinois, Urbana, Illinois, 2000, 8 pages.

Girosi et al., "Regularization Theory and Neural Networks Architectures," Neural Computation, 1995, vol. 7, pp. 219-269.

Green, "Reversible jump Markov chain Monte Carlo computation and Bayesian model determination," Biometrika, 1995, vol. 82, No. 4, pp. 711-732.

Gross et al., "Fisher Light-Fields for Face Recognition Across Pose and Illumination," The Robotics Institute, Carnegie Mellon University, Pittsburgh, PA, 2002, 8 pages.

Gupta et al., "A multivariate skew normal distribution," Journal of Multivariate Analysis, 2004, vol. 89, pp. 181-190.

Hassibi et al., "Second Order Derivatives for Network Pruning: Optimal Brain Surgeon," In S. J. Hanson, J. D. Cowan, and C. L. Giles, editors, Proceedings Advances in Neural Information Processing Systems, vol. 5, pp. 164-171. Morgan Kaufmann, San Mateo, CA, 1993.

Haykin, "Radial-Basis Function Networks," Neural networks; a comprehensive foundation, 1999, pp. 256-317.

Ho et al., "Integrated RBF Network Based Estimation Strategy of the Output Characteristics of Brushless DC Motors," IEEE Transactions on Magnetics, Mar. 2002, vol. 38, No. 2, pp. 1033-1036.

Holmes et al., "Bayesian Radial Basis Functions of Variable Dimension," Neural Computation, 1998, vol. 10, pp. 1217-1233.

Hon, "A Quasi-Radial Basis Functions Method for American Options Pricing," Computers and Mathematics with Applications 43 (2002), pp. 513-524.

Hooker, "Correlation of the Marriage-Rate with Trade," Journal of the Royal Statistical Society, Sep. 1901, vol. 64, No. 3, pp. 485-492.

Hu et al., "Multivariate Radial Basis Interpolation for Solving Quantum Fluid Dynamical Equations," Computers and Mathematics with Applications 43 (2002), pp. 525-537.

Huang et al., "Generalized skew-Cauchy distribution," Statistics & Probability Letters, 2007, vol. 77, pp. 1137-1147.

Hundley et al., "Empirical Dynamical System Reduction II: Neural Charts," in K. Coughlin, editor, Semi-analytic Methods for the Navier—Stokes Equations (Montreal, 1995), vol. 20 of CRM Proc. Lecture Notes, pp. 65-83, Providence, RI, 1999. American Mathathematical Society.

Hundley, "Local Nonlinear Modeling Via Neural Charts" Dissertation for Colorado State University, Summer 1998, 180 pages.

Hutchinson et al., "A Nonparametric Approach to Pricing and Hedging Derivative Securities Via Learning Networks," Massachusetts Institute of Technology, A.I. Memo No. 1471, C.B.C.L. Paper No. 92, Apr. 1994, 31 pages.

Insua et al., "Feedforward neural networks for nonparametric regression," In P. Muller D. K. Dey and D. Sinha, editors, Practical Nonparametric and Semiparametric Bayesian Statistics, pp. 181-191, New York, 1998. Springer Verlag.

Jamshidi et al., "Examples of Compactly Supported Functions for Radial Basis Approximations," In E. Kozerenko H. R. Arabnia and S. Shaumyan, editors, Proceedings of The 2006 International Conference on Machine learning; Models, Technologies and Applications, pp. 155-160, Las Vegas, Jun. 2006. CSREA Press.

Jamshidi et al., "Towards a Black Box Algorithm for Nonlinear Function Approximation Over High-Dimensional Domains," SIAM J. Sci. Comput., 2007, vol. 29, No. 3, pp. 941-963.
Jamshidi, "A New Spatio-Temporal Resource Allocation Network (ST-RAN)," Master's thesis, Colorado State University, Fall 2004, 126 pages.
Jamshidi, "A Spatio-Temporal Resource Allocation Network (ST-RAN)," Colorado State University, Department of Math, Fort Collins, CO, Feb. 2005, 36 pages.
Jamshidi, "An adaptive underwater target classification system with a decision feedback mechanism," Thesis at Colorado State University, Spring 2002, 229 pages.
Jamshidi, "Preliminary Exam Advances in Radial Basis Function, Theory, Algorithms and Applications," Colorado State University, Summer 2007, 83 pages.
Jankowski et al., "Statistical Control of RBF-like Networks for Classification," ICANN, 1997, pp. 385-390.
Jianping et al., "Communication Channel Equalization using Complex-valued Minimal Radial Basis Function Neural Networks," IEEE Transactions on Neural Networks, May 2002, vol. 13(3), pp. 687-696.
Jianping et al., "Nonlinear Magnetic Storage Channel Equalization Using Minimal Resource Allocation Network (MRAN)" IEEE Transactions on Neural Networks, Jan. 2001, vol. 12, No. 1, pp. 171-174.
Jones, "A skew extension of the t-distribution, with applications" J.R. Statist. Soc. B, 2003, vol. 65, Part 1, pp. 159-174.
Kadirkamanathan et al., "A function estimation approach to sequential learning with neural networks," Neural Computation, 1993, vol. 5, pp. 954-975.
Kadirkamanathan et al., "A Statistical Inference Based Growth Criterion for the RBF Network," In Proceedings of the IEEE Workshop on Neural Networks for Signal Processing IV, pp. 12-21, 1994.
Kansa, "Local, Point-Wise Rotational Transformations of the Conservation Equations into Stream-Wise Coordinates," Computers and Mathematics with Applications 43 (2002), pp. 501-511.
Karayiannis et al., "Growing Radial Basis Neural Networks: Merging Supervised and Unsupervised Learning with Network Growth Techniques," IEEE Transactions on Neural Networks, Nov. 1997, vol. 8(6), pp. 1492-1506.
Karayiannis et al., "On the Construction and Training of Reformulated Radial Basis Function Neural Networks," IEEE Transactions on Neural Networks, Jul. 2003, vol. 14, No. 4, pp. 835-846.
Kedem et al., "A Graphical Similarity Measure for Time Series Models," University of Maryland, 1985, 23 pages.
Kedem et al., "On the Asymptotic Variance of Higher Order Crossings with Special Reference to a Fast White Noise Test," Biometrika, Apr. 1986, vol. 73, No. 1, pp. 143-149.
Kedem, "Spectral Analysis and Discrimination by Zero-Crossings," Proceedings of the IEEE, Nov. 1986, vol. 74, No. 11, pp. 1477-1493.
Kedem, "Clipping a Gaussian Process," Chapter 4 of Binary Time Series, 1980, Marcel Dekker Inc., New York, pp. 33-43.
Kendall et al., The Advanced Theory of Statistics: Design and Analysis, and Time-Series, vol. 3, Hafner Publishing Co., New York, 3rd edition, 1976, pp. 365-379.
Kirby, "Ill Conditioning and Gradient Based Optimization of Multilayer Perceptrons," In J. G. McWhirter and I. K. Proudler, editors, Mathematics in Signal Processing IV, The Institute of Mathematics and Its Applications Conference Series: No. 67, pp. 223-237. Oxford University Press, 1998.
Kirby, "Radial Basis Functions" Geometric Data Analysis: An Empirical Approach to Dimensionality Reduction and the Study of Patterns, 2001, pp. 227-261.
Kirby et al., "Empirical Dynamical System Reduction I: Global Nonlinear Transformations," Mathematics Subject Classification, 1991, pp. 1-24.
Kirby et al., "Geometric Analysis for the Characterization of Nonstationary Time-Series," Version Mar. 10, 2002, pp. 1-33.
Kirby et al., "Nonlinear Parametric Neural Charts," Colorado State University, Jul. 25, 1994, pp. 1-10.
Kumar et al., "Communication Channel Equalisation Using Minimal Radial Basis Function Neural Networks," IEEE, 1998, pp. 477-485.

Kumar et al., "Minimal radial basis function neural networks nonlinear channel equalisation," IEE Proc.-Vis. Image Signal Process., Oct. 2000, vol. 147, No. 5, pp. 428-435.
Lee et al., "Extended adaptive RBF equaliser for overcoming co-channel interference," Electronics Letters, Aug. 6, 1998, vol. 34, No. 16, pp. 1567-1568.
Lee et al., "Robust Radial Basis Function Neural Networks," IEEE Transactions on Systems, Man, and Cybernetics—Part B: Cybernetics, Dec. 1999, vol. 29, No. 6, pp. 674-685.
Levesley et al., "Norm Estimates of Interpolation Matrices and Their Inverses Associated with Strictly Positive Definite Functions," Proceedings of the American Mathematical Society, Jul. 1999, vol. 127, No. 7, pp. 2127-2134.
Ljung, "Comparing Model Structures," Section 16.4 of System Identification: Theory for the User, Prentice Hall PTR, Second Edition, 1999, pp. 498-519.
MacKay, "A Practical Bayesian Framework for Backprop Networks," submitted to Neural Computation, May 18, 1991, pp. 1-11.
MacKay, "A Practical Bayesian Framework for Backpropagation Networks," Neural Computation, 1992, vol. 4(3), pp. 448-472.
MacLachlan, "An improved novelty criterion for resource allocating networks," In Proceedings of the 5th International Conference on Artificial Neural Networks, pp. 48-52, 1997.
Marrs, "An application of Reversible-Jump MCMC to multivariate spherical Gaussian mixtures," In M. I. Kearns and S. A. Solla, editors, Advances in Neural Information Processing Systems, vol. 10, pp. 577-583, Cambridge, MA, 1998. MIT press.
Mechanical Google translation of Helguero, "Sulla Rappresentazione Analitica Delle Curve Abnormali," In G. Castelnuovo, editor, Atti del IV Congresso Internazionale dei Matematici, vol. III, pp. 288-299, Roma, Italy, Apr. 6-11, 1908. Roma R. Accademia dei Lincei.
Mercer, "Functions of Positive and Negative Type, and Their Connection with the Theory of Integral Equations," Proceedings of the Royal Society of London. Series A, Containing Papers of a Mathematical and Physical Character, Nov. 3, 1909, vol. 83, No. 559, pp. 69-70.
Micchelli, "Interpolation of Scattered Data: Distance Matrices and Conditionally Positive Definit Functions," Const. Approx., 1986, vol. 2, pp. 11-22.
Michelson et al., "A new Harmonic Analyzer," Am. Jour. Sci., vol. V, 1988 pp. 1-13.
Moody et al., "Fast Learning in Networks of Locally-tuned Processing Units," Neural Computation, 1989, vol. 1, pp. 281-294.
Mulgrew, "Applying Radial Basis Functions," IEEE Signal Processing Magazine, Mar. 1996, pp. 50-65.
Myers et al., "Space-Time Radial Basis Functions," Computers and Mathematics with Applications 43 (2002), pp. 539-549.
Narcowich et al., "Norm Estimates for the Inverses of a General Class of Scattered-Data Radial-Function Interpolation Matrices," Journal of Approximation Theory, 1992, vol. 69, pp. 84-109.
Narcowich et al., "On Condition Numbers Associated with Radial-Function Interpolation," Journal of Mathematical Analysis and Applications, 1994, vol. 186, pp. 457-485.
Orr "An EM Algorithm for Regularized RBF Networks," In International Conference on Neural Networks and Brain, Beijing, China, 1998, 4 pages.
Orr, "Introduction to Radial Basis Function Networks," University of Edinburgh, Apr. 1996, pp. 1-67.
Orr, "Recent Advances in Radial Basis Function Networks," Edinburgh University, Jun. 25, 1999, pp. 1-27.
Pachowicz et al., "Adaptive RBF Classifier for Object Recognition in Image Sequences," In Proceedings of the IEEE-INNS-ENNS International Joint Conference on Neural Networks, IJCNN, vol. 6, pp. 600-605, Jul. 2000.
Park et al., "Approximation and Radial-Basis-Function Networks," Neural Computation, 1993, vol. 5, pp. 305-316.
Park et al., "Universal Approximation Using Radial-Basis-Function Networks," Neural Computation, 1991, vol. 3, pp. 246-257.
Platt, "A Resource-Allocating Network for Function Interpolation," Neural Computation, 1991, vol. 3, pp. 213-225.
Powell, "Radial Basis Functions for Multivariable Interpolation: A Review," Algorithms for approximation, 1987, pp. 143-167.

Powell, "The Theory of Radial Basis Functions in 1990" Advances in numerical analysis, 1992, vol. 2, pp. 105-210.
Power et al., "A Comparison Analysis between Unsymmetric and Symmetric Radial Basis Function Collocation Methods for the Numerical Solution of Partial Differential Equations," Computers and Mathematics with Applications 43 (2002), pp. 551-583.
Qiao et al., "Developing a Computational Radial Basis Function (RBF) Architecture for Nonlinear Scattered Color Data," Proceedings NIP22 International Conference on Digital Printing Technologies, Sep. 2006, pp. 374-377.
Qiao, Yue, "Radial Basis Functions for Color Conversion," Ph.D. Dissertation, Colorado State University, Department of Mathematics, 2008, 136 pages.
Rice, "Mathematical Analysis of Random Noise," Bell Systems Technical Journal, 24, Jan. 1945. 168 pages.
Richardson et al., "On Bayesian Analysis of Mixtures with an Unknown Number of Components," Journal of the Royal Statistical Society, Series B (Methodological), 1997, vol. 59, No. 4, pp. 731-792.
Roweis et al., "Global Coordination of Local Linear Models," In Neural Information Processing Systems 15 (NIPS'2002), Vancouver, Canada,, Dec. 9-14.
Roweis et al., "Nonlinear Dimensionality Reduction by Locally Linear Embedding," Science, Dec. 22, 2000, vol. 290, pp. 2323-2326.
Schaback, "Error estimates and condition numbers for radial basis function interpolation," Advances in Computational Mathematics, 1995, vol. 3, pp. 251-264.
Schaback, "Lower Bounds for Norms of Inverses of Interpolation Matrices for Radial Basis Functions," Journal of Approximation Theory, 79(2):287-306, 1994.
Schaback "Reconstruction of Multivariate Functions from Scatterd Data," Jan. 21, 1997, 214 pages.
Schaback et al., "Characterization and construction of radial basis functions," In N. Dyn, D. Leviatan, D. Levin, and A. Pinkus, editors, Multivariate Approximation and Applications, Eilat Proceedings, Mar. 17, 2000, pp. 1-25.
Schoenberg, "Metric Spaces and Completely Monotone Functions," The Annals of Mathematics, 2nd Ser., Oct. 1938, vol. 39, No. 4, pp. 811-841.
Scholkopf et al., "Comparing Support Vector Machines with Gaussian Kernels to Radial Basis Function Classifiers," IEEE Transactions on Signal Processing, Nov. 1997, vol. 45, No. 11, pp. 2758-2765.
Smyth, "On Stochastic Complexity and Admissible Models for Neural Network Classifiers," Advances in neural information processing systems 3, 1991, pp. 818-824.
Sun, "Norm Estimates for Inverse of Euclidean Distance Matrices," Journal of Approximation Theory, 1992, vol. 70, pp. 339-347.
Sundararajan et al., "Analysis of minimal radial basis function network algorithm for real-time identificaion of nonlinear dynamic systems," IEE Proceedings of Control Theory and Applications, 147(4):476-484, Jul. 2000.
Takeda, "Kernel Regression for Image Processing and Reconstruction" IEEE Transactions on Image Processing, Feb. 2007, vol. 16, No. 2, pp. 349-366.
Teh et al., "Automatic Alignment of Local Representations," University of Toronto, Neural Information Processing Systems 15 (NIPS'2002), 8 pages.
Tenenbaum et al., "A Global Geometric Framework for Nonlinear Dimensionality Reduction," Science, Dec. 22, 2000, vol. 290, pp. 2319-2323.
Tsapatsoulis et al., "Improving the Performance of Resource Allocation Networks through Hierarchiacal Clustering of High—Dimensional Data," In Proceedings of International Conference on Artificial Neural Networks, ICANN, pp. 867-874, 2003.
Vapnik, "Examples on SV machines for pattern recognition," Statistical learning theory, New York, 1998, pp. 430-432.
Vapnik, "Perceptrons and their generations," Statistical learning theory, New York, 1998, pp. 375-399.
Vasconcelos et al. "A multiresolution manifold distance for invariant image similarity," IEEE Transactions on Multimedia, 2005, 17pages, University of California, posted at eScholarship Repository, <http://repositories.cdlib.org/postprints/692.
Vasconcelos et al., "Multiresolution Tangent Distance for Affine-Invariant Classification," MIT Media Laboratory, Cambridge, Massachusetts, published 1998, 7 pages.
Verbeek et al., "Non-linear CCA and PCA by Alignment of Local Models," Neural Information Processing System 16 (NIPS'2003), 8 pages.
Wahba, "Spline Bases, Regularizaion, and Generalized Cross Validation for Solving Approximation Problems with Large Quantities of Noisy Data," Approximation theory III, 1980, pp. 905-912.
Wahed et al., "The Skew-Logistic Distribution," Journal of Statistical Research, 2001, vol. 35, No. 2, pp. 71-80.
Wendland, "Compactly supported functions," Scattered data approximation, 2005, pp. 119-132.
Wendland, "Piecewise polynomial, positive definite and compactly supported radial functions of minimal degree," Oct. 5, 1995, pp. 1-8.
Werbos, "Beyond Regression: New Tools for Prediction and Analysis in the Behavioral Sciences," Thesis at Harvard University, Aug. 1974, 104 pages.
Widrow et al., "Adaptive switching circuits," In 1960 WESCON Convention Record Part IV, Reprinted in J.A. Anderson and E. Rosenfeld, Neurocomputing: Foundations of Research, pp. 96-104, Cambridge, MA, 1988, 1960. The MIT Press.
Wolf et al., "Learning Over Sets Using Kernel Principal Angles," Journal of Machine Learning Research, Oct. 2003, vol. 4, pp. 913-931.
Wong et al., "A Meshless Multilayer Model for a Coastal System by Radial Basis Functions," Computers and Mathematics with Applications 43 (2002), pp. 585-605.
Wu et al., "A Smoothing Regularizer for Feedforward and Recurrent Neural Networks," Neural Computation, 1996, vol. 8, No. 3, pp. 463-491.
Wu, "Compactly supported positive definite radial functions," Advances in Computational Mathematics, 1995, vol. 4, pp. 283-292.
Xu et al., "Radar Rainfall Estimation From Vertical Reflectivity Profile Using Neural Network," IEEE, 2001, pp. 3280-3281.
Yaglom, "Einstein's 1914 Paper on the Theory of Irregularly Fluctuating Series of Observations," IEEE ASSP Magazine, Oct. 1987, pp. 7-11.
Yamaguchi et al., "Face Recognition Using Temporal Image Sequence," Kansai Research Laboratories, Toshiba Corporation, Kobe, Japan, 1998, 6 pages.
Yamauchi et al., "Incremental Learning Methods with Retrieving of Interfered Patterns," IEEE Transactions on Neural Networks, Nov. 1999, vol. 10, No. 6, pp. 1351-1365.
Yingwei et al., "A sequential Learning Scheme for Function Approximation Using Minimal Radial Basis Function Neural Networks," Neural Computation, 1997, No. 9, pp. 461-478.
Yingwei et al., "Performance Evaluation of a Sequential Minimal Radial Basis Function (RBF) Neural Network Learning Algorithm," IEEE Transactions on Neural Networks, Mar. 1998, vol. 9, No. 2, pp. 308-318.
Yona, "Methods for Global Organization of the Protein Sequence Space," Thesis submitted for Ph.D. Degree, 1999, Pertinent Section: Chapter 5—"Data Clustering," pp. 61-74, http://biozon.org/people/golan/.
Young et al., "Solution of Stokes Flow Using an Iterative DRBEM Based on Compactly-Supported, Positive-Definite Radial Basis Function," Computers and Mathematics with Applications 43 (2002), pp. 607-619.
Zhihong et al., "A Robust Adaptive Sliding Mode Tracking Control Using an RBF Neural Network for Robotic Manipulators," In Proceedings of IEEE International Conference on Neural Networks, Nov.-Dec. 1995, vol. 5, pp. 2403-2408.
Zhou et al., "Image-based Face Recognition Under Illumination and Pose Variations," Journal of the Optical Society of America A, Feb. 2005, vol. 22(2), pp. 217-229.
Official Action for U.S. Appl. No. 11/899,625, dated Aug. 11, 2010.
Official Action for U.S. Appl. No. 11/899,625, dated Mar. 15, 2011.
Notice of Allowance for U.S. Appl. No. 11/899,625, dated May 25, 2011.

FIG. 1A

RBF Algorithm using Spatio-Temporal Ball

```
ran_flag ← 1;      /* flag to stop updating the approximation model */      // Step 104
K ← 0;   /* current model order of the approximation model */              // Step 108
MODEL ← NULL;      /* the approximation model is initially empty */        // Step 110
while ran_flag == 1 do      /* continue updating MODEL */                  // Step 112
  if MODEL == NULL then                                                    // Step 116
    initialize the residuals $\{e_n\}_{n=1}^{L}$ between MODEL and the training set to the
      training data set $\{f(x_n)\}_{n=1}^{L}$;                            // Step 120
  else  /* there is at least one approximation function in MODEL */
    { /* residuals already computed at this point */ for each lag h, $0 < |h| \leq L-1$ DO {                                // Step 132
      compute component contributions $\alpha(h, e_i) = (e_{i+|h|} - \bar{e})(e_i - \bar{e})$ for the ACF
        for $1 \leq i \leq L-|h|$;                                         // Step 136
      ACF(h) ← compute ACF for h according to equation (3.3);              // Step 140
    }
    if (at least 95% of the ACF(h)'s do not satisfy equation (3.5)) OR (at least
        one of the ACF(h) is substantially outside of the range of equation (3.5))
      then {                                                               // Step 144
```

FIG. 1B

/* the autocorrelation test indicates whether the residual sequence is IID, and if not, then
determine a location to add a basis function via steps 148 through 152 hereinbelow.*/
compute $h^*$ via the equation $h^* = \{h$ such that $ACF(h)$ is a maximum
for $-L+1 \leq h < 0\}$; // Step 148

/* $h^*$ has the highest autocorrelation and accordingly the highest indication of non-random
information content in the residuals. */
/* now determine the point $x^*$ where a new basis function, BF, should be centered. */
$x^* \leftarrow x_{i^*}$ where $i^* = \text{argmax}_{i=1,\ldots,L-|h^*|}(\alpha(h^*, e_i))$; // Step 152
construct the function, $ACC_{h^*}(i) = \alpha(h^*, e_i)$, $i = 1,\ldots, L - |h^*|$; // Step 156

/* Optionally perform step 160: */
denoise the $ACC_{h^*}$ function; // Step 160
starting with $i^*$, find the right and left local minimizers of $ACC_{h^*}$, i.e., $l^*$ and $r^*$; // Step 164
compute $d_l = d(x^*, x_{l^*})$, $d_r = d(x^*, x_{r^*})$ and $d_c = \max(d_l, d_r)$ // Step 168
define the local ball as $X_{local} = \{x \in X: \|x - x^*\| \leq d_c\}$; // Step 172
initialize a new basis function $h(x;v)$ to be added to MODEL
with initial values $v = [c_0, \alpha_0, \alpha_0]^T$; // Step 176

FIG. 1C

```
iteratively improve on h(x;v) by optimizing v by using a conjugate gradient
    method with the cost function being                                          // Step 180
        E(v) = min || h(x, v) - y ||₂², where x ε X_local;
                v
    add h(x;v) to MODEL;                                                         // Step 184
    K=K+1;    /* update the order of MODEL */                                    // Step 188
}
else
  { ran_flag ← 0;                                                                // Step 192
  }
end if
evaluate MODEL on the domain for the training data set, i.e., {x_n}_{n=1}^{L};   // Step 196
compute a new set of residuals for the new version of MODEL                      // Step 200
compute RMSE and ACF(h*) of the current model on the training set;               // Step 204
compute a (new) confidence level of how closely MODEL
    approximates the training set;                                               // Step 208
if the confidence level is at least a predetermined value (e.g., 95%) then       // Step 212
    ran_flag ← 0;                                                                // Step 216
}
end while.
```

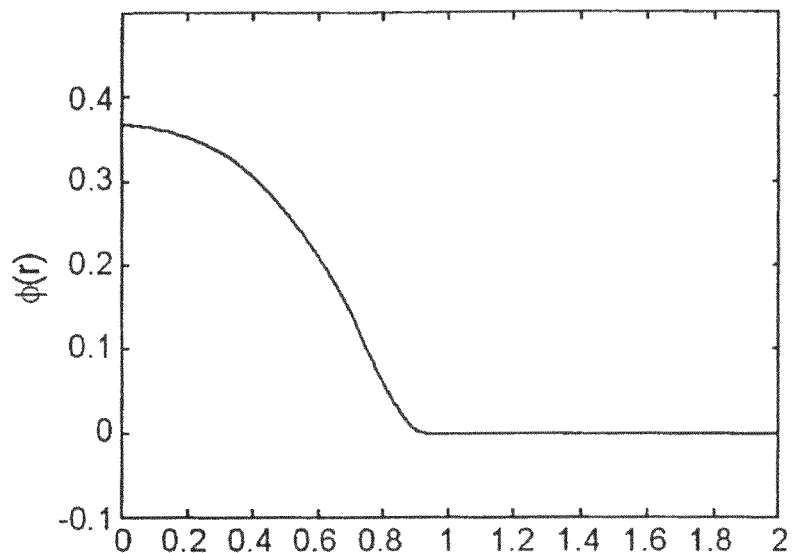
FIG. 2A  The plot of the $C^\infty$ mollifier function.
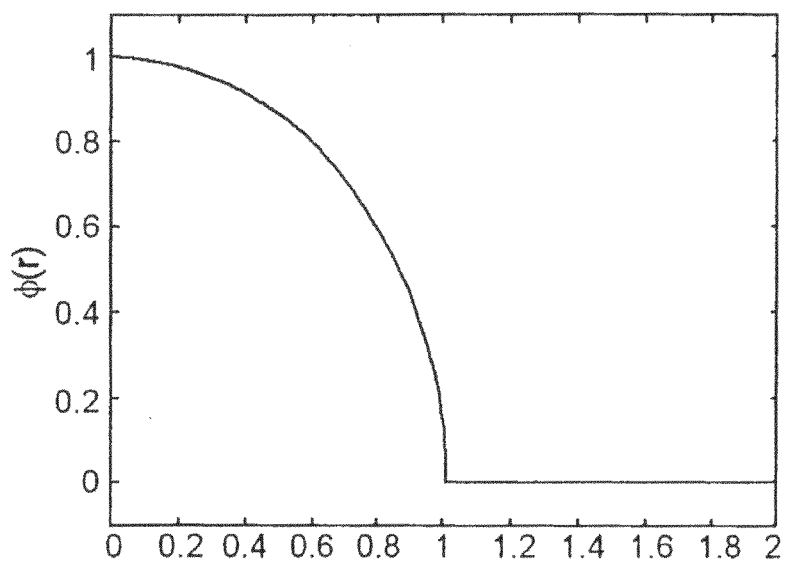
FIG. 2B  The plot of $C^0$ quarter circle.

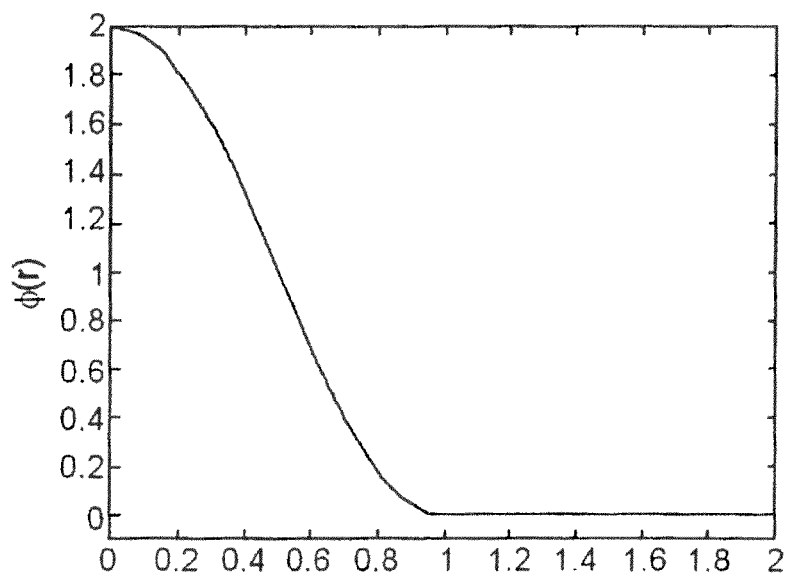
FIG. 2C  The plot of $C^\infty$ Hanning function.

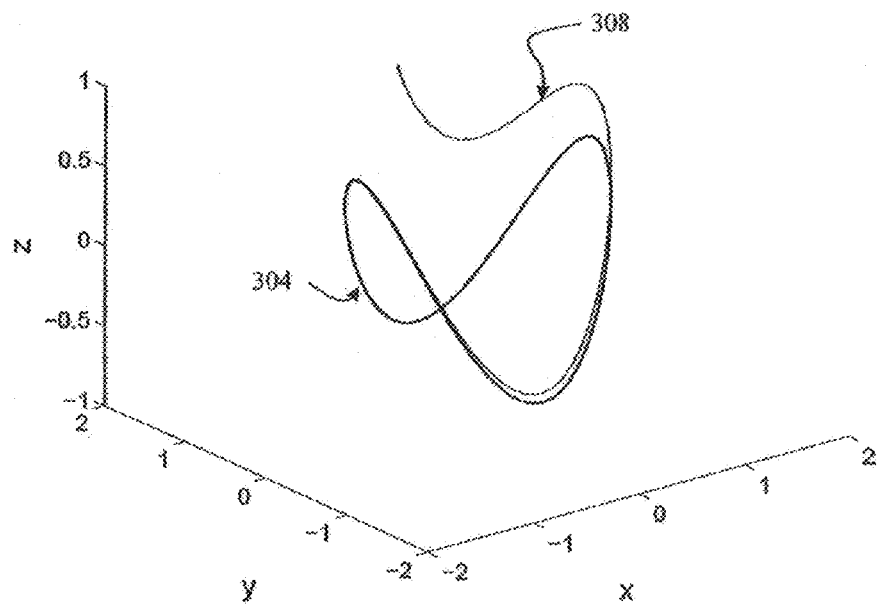
FIG. 3A  *Plot of a typical Pringle set with λ = 1 and ω = 0.5.*
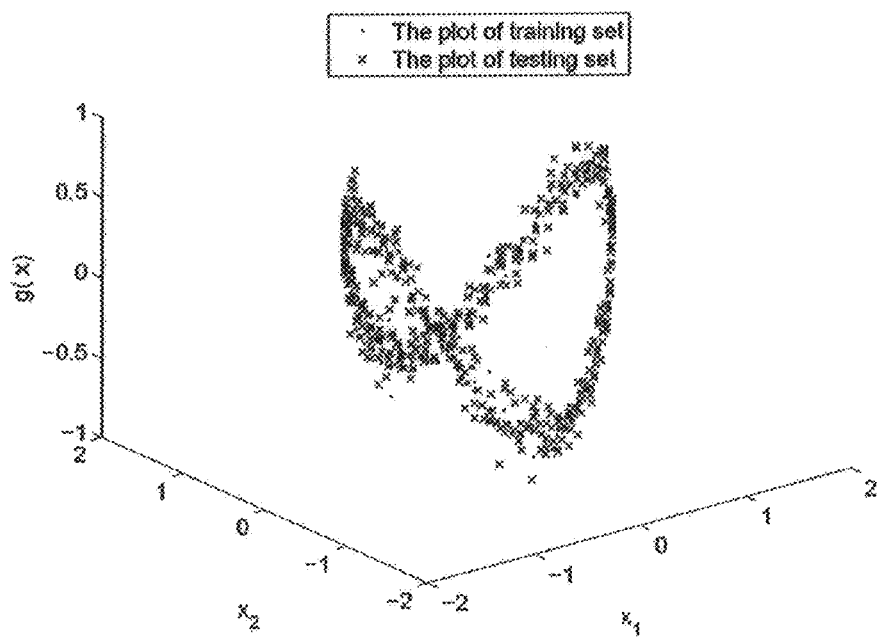
FIG. 3B  *Plots of the training and testing data sets. The solution to the dynamical system is corrupted with Gaussian noise with STD of 0.1. There are 54 data points in one cycle.*

The ACC function and the selected points to construct the first RBF.

The ACC function and the selected points to construct the second RBF.

The ACC function and the selected points to construct the third RBF.

The ACC function and the selected points to construct the fourth RBF.

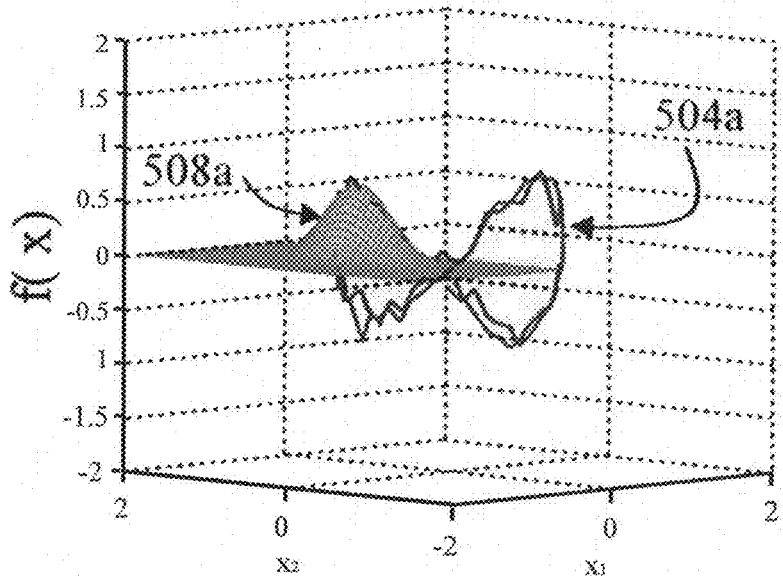
(a) The first RBF in relation with the training data set.
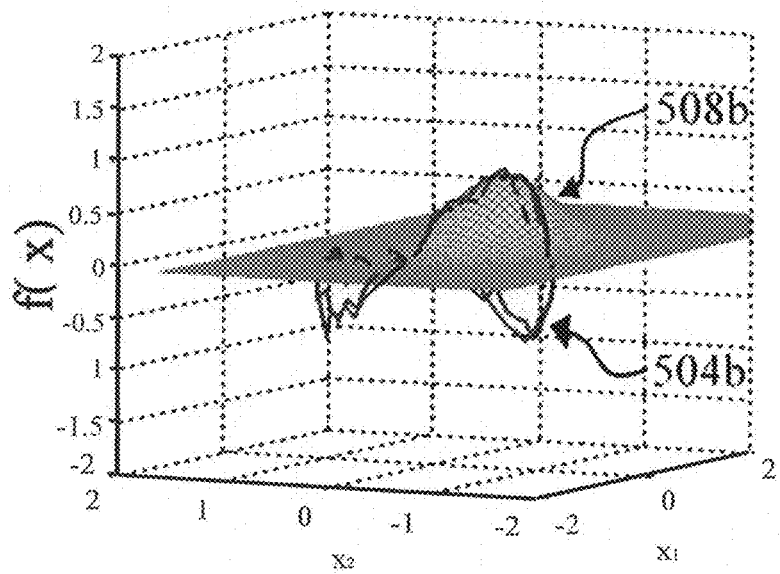
(b) The second RBF in relation with the training data set.

(c) The third RBF in relation with the training data set.

(d) The fourth RBF in relation with the training data set.

The plot of $\gamma(h^*)$ as new basis functions are added to the model.

The RMSE plot of the model as new basis functions are added to the model.

The confidence level of the fitted model as the new basis functions are added to the model.

FIG. 8 A multi-variate RBF algorithm, using a pairwise hypothesis test on time series.

$ran\_flag = 1, K = 0;$
while $ran\_flag = 1$ do
  evaluate the RBF on the training data set $\{f(x_n)\}_{n=1}^{L}$;
  compute the model error $\{e_n\}_{n=1}^{L}$;
  compute component contributions $\alpha(h, e_k^i, e_k^j) = (e_{k+|h|}^i - \bar{e}^i)(e_k^j - \bar{e}^j)$ for all $i, j = 1, \ldots, m$;
  computer correlation functions for all the $m$ time series and all lags $0 \leq h < L$;
  compute the maximum contribution to each correlation function over all lags;
  apply the univariate WN test to each of the pairs;
  if any of the autocorrelations does not pass the WN test then
    identify time series $d$, that has the maximum value at its autocorrelation function;
    Let $i = d$ and $j = d$;
  else if any of the cross-correlations does not pass the WN test then
    identify the pair of time series $d1$, $d2$ that has the maximum value at their cross-correlation function, $i = d1$ and $j = d2$;
  else
    $ran\_flag = 0;$
  end if
  compute $h^*$ via equation $h^* = \arg\max \hat{r}_{i,j}(h), h > 0$ and
  compute $x^* = x_{i^*} = \psi^{-1}(e_{i^*})$ where $i^* = \arg\max_{k=1,\ldots,n-h^*} \alpha(h^*, e_k^i, e_k^j);$
  compute the CCC function, $B_k^{i,j} = \alpha(h^*, e_k^i, e_k^j), k = 1, \ldots, n - h^*;$
  find the right and left zero crossing of the CCC function $i^*$, i.e., $l^*$ and $r^*$;
  compute $d_l = d(x_{l^*}, x_{i^*})$, $d_r = d(x_{i^*}, x_{r^*})$ and $d_c = \max\{d_l, d_r\}$;
  define the local ball as $\chi_{local} = \{x \in \chi : \|x - x^*\| \leq d_c\};$
  add a new RBF $h(x; v)$ with initial values $v = [c_0, \sigma_0, a_0]^T;$
  solve $E(v) = \min_v \|h(x;v) - y\|_2^2$, where $x \in \chi_{local};$
  $K = K + 1;$
  compute confidence, RMSE and $y(h^*)$ of the current model on the training set;
end while.

FIG. 9

Algorithm 3 A novel Multi-variate RFB algorithm.

$ran\_flag = 1, K = 0$ while $ran\_flag = 1$ do evaluate the RBF on the training data set $\{f(x_n)\}_{n=1}^{L}$ compute the model error $\{e_n\}_{n=1}^{L}$ compute component contributions $\alpha(h, e_i) = (e_{i+|h|} - \bar{e})(e_i - \bar{e})'$ compute ACF for all $0 \leq h < L$ if the autocorrelation test is rejected then compute $h^*$ via equation $h^* = \arg\max \sum_{i=1}^{m}\sum_{j=1}^{m}|\hat{\gamma}_{ij}(h)|, h > 0$ and compute $x^* = x_{i^*} = e^{-1}(e_{i^*})$ where $i^* = \arg\max_{i=1,\ldots,n-h}|\alpha(h^*, e_i)|$ compute the ACC function, $\beta_i = |\alpha(h^*, e_i)|, i = 1,\ldots,n-h$ find the right and left zero crossing of the ACC function of $i^*$, i.e., $l^*$ and $r^*$ compute $d_l = d(x_{l^*}, x_{i^*})$, $d_r = d(x_{i^*}, x_{r^*})$ and $d_c = \max\{d_l, d_r\}$ define the local ball as $\chi_{local} = \{x \in \chi : \|x - x^*\| \leq d_c\}$ add a new RBF $h(x, v)$ with initial values $v = [c_0, \sigma_0, \alpha_0]^T$ solve $E(v) = \min_v \|h(x, v) - y\|_2^2$, where $x \in \chi_{local}$ $K = K+1$ else

$ran\_flag = 0$ end if compute confidence, RMSE and $\gamma(h^*)$ of the current model on the training set end while

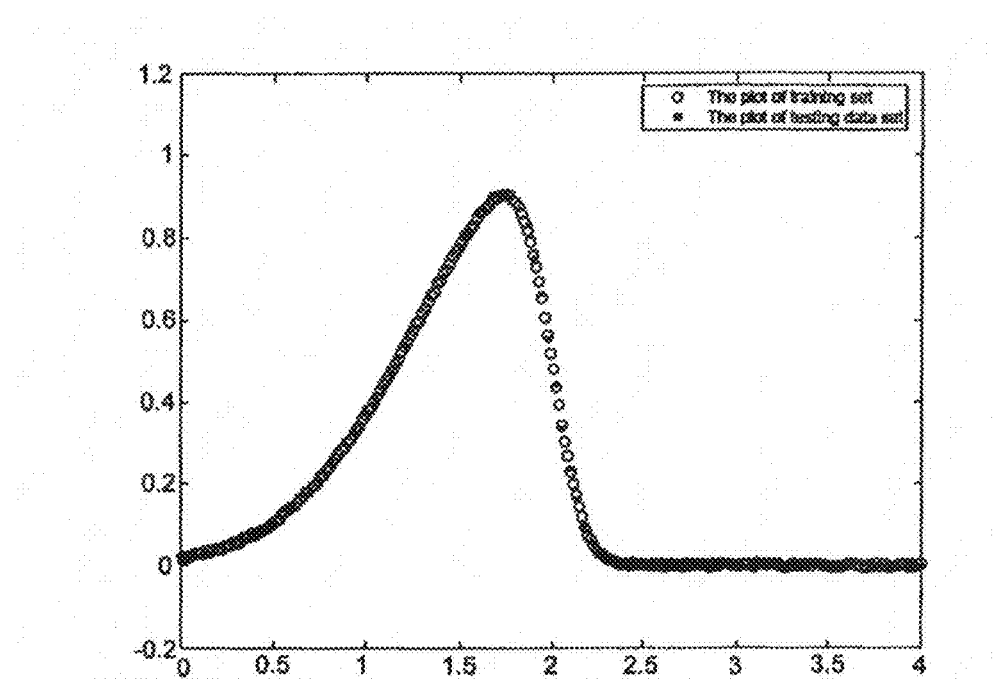
FIG. 10A The testing and training data sets.
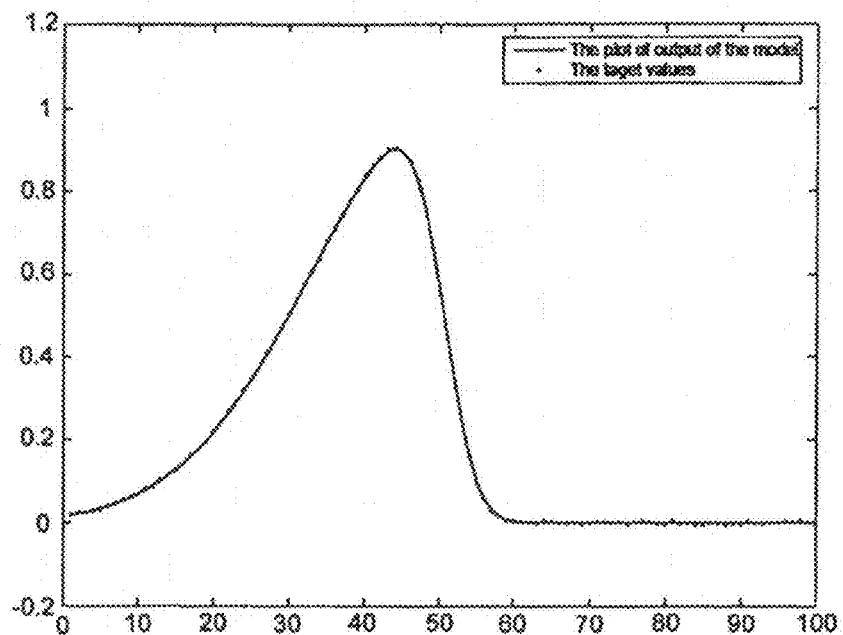
FIG. 10B The output of the model.

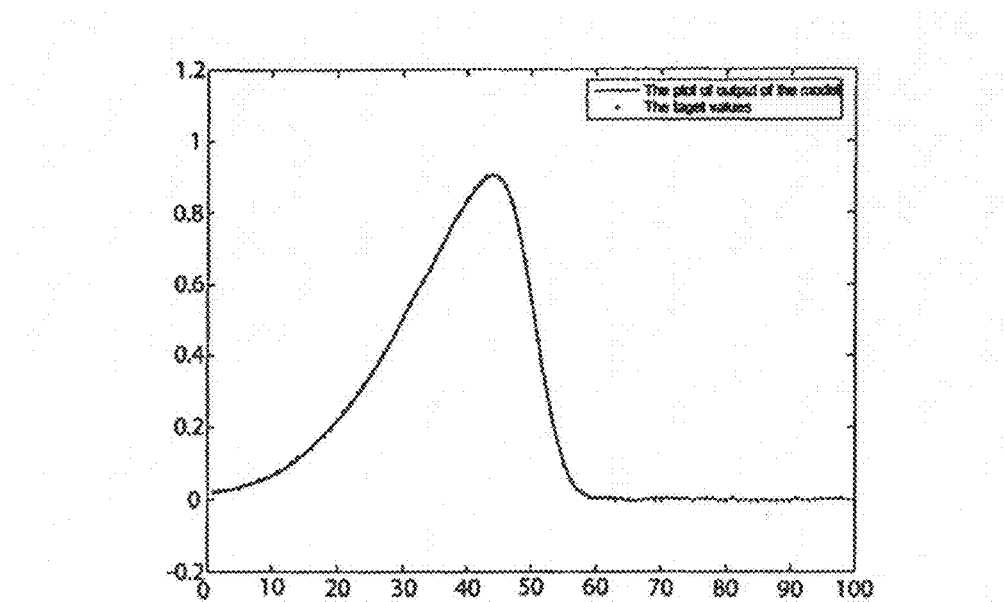
FIG. 11A The the output of the model.
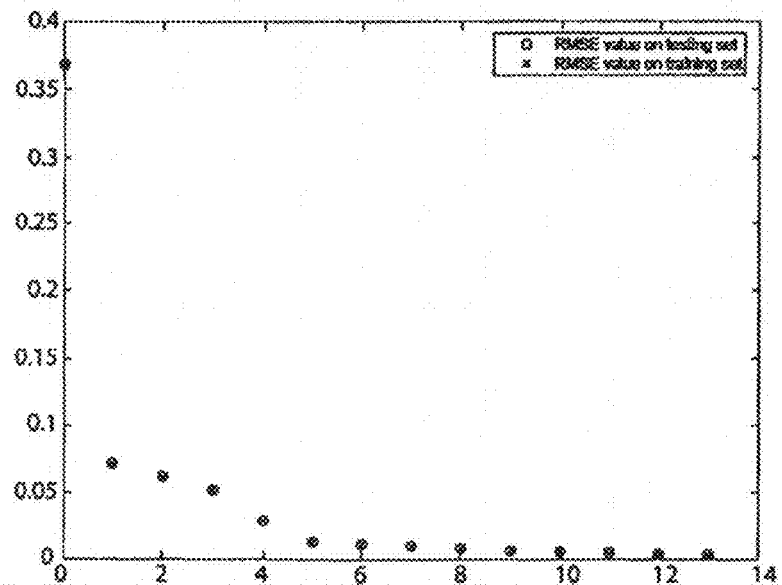
FIG. 11B The RMSE plot of the model as new basis functions are added to the model.

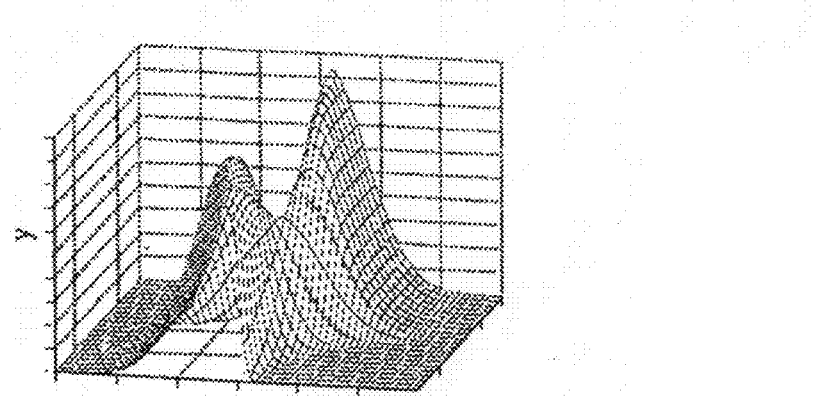
FIG. 12A (a) Gaussian-Gaussian RBF.
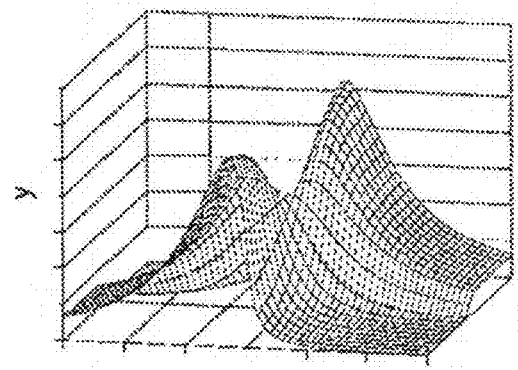
FIG. 12B (b) Cauchy-Cauchy RBF.
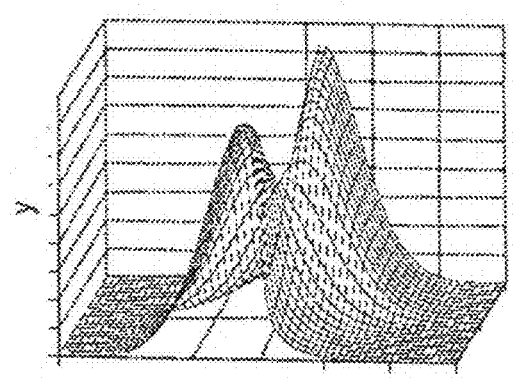
FIG. 12C (c) Gaussian-Cauchy.
Plots of Gaussian-Gaussian, Cauchy-Cauchy, and Gaussian-Cauchy RBFs for different values of shape parameter.

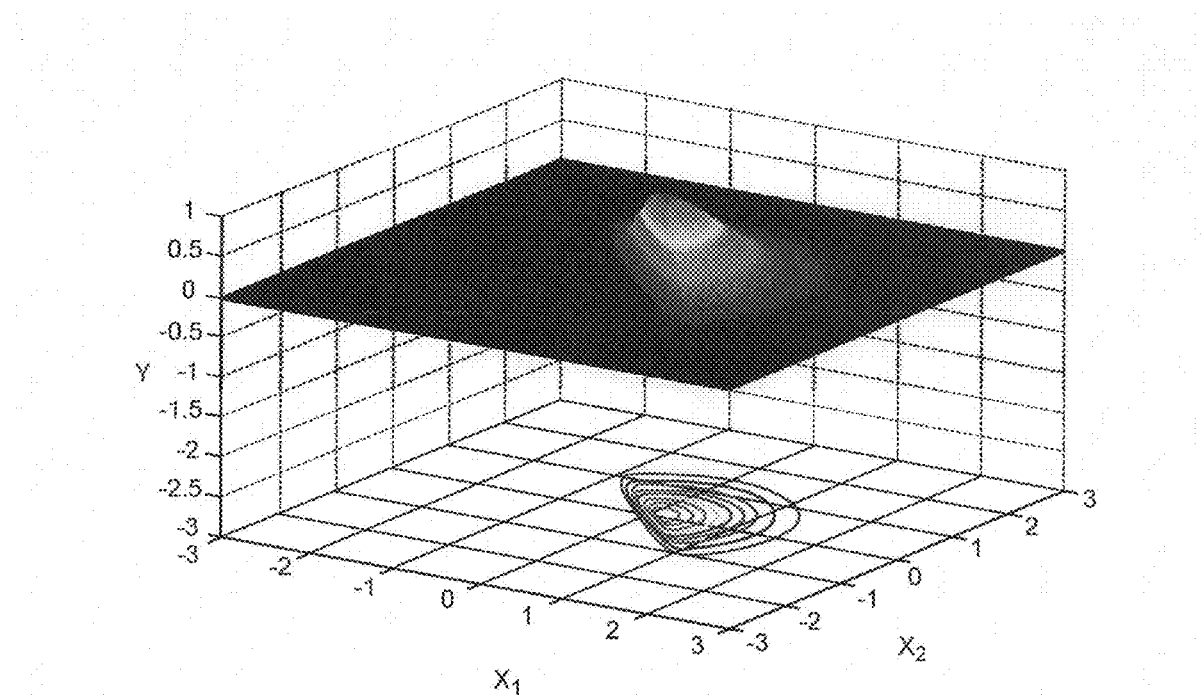
FIG. 13A 2-dim Gaussian-Gaussian
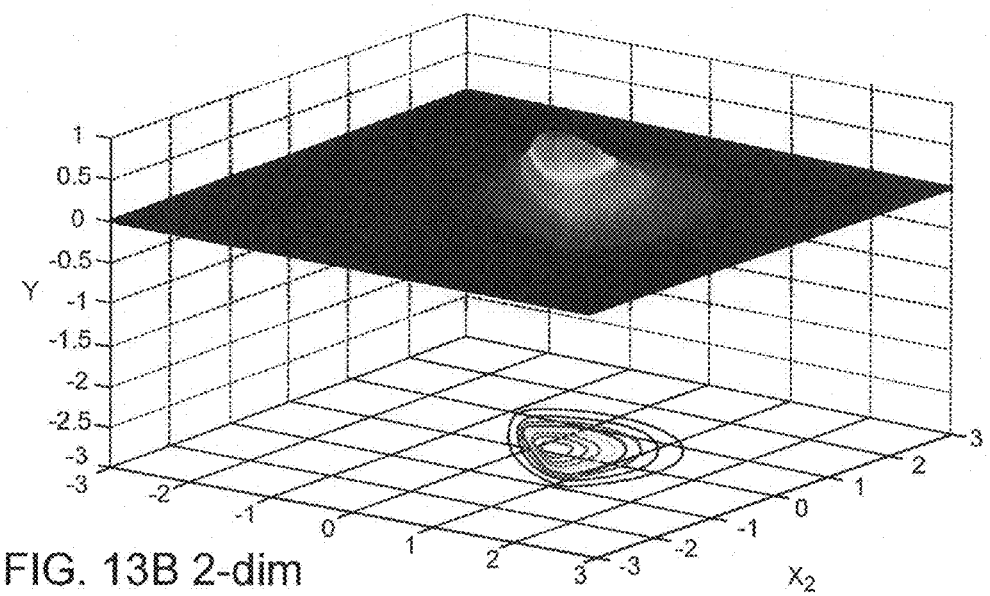
FIG. 13B 2-dim Gaussian-Cauchy

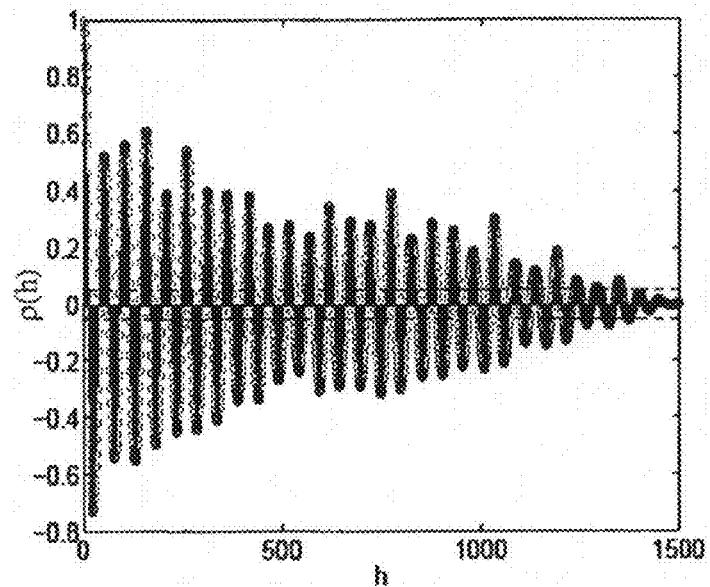
Initial autocorrelation function.
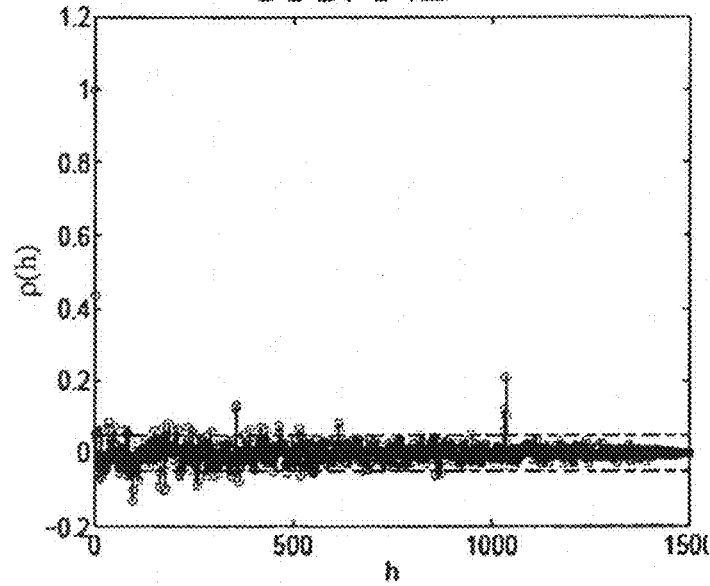
Final autocorrelation function.

The ACC function associated with (a).

The ACC function associated with (b).

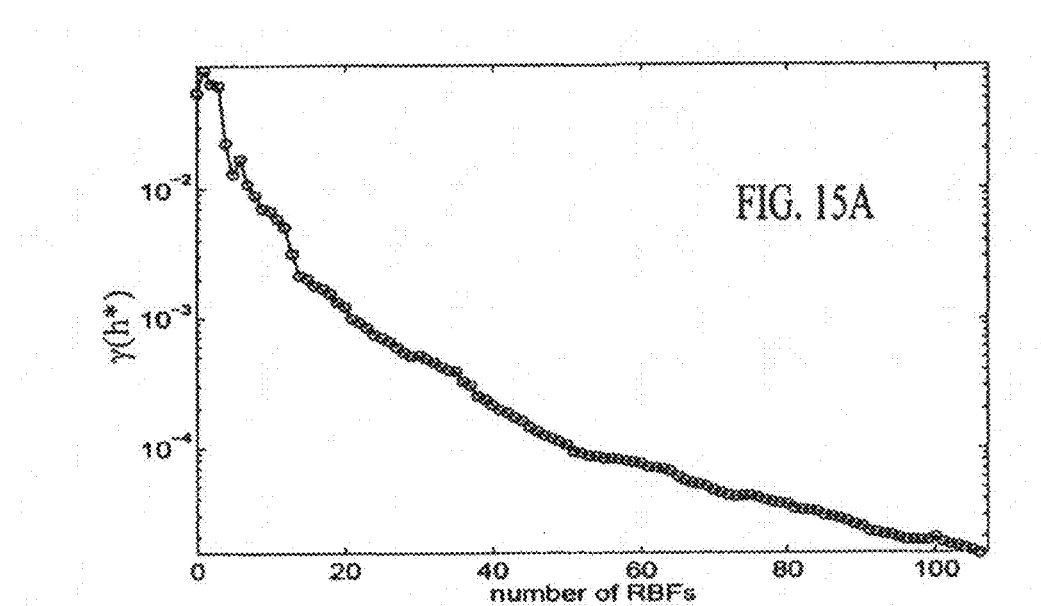
(a) The log plot of γ(h*) as new basis functions are added to the model.
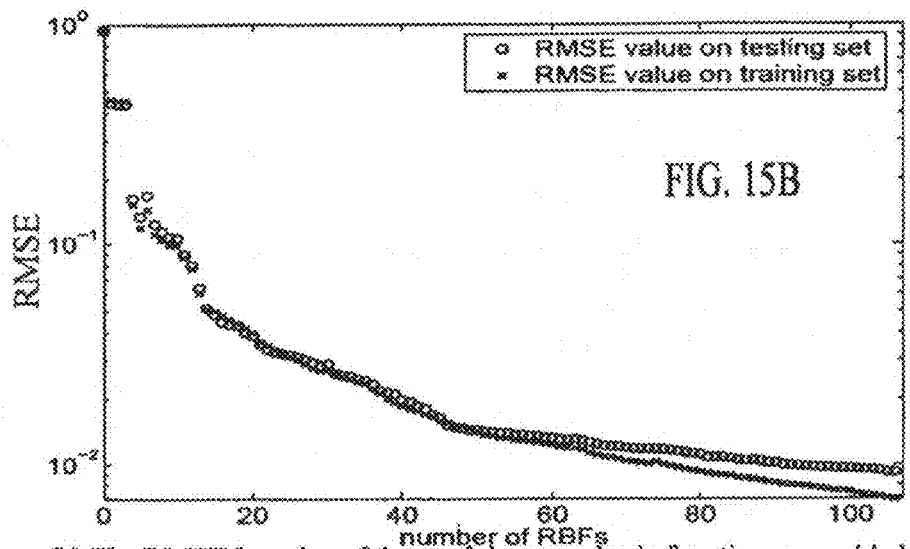
(b) The RMSE log plot of the model as new basis functions are added to the model.

(c) The confidence level of the fitted model as the new basis functions are added to the model.

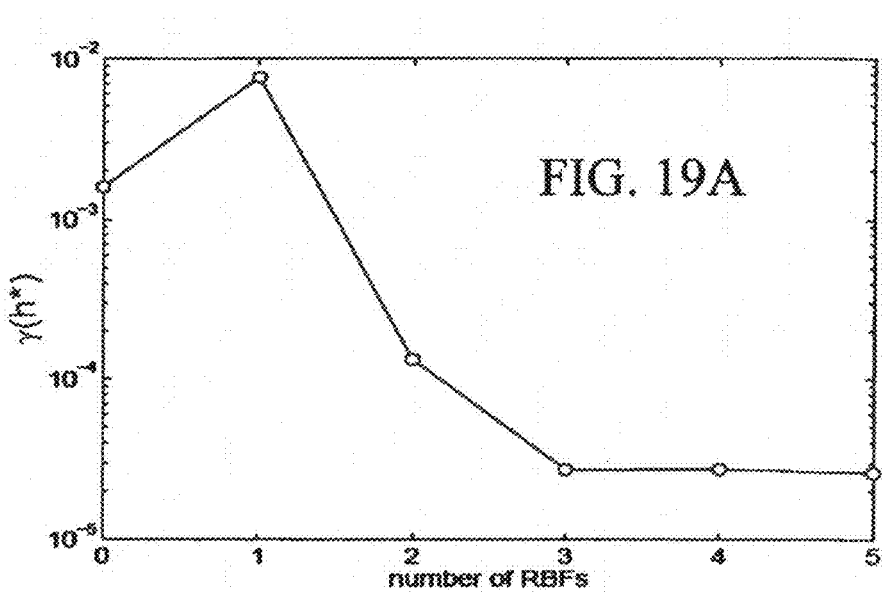
(a) The log plot of γ(h*) as new basis functions are added to the model.
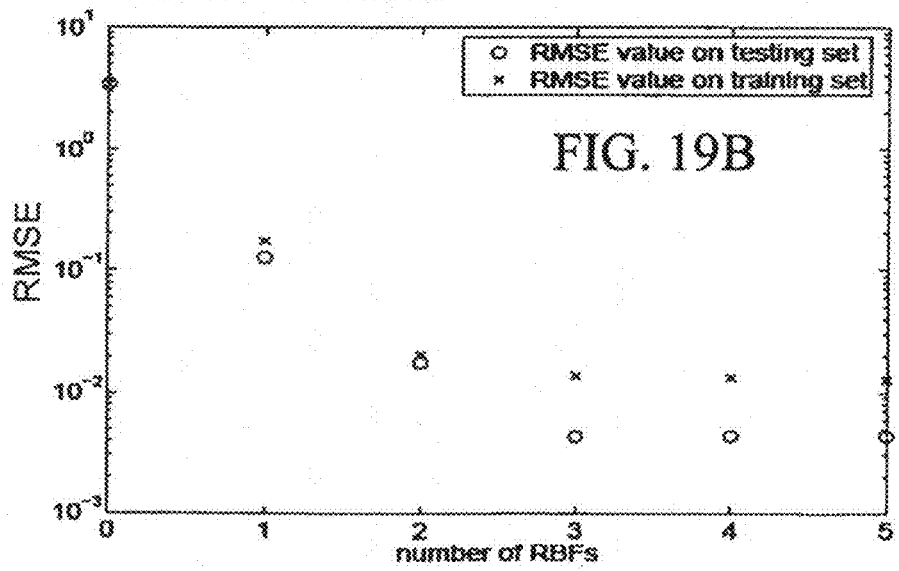
(b) The RMSE log plot of the model as new basis functions are added to the model.
FIG. 19A
FIG. 19B (c) The confidence level of the fitted model as the new basis functions are added to the model.

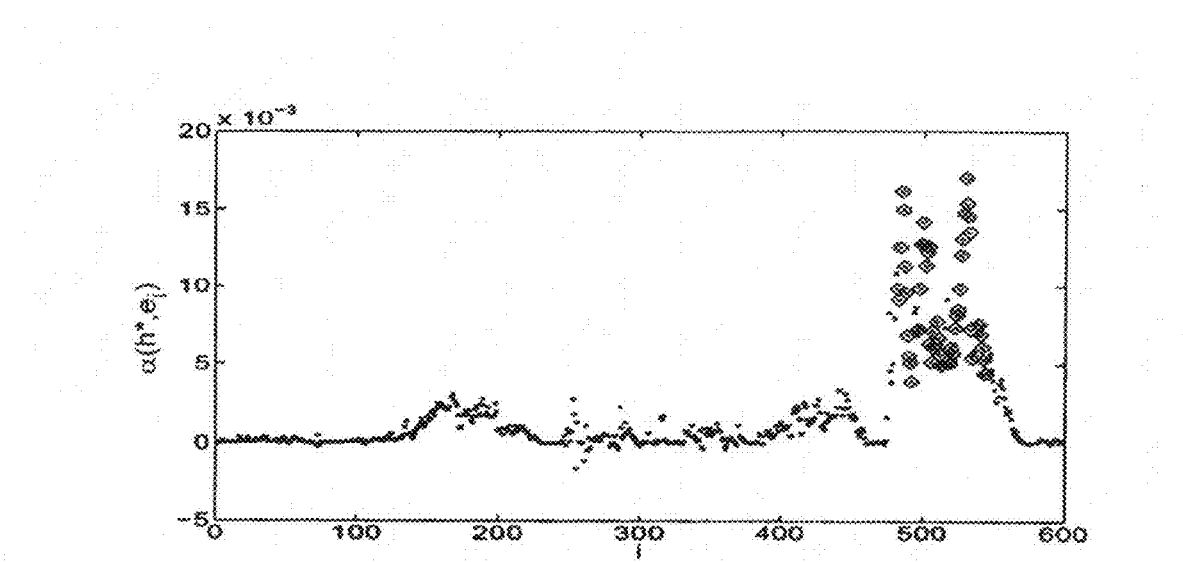
(a) The selected data points for the first center. FIG. 20A
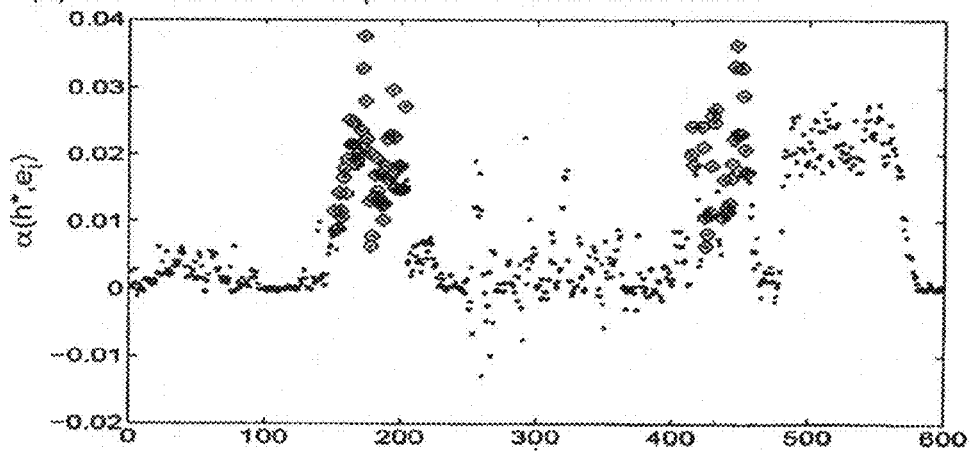
(b) The selected data points for the second center. FIG. 20B

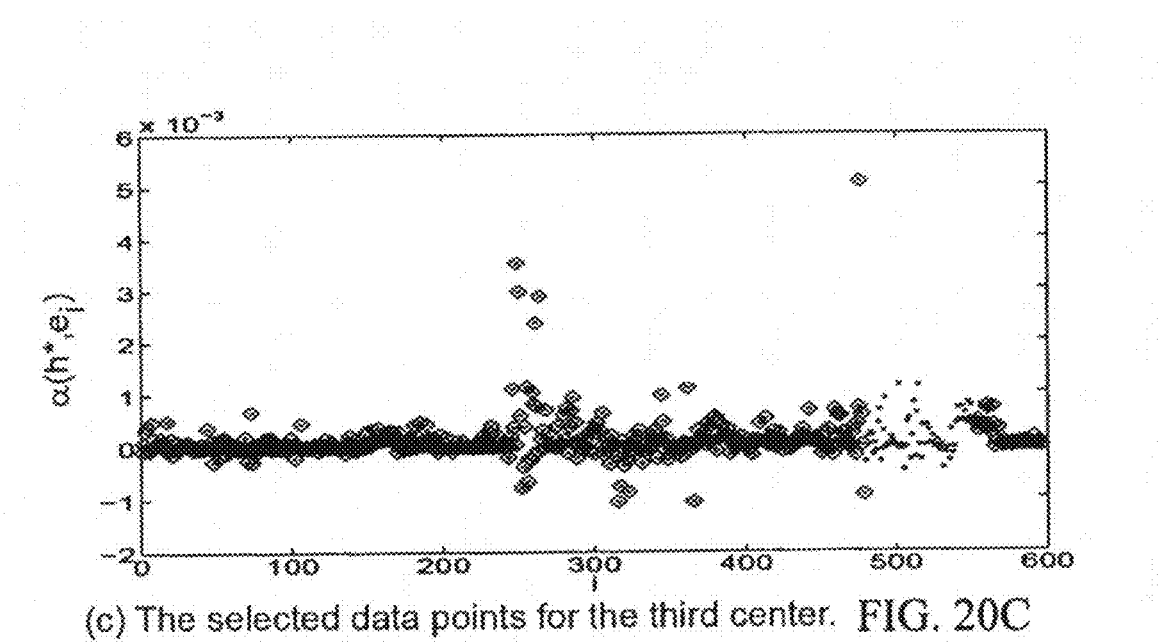
(c) The selected data points for the third center. FIG. 20C

NONLINEAR FUNCTION APPROXIMATION OVER HIGH-DIMENSIONAL DOMAINS

CROSS REFERENCE TO RELATED APPLICATIONS

The present application is a continuation of U.S. patent application Ser. No. 11/899,625, filed Sep. 5, 2007, which claims the benefit of U.S. Provisional Application Ser. No. 60/969,903, filed Sep. 4, 2007, and the present application claims the benefit of U.S. Provisional Application Ser. No. 60/842,401, filed Sep. 5, 2006; each of the above-identified applications are incorporated fully herein by reference.

STATEMENT OF GOVERNMENT INTEREST

Subject matter disclosed herein was partially supported by the National Science Foundation award DMS-0434351, DOD-USAF-Office of Scientific Research under contract FA9550-04-1-0094. Subject matter disclosed herein was also partially supported by National Science Foundation Grant No. ATM0530884. Additionally, subject matter disclosed herein was partially supported by DOD/Navy Grant No. N002444-07-1-0004. The government may have certain rights in the claimed invention.

BACKGROUND

The problem of extracting nonlinear relationships in large high-dimensional scattered data sets is of central importance across fields of science, engineering and mathematics. In particular, diverse areas such as machine learning, optimal control, mathematical modeling of physical systems often rely significantly on the ability to construct relationships from data. Subsequently there have been a multitude of applications including financial time-series analysis, voice recognition, failure prediction and artificial intelligence all of which provide evidence of the importance for nonlinear function approximation algorithms.

The beginnings empirical data fitting may be traced to Gauss's work on using least squares to construct linear models. Over the last two decades we have seen a tremendous growth in this area motivated by new ideas for computing nonlinear models. Numerous references of prior art articles are cited herein. In most cases, when a reference is referred to herein, it is cited by its number (in square brackets) from the References section hereinbelow. Thus, e.g., for computing nonlinear models, the following references [11, 45, 40, 37, 38] in the References Section disclose exemplary prior art techniques.

Diverse areas such as machine learning, optimal control, mathematical modeling of physical systems often rely significantly on the ability to construct relationships from data such as provided by constructing robust approximation models. Moreover, there have been a multitude of applications including financial time-series analysis, voice recognition, failure prediction and artificial intelligence all of which provide evidence of the importance for nonlinear function approximation algorithms. Our interest in this problem relates to representing data on a manifold as the graph of a function [8, 9] and the reduction of dynamical systems (see, e.g. [10]).

A common element in empirical data fitting applications is that the complexity of the required model including the number and scale of representation functions is not known a priori and must be determined as efficiently as possible. A variety of approaches have been proposed to determine the number of model functions, i.e., the model order problem. A generally accepted measure of quality of such data fitting algorithms is that the resulting models generalize well to testing data, i.e., data associated with the same process but that was not used to construct the model. This requirement is essentially that the data not be overfit by a model with too many parameters or underfit by a model with too few parameters.

One general approach to this problem is known as regularization, i.e., fitting a smooth function through the data set using a modified optimization problem that penalizes variation. A standard technique for enforcing regularization constraints is via cross-validation [18, 44]. Such methods involve partitioning the data into subsets of training, validation and testing data; for details see, e.g., [19].

Additionally, a variety of model growing and pruning algorithms have been suggested, e.g., (1) the upstart algorithm by M. Frean, "A Upstart Algorithm: A Method for Constructing and Training Feedforward Neural Networks," *Neural Computation,* 2 (2):198-209, 1990;

(2) the cascade correlation algorithm by S. E. Fahlman and C. Lebiere, "The cascade-correlation learning architecture," In D. S. Touretzky, editor, *Proceedings of the Connectionist Models Summer School,* volume 2, pages 524-432, San Mateo, Calif., 1988;

(3) the optimal brain damage algorithm by Y. Le Cun, J. S. Denker, and S. A. Solla, "Optimal brain damage", In D. S. Touretzky, editor, *Advances in Neural Information Processing Systems,* volume 2, pages 598-605. Morgan Kaufmann, San Mateo, Calif., 1990; and (4) the resource allocating network (RAN) proposed by Platt in "A Resource Allocating Network for Function Interpolation," *Neural Computation,* 3:213-225, 1991.

Statistical methods have also been proposed that include, e.g., Akaike information criteria (AIC), Bayesian information criteria (BIC) and minimum description length (MDL) [42], [2] and Bayesian model comparison [29]. In [39], [31] and [20] the issue of selecting the number of basis functions with growing and pruning algorithms from a Bayesian prospective have been studied. In [5], a hierarchical full Bayesian model for RBFs is proposed. The maximum marginal likelihood of the data has also been used to determine RBF parameters [34]. For a more complete list of references the reader, is referred to [21].

In general, model order determination via both regularization and growing and pruning algorithms can be computationally intensive and data hungry. More importantly, however, is that these algorithms do not explicitly exploit the geometric and statistical structure of the residuals (see Terms and Descriptions section hereinbelow) during the training procedure. In addition, many algorithms in the literature require that anywhere from a few to a dozen ad hoc parameters be tuned for each data set under consideration.

Accordingly, it is desirable to alleviate the modeling difficulties in the prior art, and in particular, at least provide model generating methods and systems that are computationally less intensive, and that reduce (preferably to zero) the number of model generation parameter required for generating a model of appropriate accuracy.

REFERENCES

The following are cited herein, and are fully incorporated herein by reference.

[1] In Edward J. Kansa and Yiu-Chung Hon, editors, *Computers and Mathematics with Applications*, volume 43, pages 275-619. Elsevier, 2002.

[2] H. Akaike. A New Book at Statistical Model Identification. *IEEE Transactions on Automatic Control*, AC-19: 716-723, 1974.

[3] M. Anderle. *Modeling Geometric Structure in Noisy Data*. Ph.D. dissertation, Colorado State University, Department of Mathematics, 2001.

[4] M. Anderle and M. Kirby. Correlation Feedback Resource Allocation RBFs. In *Proceedings of 2001 IEEE International Joint Conference on Neural Networks (IJCNN)*, volume 3, pages 1949-1953, Washington, D.C., July 2001.

[5] C. Andrieu, N. Freitas, and A. Doucet. Robust Full Bayesian Learning for Radial Basis Networks. *Neural Computation*, 13:2359-2407, 2001.

[6] C. M. Bishop. *Neural Networks for Pattern Recognition*. Oxford University Press, Oxford, U.K., 1995.

[7] P. J. Brockwell and R. A. Davis. *Time series: Theory and Methods*. Springer Series in Statistics. Springer, second edition, 1991.

[8] D. S. Broomhead and M. Kirby. A New Approach for Dimensionality Reduction: Theory and Algorithms. *SIAM Journal of Applied Mathematics*, 60 (6):2114-2142, 2000.

[9] D. S. Broomhead and M. Kirby. The Whitney Reduction Network: a Method for Computing Autoassociative Graphs. *Neural Computation*, 13:2595-2616, 2001.

[10] D. S. Broomhead and M. Kirby. Large Dimensionality Reduction Using Secant-based Projection Methods: The Induced Dynamics in Projected Systems. *Nonlinear Dynamics*, 41:47-67, 2005.

[11] D. S. Broomhead and D. Lowe. Multivariable Functional Interpolation and Adaptive Networks. *Complex Systems*, 2:321-355, 1988.

[12] J. V. Candy. *Signal processing: the Model-Based Approach*. McGraw-Hill Series in Electrical Engineering, Communications and Signal Processing. McGraw-Hill, 1986.

[13] Y. Le Cun, J. S. Denker, and S. A. Solla. Optimal brain damage. In D. S. Touretzky, editor, *Advances in Neural Information Processing Systems*, volume 2, pages 598-605. Morgan Kaufmann, San Mateo, Calif., 1990.

[14] S. E. Fahlman and C. Lebiere. The cascade-correlation learning architecture. In D. S. Touretzky, editor, *Proceedings of the Connectionist Models Summer School*, volume 2, pages 524-432, San Mateo, Calif., 1988.

[15] M. Frean. A Upstart Algorithm: A Method for Constructing and Training Feedforward Neural Networks. *Neural Computation*, 2 (2):198-209, 1990.

[16] B. Fritzke. Fast Learning with Incremental RBF Networks. *Neural Processing Letters*, 1 (1):2-5, 1994.

[17] B. Fritzke. Supervised Learning with Growing Cell Structures. In G. Tesauro J. Cowan and J. Alspector, editors, *Advances in Neural Information Processing Systems*, volume 6, pages 255-262. Morgan Kaufmann, San Mateo, Calif., 1994.

[18] F. Girosi, M. Jones, and T. Poggio. Regularization Theory and Neural Network Architectures. *Neural Computation*, 7:219-269, 1995.

[19] S. Haykin. *Neural Networks: A Comprehensive Foundation*. Prentice Hall, 2nd edition, 1999.

[20] C. C. Holmes and B. K. Mallick. Bayesian Radial Basis Functions of Variable Dimension. *Neural Computation*, 10 (5): 1217-1233, 1998.

[21] A. A. Jamshidi. A New Spatio-Temporal Resource Allocation Network (ST-RAN). Master's thesis, Colorado State University, Fall, 2004.

[22] A. A. Jamshidi. An Adaptive Underwater Target Classification System with a Decision Feedback Mechanism. Master's thesis, Colorado State University, Spring, 2002.

[23] A. A. Jamshidi and M. J. Kirby. Examples of Compactly Supported Functions for Radial Basis Approximations. In E. Kozerenko H. R. Arabnia and S. Shaumyan, editors, *Proceedings of The 2006 International Conference on Machine learning; Models, Technologies and Applications*, pages 155-160, Las Vegas, June 2006. CSREA Press.

[24] K. Kadirkamanathan. A Statistical Inference Based Growth Criterion for RBF Network. In *Proceedings of the IEEE Workshop on Neural Networks for Signal Processing IV*, pages 12-21, 1994.

[25] K. Kadirkamanathan and M. Niranjan. A Function Estimation Approach to Sequential Learning with Neural Networks. *Neural Computation*, 5 (6):954-975, 1993.

[26] M. Kirby and C. Anderson. Geometric Analysis for the Characterization of Nonstationary Time-Series. In E. Kaplan, J. Marsden, and K. R. Sreenivasan, editors, *Springer Applied Mathematical Sciences Series Celebratory Volume for the Occasion of the 70th Birthday of Larry Sirovich*, pages 263-292. Springer-Verlag, 2003.

[27] Y. Li, N. Sundararajan, and P. Saratchandran. Analysis of Minimal Radial Basis Function Network Algorithm for Real-time Identification of Nonlinear Dynamic Systems. *IEE Proceedings of Control Theory and Applications*, 147 (4):476-484, July 2000.

[28] L. Ljung. *System Identification Theory for the User*. Prentice Hall PTR, second edition, 1999.

[29] D. J. C. Mackay. A Practical Bayesian Framework for Backpropagation Networks. *Neural Computation*, 4 (3): 448-472, 1989.

[30] A. MacLachlan. An Improved Novelty Criterion for Resource Allocating Networks. In *Proceedings of the 5th International Conference on Artificial Neural Networks*, pages 48-52, 1997.

[31] A. D. Marrs. An Application of Reversible-jump MCMC to Multivariate Spherical Gaussian Mixtures. In M. I. Kearns and S. A. Solla, editors, *Advances in Neural Information Processing Systems*, volume 10, pages 577-583, Cambridge, Mass., 1998. MIT press.

[32] J. Moody and C. Darken. Fast Learning in Networks of Locally-tuned Processing Units. *Neural Computation*, 1:281-294, 1989.

[33] M. J. L. Orr. Introduction to Radial Basis Function Networks (1996). Technical report, Center for Cognitive Science, University of Edinburgh, Edinburgh, Scotland, April 1996.

[34] M. J. L. Orr. An EM Algorithm for Regularized RBF Networks. In *International Conference on Neural Networks and Brain Proceedings*, pages 251-254, Oct. 27-30, 1998. Publishing House of Electronis Industry, Box 173 Beijing, 100036 China.

[35] M. J. L. Orr. Recent Advances in Radial Basis Function Networks. Technical report, Institute for Adaptive and Neural Computation, Division of Informatics, Edinburgh University, Edinburgh, Scotland, June 1999.

[36] J. Platt. A Resource Allocating Network for Function Interpolation. *Neural Computation*, 3:213-225, 1991.

[37] M. J. D. Powell. Radial Basis Functions for Multivariable Interpolation: A review. In J. C. Mason and M. G. Cox,

[38] M. J. D. Powell. The Theory of Radial Basis Functions in 1990. In editor W. Light, editor, *Advances in Numerical Analysis*, volume II of *Wavelets, Subdivision Algorithms, and Radial Basis Functions*, pages 105-210. Oxford University Press, 1992.

[39] D. Insua Rios and P. Muller. Feedforward Neural Networks for Nonparametric Regression. In P. Muller D. K. Dey and D. Sinha, editors, *Practical Nonparametric and Semiparametric Bayesian Statistics*, pages 181-191, New York, 1998. Springer Verlag.

[40] D. E. Rumelhart and J. L. McClelland. Parallel Distributed Processing. MIT Press, Cambridge, Mass., 1986.

[41] R. Schaback. *Reconstruction of Multivariate Functions from Scattered Data*. preprint, University of Göttingen, 1997.

[42] P. Smyth. On Stochastic Complexity and Admissible Models for Neural Network Classifiers. In D. S. Touretzky R. Lippmann, J. Moody, editor, *Proceedings of Neural Information Processing Systems*, volume 3. Morgan Kaufmann, San Mateo, Calif., 1991.

[43] A. N. Tikhonov and V. Y. Arsenin. *Solutions of Ill-Posed Problems*. John Wiley & Sons, New York, 1977.

[44] G. Wahba. Spline Bases, Regularization, and Generalized Cross Validation for Solving Approximation Problems with Large Quantities of Data. In W. Cheney, editor, *Approximation Theory III*, pages 905-912. Academic Press, 1980.

[45] P. J. Werbos. *Beyond Regression: New Tools for Prediction and Analysis in the Behavioral Sciences*. Ph.D. dissertation, Harvard University, August 1974.

[46] B. Widrow and M. E. Hoff. Adaptive Switching Circuits. In 1960 *WESCON Convention Record Part IV*, Reprinted in J. A. Anderson and E. Rosenfeld, *Neurocomputing: Foundations of Research*, pages 96-104, Cambridge, Mass., 1988, 1960. The MIT Press.

[47] L. Yingwei, N. Sundararajan, and P. Saratchandran. A Sequential Scheme for Function Approximation Using Minimal Radial Basis Function Neural Networks. *Neural Computation*, 9:461-478, 1997.

[48] L. Yingwei, N. Sundararajan, and P. Saratchandran. Performance Evaluation of a Sequential Minimal Radial Basis Function (RBF) Neural Network Learning Algorithm. *IEEE Transactions on Neural Networks*, 9 (2):308-318, March 1998.

[49] W. Ahmed, D. M. Hummels, and M. T. Musavi. Adaptive RBF Neural Network in Signal Detection. In 1994 *IEEE International Symposium on Circuits and Systems, ISCAS*, volume 6, pages 265-268, May-June 1994.

[50] M. Aiyar, S. Nagpal, N. Sundararajan, and P. Saratchandran. Minimal Resource Allocation Network (MRAN) for Call Admission Control (CAC) of ATM Networks. In *Proceedings of IEEE International Conference on Networks (ICON)*, page 498, September 2000.

[51] S. Amari, O. E. Barndorff-Nielsen, R. E. Kass, S. L. Lauritzen, and C. R. Rao. *Differential Geometry in Statistical Inference*. Institute of Mathematical Statistics Lecture Notes-Monograph Series. Institute of Mathematical Statistics, 1987.

[52] S. Amari and H. Nagaoka. *Methods of Information Geometry*. Translations of Mathematical Monographs. American Mathematical Society, 2001.

[53] R. B. Arellano-Valle and M. G. Genton. On Fundamental Skew-symmetric Distributions. *Journal of Multivariate Analysis*, 96:93-116, 2005.

[54] R. B. Arnold and R. J. Beaver. The Skew-Cauchy Distribution. *Statistics and Probability Letters*, 49 (3): 285-290, September 2000.

[55] F. Azam and H. F. VanLandingham. An Alternate Radial Basis Function Neural Network Model. In 2000 *IEEE International Conference on Systems, Man, and Cybernetics*, volume 4, pages 2679-2684, 8-11 Oct. 2000.

[56] A. Azzalini. A Class of Distributions which Includes the Normal Ones. *Scand. J. Statist.*, 12:171-178, 1985.

[57] A. Azzalini. Further Results on a Class of Distributions which Includes the Normal Ones. *Statistica*, 46:199-208, 1986.

[58] A. Azzalini and A. Capitanio. Statistical Applications of the Multivariate Skew-normal Distribution. *Journal Royal Statistical Society*, 61 (B):579-602, 1999.

[59] A. Azzalini and A. Capitanio. Distributions Generated by Perturbation of Symmetry with Emphasis on a Multivariate Skew t Distribution. *Journal of Royal Statistical Society*, 65 (B):367-389, 2003.

[60] A. Azzalini and A. Dalla Valle. The Multivariate Skew-normal Distribution. *Biometrika*, 83:715-726, 1996.

[61] K. Ball. Eigenvalues of Euclidean Distance Matrices. *Journal of Approximation Theory*, 68:74-82, 1992.

[62] K. Ball, N. Sivakumar, and J. D. Ward. On the Sensitivity of Radial Basis Interpolation to Minimal Data Separation Distance. *Constructive Approximation*, 8 (401-426), 1992.

[63] D. Barden and C. Thomas. *An Introduction to Differential Manifolds*. Imperial College Press, 2003.

[64] J. T. Barnett and B. Kedem. Zero-crossing Rates of Functions of Gaussian Processes. *IEEE Transactions on Information Theory*, 37 (4):1188-1194, July 1991.

[65] J. T. Barnett and B. Kedem. Zero-crossing Rates of Mixtures and Products of Gaussian Processes. *IEEE Transactions on Information Theory*, 44 (4):1672-1677, July 1998.

[66] J. Behboodian, A. Jamalizadeh, and N. Balakrishnan. A New Class of Skew-Cauchy Distributions. *Statistics and Probability Letters*, 76 (14):1488-1493, August 2006.

[67] A. L. Besse. *Einstein Manifolds*. Ergebnisse der Mathematik und ihrer Grenzgebiete. 3. Folge. Band 10/A Series of Modern Surveys in Mathematics. Springer, 1st edition, July 2002.

[68] N. M. Blachman. Zero-crossing Rate for the Sum of Two Sinusoids or Signal Plus Noise. *IEEE Transactions on Information Theory*, 21 (6):671-675, November 1975.

[69a] S. Bochner. *Vorlesungen über Fouriersche Integrale*. Akademische Verlagsgesellschaft, Leipzig, 1932.

[69] M. Bozzini, L. Lenarduzzi, M. Rossini, and R. Schaback. Interpolation by Basis Functions of Different Scales and Shapes. *CALCOLO*, 41:77-87, 2004.

[70] M. D. Brancoa and D. K. Dey. A General Class of Multivariate Skew-Elliptical Distributions. *Journal of Multivariate Analysis*, 79 (1):99-113, October 2001.

[71] M. Brand. Charting a Manifold. In *Neural Information Processing Systems* 15 (*NIPS'2002*), Vancouver, Canada, Dec. 9-14, 2002.

[72] A. Brass, B. J. Pendleton, Y. Chen, and B. Robson. Hybrid Monte Carlo Simulations Theory and Initial Comparison with Molecular Dynamics. *Biopolymers*, 33 (8): 1307-1315, 1993.

[73] M. D. Buhmann. *Radial Basis Functions*. Cambridge University Press, 2003.

[74] W. L. Buntine and A. S. Weigend. Bayesian Back Propagation. *Complex Systems*, 5:603-643, 1991.

[75] A. Einstein. Method for the Determination of the Statistical Values of Observations Concerning Quantities Sub-

[76] A. Erfanian and M. Gerivany. EEG Signals can be Used to Detect the Voluntary Hand Movements by Using an Enhanced Resource-Allocating Neural Network. In *Proceedings of the 23rd Annual International Conference of the IEEE Engineering in Medicine and Biology Society*, volume 1, pages 721-724, October 2001.

[77] B. Fornberg, E. Larsson, and G. Wright. A New Class of Oscillatory Radial Basis Functions. *Computers and Mathematics with Applications*, 51:1209-1222, 2006.

[78] W. A. Gardner. Introduction to Einstein's Contribution to Time-series Analysis. *IEEE ASSP Magazine*, 4 (4):4-5, October 1987.

[79] P. J. Green. Reversible Jump Markov Chain Monte Carlo Computation and Bayesian Model Determination. *Biometrika*, 82:711-732, 1995.

[80] A. K. Gupta, G. Gonzlez-Faras, and J. A. Domnguez-Molina. A Multivariate Skew Normal Distribution. *Journal of Multivariate Analysis*, 89 (1):181-190, April 2004.

[81] B. Hassibi and D. G. Stork. Second Order Derivatives for Network Pruning: Optimal Brain Surgeon. In S. J. Hanson, J. D. Cowan, and C. L. Giles, editors, *Proceedings Advances in Neural Information Processing Systems*, volume 5, pages 164-171. Morgan Kaufmann, San Mateo, Calif., 1993.

[82] F. D E Helguero. Sulla Rappresentazione Analitica Delle Curve Abnormali. In G. Castelnuovo, editor, *Atti del IV Congesso Internazionale dei Matematici*, volume III, pages 287-299, Roma, Italy, 6-11 Apr. 1909. Roma R. Accademia dei Lincei.

[83] S. L. Ho, M. Fei, W. N. Fu, H. C. Wong, and E. W. C. Lo. Integrated RBF Network Based Estimation Strategy of the Output Characteristics of Brushless DC Motors. *IEEE Transactions on Magnetics*, 38 (2):1033-1036, March 2002.

[84] R. H. Hooker. Correlation of the Marriage-rate with Trade. *Journal of the Royal Statistical Society*, 64:485-492, 1901.

[85] W. Huanga and Y. Chenb. Generalized Skew-Cauchy Distribution. *Statistics and probability letters*, 77 (11): 1137-1147, June 2007.

[86] D. Hundley, M. Kirby, and R. Miranda. Empirical dynamical system reduction II: Neural charts. In K. Coughlin, editor, Semi-analytic Methods for the Navier-Stokes Equations (Montreal, 1995), volume 20 of *CRM Proc. Lecture Notes*, pages 65-83, Providence, R.I., 1999. American Mathathematical Society.

[87] D. R. Hundley. Local Nonlinear Modeling via Neural Charts. Ph.D. dissertation, Colorado State University, Department of Mathematics, 1998.

[88] J. M. Hutchinson, A. W. Lo, and T. Poggio. A Nonparametric Approach to Pricing and Hedging Derivative Securities via Learning Networks. *The Journal of Finance*, XLIX (3):851-889, July 1994.

[89] A. A. Jamshidi and M. J. Kirby. Towards a Black Box Algorithm for Nonlinear Function Approximation over High-Dimensional Domains. *SIAM Journal of Scientific Computation*, 29 (3):941-963, May 2007.

[90] A. A. Jamshidi and M. J. Kirby. Modeling Multivariate Time Series on Manifolds with Skew Radial Basis Functions. Submitted to Journal of Neural Computation.

[91] A. A. Jamshidi and M. J. Kirby. A General Approach to Non-linear Function Fitting with Convergence Properties. *SIAM Journal of Applied Mathematics*, to be submitted in 2007.

[92] A. A. Jamshidi and M. J. Kirby. Skew-Radial Basis Function Expansions for Empirical Modeling. *SIAM Journal of Applied Mathematics*, accepted in press.

[93] N. Jankowski and V. Kadirkamanathan. Proceedings Statistical Control of RBFLike Networks for Classification. In *ICANN*, pages 385-390, 1997.

[94] D. Jianping, N. Sundararajan, and P. Saratchandran. Nonlinear Magnetic Storage Channel Equalization using Minimal Resource Allocation Network (MRAN). *IEEE Transactions on Neural Networks*, 12 (1):171-174, January 2001.

[95] D. Jianping, N. Sundararajan, and P. Saratchandran. Communication Channel Equalization using Complex-valued Minimal Radial Basis Function Neural Networks. *IEEE Transactions on Neural Networks*, 13 (3):687-696, May 2002.

[96] M. C. Jones and M. J. Faddy. A Skew Extension of the t Distribution, with Applications. *Journal of The Royal Statistical Society Series B*, 65 (1):159-174, 2003.

[97] N. B. Karayiannis and G. W. Mi. Growing Radial Basis Neural Networks: Merging Supervised and Unsupervised Learning with Network Growth Techniques. *IEEE Transactions on Neural Networks*, 8 (6):1492-1506, November 1997.

[98] N. B. Karayiannis and M. M. Randolph-Gips. On the Construction and Training of Reformulated Radial Basis Function Neural Networks. *IEEE Transactions on Neural Networks*, 14 (4):835-846, July 2003.

[99] B. Kedem. Binary Time Series. Marcel Dekker Inc, New York and Basel, February 1980.

[100] B. Kedem. Detection of Hidden Periodicities by Means of Higher Order Crossings I, II. Technical Report TR84-55 and TR84-56, University of Maryland, Department of Mathematics, 1984.

[101] B. Kedem. A Graphical Similarity Measure for Time Series Models. Technical Report TR85-10, University of Maryland, Department of Mathematics, 1985.

[102] B. Kedem. Spectral Analysis and Discrimination by Zero Crossings. In *Proceedings of the IEEE*, volume 74, pages 1477-1493, November 1986.

[103] B. Kedem and G. Reed. On the Asymptotic Variance of Higher Order Crossings with Special Reference to a Fast White Noise Test. *Biometrika*, 73:143-149, April 1986.

[104] M. Kendall and A. Stuart. *The Advanced Theory of Statistics: Design and Analysis, and Time-Series*, volume 3. Hafner Publishing Co., New York, 3rd edition, 1976.

[105] M. Kirby. Ill-Conditioning and Gradient Based Optimization of Multi-Layer Perceptrons. In J. G. McWhirter and I. K. Proudler, editors, *Mathematics in Signal Processing IV*, The Institute of Mathematics and Its Applications Conference Series: No. 67, pages 223-237. Oxford University Press, 1998.

[106] M. Kirby. *Geometric Data Analysis: An Empirical Approach to Dimensionality Reduction and the Study of Patterns*. Wiley, New York, 2001.

[107] M. Kirby and R. Miranda. Nonlinear parametric neural charts. Technical report, Colorado State University, Department of Mathematics, 1995.

[108] S. Kobayashi and K. Nomizu. *Foundations of Differential Geometry*, volume I. Wiley-Interscience, 1963.

[109] S. Kobayashi and K. Nomizu. *Foundations of Differential Geometry*, volume II. Wiley-Interscience, 1969.

[110] C. Kumar, P. Saratchandran, and N. Sundararajan. Minimal Radial Basis Function Neural Networks for Nonlinear Channel Equalization. In *IEE Proceedings-Vision, Image and Signal Processing*, volume 147, pages 428-435, October 2000.

[111] C. C. Lee, C. C. Chung, J. R. Tsai, and C. I. Chang. Robust Radial Basis Function Neural Networks. *IEEE Transactions on Systems, Man and Cybernetics, Part B*, 29 (6):674-685, December 1999.

[112] K. Y. Lee and S. Jung. Extended Adaptive RBF Equalizer for Overcoming Co-channel Interference. *Electronics Letters*, 34 (16): 1567-1568, August 1998.

[113] J. Mercer. Functions of Positive and Negative Type, and their Connection with the Theory of Integral Equations. *Transactions of the London Philosophical Society (A)*, 209:819-835, 1909.

[114] C. A. Micchelli. Interpolation of Scattered Data: Distance Matrices and Conditionally Positive Definite Functions. *Constructive Approximation*, 2:11-22, 1986.

[115] A. A. Michelson and S. W. Stratton. A New Harmonic Analyzer. *American Journal of Science*, pages 1-13, 1898.

[116] H. L. Moore. *Economic Cycles: Their Law and Cause*. Macmillan, New York, 1914.

[117] F. J. Narcowich, N. Sivakumar, and J. D. Ward. On Condition Numbers Associated with Radial-function Interpolation. *Journal of Mathematical Analysis and Applications*, 186:457-485, 1994.

[118] F. J. Narcowich and J. D. Ward. Norm Estimates for the Inverse of a General Class of Scattered-data Radial-function Interpolation. *Journal of Approximation Theory*, 69:84-109, 1992.

[119] M. R. Neal. *Bayesian Learning for Neural Networks*. Springer Verlag, New York, 1996.

[120] P. W. Pachowicz and S. W. Balk. Adaptive RBF Classifier for Object Recognition in Image Sequences. In *Proceedings of the IEEE-INNS-ENNS International Joint Conference on Neural Networks, IJCNN*, volume 6, pages 600-605, July 2000.

[121] J. Park and I. W. Sandberg. Universal Approximation Using Radial-Basis-Function Networks. *Neural Computation*, 3:246-257, 1991.

[122] J. Park and I. W. Sandberg. Approximation and Radial-Basis-Function Networks. *Neural Computation*, 5:305-316, 1993.

[123] S. O. Rice. Mathematical Analysis of Random Noise. *Bell Systems Technical Journal*, 24:46-156, January 1945.

[124] S. Richardson and P. J. Green. On Bayesian Analysis of Mixtures with an Unknown Number of Components. *Journal of the Royal Statistical Society*, 59 (4):731-792, 1997.

[125] D. I. Rios and P. Muller. Feedforward Neural Networks for Nonparametric Regression. In D. K. Dey, P. Muller, and D. Sinha, editors, *Practical Nonparametric and Semiparametric Bayesian Statistics*, pages 181-191, New York, 1998. Springer Verlag.

[126] S. Roweis and L. Saul. Nonlinear Dimensionality Reduction by Locally Linear Embedding. *Science*, 290 (5500):2323-2326, December 2000.

[127] S. Roweis, L. Saul, and G. Hinton. Global Coordination of Local Linear Models. In *Neural Information Processing Systems* 15 (NIPS'2002), Vancouver, Canada, December 9-14.

[128] R. Schaback. Lower Bounds for Norms of Inverses of Interpolation Matrices for Radial Basis Functions. *Journal of Approximation Theory*, 79 (2):287-306, 1994.

[129] R. Schaback. Error Estimates and Condition Numbers for Radial Basis Function Interpolation. *Advances in Computational Mathematics*, 3:251-264, 1995.

[130] R. Schaback and H. Wendland. Characterization and Construction of Radial Basis Functions. In N. Dyn, D. Leviatan, D. Levin, and A. Pinkus, editors, *Multivariate Approximation and Applications, Eilat Proceedings*, pages 1-24. Cambridge University Press, 2000.

[131] I. J. Schoenberg. Metric spaces and completely monotone functions. *Ann. of Math.*, 39:811-841, 1938.

[132] B. Scholkopf, S. Kah-Kay, C. J. C. Burges, F. Girosi, P. Niyogi, T. Poggio, and V. Vapnik. Comparing Support Vector Machines with Gaussian Kernels to Radial Basis Function Classifiers. *IEEE Transactions on Signal Processing*, 45 (11):2758-2765, November 1997.

[133] X. Sun. Norm Estimates for Inverse of Euclidean Distance Matrices. *Journal of Approximation Theory*, 70:339-347, 1992.

[134] H. Takeda, S. Farsiu, and P. Milanfar. Kernel Regression for Image Processing and Reconstruction. *IEEE Transactions on Image Processing*, 16 (2):349-366, February 2007.

[135] Y. W. Teh and S. Roweis. Automatic Alignment of Local Representations. In *Neural Information Processing Systems* 15 (NIPS'2002).

[136] J. B. Tenenbaum, V. de Silva, and J. C. Langford. A Global Geometric Framework for Nonlinear Dimensionality Reduction. *Science*, 290 (5500): 2319-2323, December 2000.

[137] J. A. Thorpe. *Elementary Topics in Differential Geometry*. Undergraduate Texts in Mathematics. Springer, 1st edition, April 1979.

[138] N. Tsapatsoulis, M. Wallace, and S. Kasderidis. Improving the Performance of Resource Allocation Networks through Hierarchical Clustering of High Dimensional Data. In *Proceedings of International Conference on Artificial Neural Networks, ICANN*, pages 867-874, 2003.

[139] V. N. Vapnik. *Statistical Learning theory*. Wiley-Interscience, New York, 1998.

[140] J. J. Verbeek, S. T. Roweis, and N. Vlassis. Non-linear CCA and PCA by Alignment of Local Models. In *Neural Information Processing System* 16 (NIPS'2003).

[141] A. Wahed and M. M. Ali. The Skew-Logistic Distribution. *J Statist. Res.*, 35:71-80, 2001.

[142] H. Wendland. Piecewise Polynomial, Positive Definite and Compactly Supported Radial Functions of Minimal Degree. *Advances in Computational Mathematics*, 4 (1): 389-396, December 1995.

[143] H. Wendland. *Scattered Data Approximation*. Cambridge University Press, 2005.

[144] Z. Wu. Multivariate Compactly Supported Positive Definite Radial Functions. *Advances in Computational Mathematics*, 4:283-292, 1995.

[145] G. Xu and V. Chandrasekar. Radar Rainfall Estimation from Vertical Reflectivity Profile Using Neural Network. In *IEEE 2001 International Geoscience and Remote Sensing Symposium, IGARSS*, volume 7, pages 3280-3281, July 2001.

[146] A. M. Yaglom. Einstein's 1914 Paper on the Theory of Irregularly Fluctuating Series of Observations. *IEEE ASSP Magazine*, 4 (4):7-10, Oct. 1987.

[147] K. Yamauchi, N. Yamaguchi, and N. Ishii. Incremental Learning Methods with Retrieving of Interfered Patterns. *IEEE Transactions on Neural Networks*, 10 (6):1351-1365, November 1999.

[148] M. Zhihong, X. H. Yu, K. Eshraghian, and M. Palaniswami. A Robust Adaptive Sliding Mode Tracking Control Using an RBF Neural Network for Robotic Manipulators. In *Proceedings of IEEE International Conference on Neural Networks*, volume 5, pages 2403-2408, November-December 1995.

TERMS AND DESCRIPTIONS

Radial Basis Functions. Radial Basis Functions (RBFs) were introduced for the function approximation problem as an alternative to multilayer perceptrons [11]. Part of their appeal is the variety of efficient algorithms available for their construction. In the extreme, the basis functions may be selected randomly (following the distribution of the data) with fixed scales. In this instance the resulting optimization problem is simply an over-determined least squares problem to determine the expansion coefficients. One may improve on this approach at modest expense by employing a clustering algorithm to determine the basis function centers [32]. Furthermore, RBFs may be adapted with rank one updates or downdates [33, 35]. Over the years RBFs have been used successfully to solve a wide-range of function approximation and pattern classification problems [6, 21]. More recently, RBFs have been proposed as a tool for the simulation of partial differential equations, see, e.g., [1].

An RBF expansion is a linear summation of special non-linear basis functions (although there seems to be some ambiguity in the literature in that both the expansion and the expansion functions may be referred to as RBFs). In general, an RBF is a $$f(x) = Ax + \alpha_0 + \sum_{k=1}^{K} \alpha_k \phi_k(\|x - c_k\|w), \quad (2.1)$$

where $\chi$ is an input pattern, $\phi_k$ is the kth radial basis function centered at location $c_k$, and $\alpha_k$ denotes the weight for kth RBF and A is an m×n matrix. The term W denotes the parameters in the weighted inner product $$\|\chi\|_W = \sqrt{\chi^T W \chi}.$$

mapping $f\colon R^n \to R^m$.

Note that the metric ||*|| used in the above equations may be the standard Euclidean norm or an Lp norm where 1<=p<infinity or an 1-infinity norm, and in each case, the weighting matrix W is selected from nonsingular matrices to optimize a data fitting procedure using nonlinear programming techniques well known in the art; e.g., conjugate gradient, Newton's method, and other quasi-Newton methods. The term $Ax+\alpha_0$ affords an affine transformation of the data and is useful so that the nonlinear terms are not attempting to fit flat regions. More general polynomials may be used for this purpose [41]. As usual, the dimensions of the input n and output m are specified by the dimensions of the input-output pairs.
Residual. The difference between an actual value, and a value determined by a model approximating the actual value.
IID. An abbreviation of "independent and identically distributed". That is, in the present disclosure the term "IID" is directed to the residuals obtained from an approximation of a particular data set being modeled. In particular, the approximation method and system disclosed hereinbelow determines whether such residuals are IID.
Domain Neighborhood (Spatio-temporal window): An extent consisting of a cluster of data in a local region of the input data (i.e., in the domain space of the approximation model (to be) generated). E.g., if a process is evolving both in space and time then a domain neighborhood is referred to as a spatio-temporal window, or alternatively as a space-time ball. Such a spatio-temporal window is distinguished from a temporal window in that points in spatio-temporal window may have been generated at any time whereas a temporal window contains only data that was produced in the time interval that defines the window.

SUMMARY

A novel approximation method and system for performing nonlinear function approximation or modeling for scattered data is disclosed. In particular, such modeling is performed without requiring the use of ad hoc parameters. The approximation method and system is based on detecting (any) structure in residuals between the data and its approximation. Accordingly, structure or information content in the residuals is quantified via a statistical hypothesis test to determine whether the residuals are IID (as described in the Terms and Description section hereinabove). In particular, an hypothesis test is iteratively applied to the residuals for determining whether a new approximation function (e.g., a basis function, and more particularly, a radial basis function as described in the Terms and Description section above) should be added, and if so, where should the support for the new approximation be located relative to samples of the data set. When a determination is made that this test has been passed using the 95% confidence criterion it may be inferred that there is no (geometric) structure left in the residuals and thus no additional approximation functions are added to the model.

One aspect of the present approximation method and system is its application to high dimensional domains (e.g., domains having 2 or more dimensions) using a spatio-temporal ball rather than a temporal window (as in [3, 4]) for constructing local training sets from the data set being modeled. This innovation is particularly critical if the data set is periodic or quasi-periodic or, more generally, can be represented on a manifold.

Since the approximation method and system does not use ad hoc parameters that must be set per data set modeled, no parameters are varied nor tuned for particular data sets. Thus, diverse data sets can be modeled without making any changes to embodiments of the approximation method and system. This aspect greatly accelerates approximation of the data set being modeled.

In at least one embodiment of the approximation method and system, radial basis functions are used as the approximation functions. However, it is within the scope of the present disclosure that other type of approximation functions may be used in various embodiments of the approximation method and system, in particular, multi-layer perceptrons, and/or feed-forward neural networks.

To illustrate the absence of ad hoc parameters, numerous example data sets are presented and approximated hereinbelow by exactly the same programmatic embodiment of the novel approximation method and system disclosed herein. That is, no adjustments or parameter settings were made to the programmatic embodiment based on the data set being approximated. Hence, the present approximation method and system approaches a black-box methodology for nonlinear function approximation. This feature of the present approximation method and system permits the advancement of a variety of other processes, e.g., the representation of data on manifolds as graphs of functions [8, 9], pattern classification [22, 26], as well as the low-dimensional modeling of dynamical systems [10].

For simplicity, it is assumed herein that a data set to be modeled by the present approximation method and system represents a functional relationship, or signal, with IID additive noise. For fitting data without noise, such as data generated to high precision by numerical simulations, it is useful to add IID noise to the signal before applying the algorithm. Also note, however, that if the functional relationship or signal contains multiplicative noise we can take the natural logarithm of the functional relationship or signal to make the IID additive as one of skill in the art will understand.

It is an aspect of the present approximation method and system to use a spatio-temporal window, i.e., space-time balls (as described in the Terms and Description section hereinabove), for determining the samples within the data set being modeled when determining what portion of the data set is to be fitted with a new approximation function. It is believed that the use of such a spatio-temporal window is critical for approximating a data set over high-dimensional domains, and in particular, for a data set generated by dynamical systems such as those arising in a physical apparatus such as a heat exchanger and a chemical processing plant, or those arising in financial markets such as the value of a stock or stock index. In addition such dynamical systems arise in scientific and physical models such as the Navier Stokes equations in fluid dynamics as one skilled in the art will understand. The applicants have observed that significantly more data samples are located in such space-time balls than in the temporal windows used in prior art approximation techniques, in particular see [3, 4]. Moreover, it has been observed that the use of such spatio-temporal windows results in the construction of significantly improved models.

Additionally, we extend the prior art by proposing an algorithm where the model output lives in spaces of dimension more than one. The simplest approach is to use as many models as the dimension of the output space (one for each dimension). Alternatively, a more parsimonious representation arises when we extend the IID test on the residuals to the multivariate case.

The present approximation method and system may be used successfully with data sets from signals composed with additive IID noise. This is an extension over prior approximation techniques based on statistical hypotheses that are substantially restricted to Gaussian noise, or that do not provide information concerning where the basis functions should be placed.

The present approximation method and system may be used to model batch or predetermined data sets, or to model streaming data sets that are determined, e.g., in (near) real-time. Moreover, the present approximation method and system does not require the streaming data to be repeatedly reviewed as some "on-line" approximation techniques require. Also, although the algorithm was presented here in the context of growing radial basis functions, in principle it can be employed with other architectures for fitting nonlinear functions.

Additional features and benefits will become evident from the accompanying drawing and the description hereinbelow. Such additional feature and benefits are considered subject matter for seeking patent protection even though they may not be identified or discussed in this Summary section. In particular, the invention herein is defined by the claims as supported by the entire specification.

BRIEF DESCRIPTION OF THE DRAWINGS

The patent or application file contains at least one drawing executed in color. Copies of this patent or patent application publication with color drawings will be provided by the Office upon request and payment of the necessary fee.

FIGS. 1A-1C shows a pseudo code version of a novel algorithm for generating an approximation model, MODEL, from a training data set using basis functions (and in particular, radial basis functions) to generate MODEL.

FIGS. 2A through 2C show the graphs of activation or basis functions that may be used to generate radial basis functions used in the pseudo code of FIGS. 1A-1C. Note, that the mollifier function of FIG. 2A and the quarter circle functions are believed to be particularly novel as activation functions.

FIG. 3A shows a graph of the pringle data set that is known in the art.

FIG. 3B shows a data set to be modeled that is based on the pringle graph, wherein noise has been introduced.

FIGS. 5A through 5D show the location and shape of the graphs $504a$ through $504d$ of the four RBFs that are generated by the algorithm of FIGS. 1A-1C when modeling the data set of FIG. 3B before the IID stopping criteria described hereinabove is satisfied.

FIG. 8 shows the pseudo code of an embodiment of an algorithm for generating an approximation model for multivariate output, the pseudo code here is similar to FIGS. 1A-1C, but with somewhat different notation.

FIG. 9 shows the pseudo code of another embodiment of an algorithm for generating an approximation model for multivariate output, the pseudo code here is also similar to FIGS. 1A-1C, but with somewhat different notation.

FIG. 10A shows the training and testing data sets for a time series from a single mode skew Gaussian with Gaussian IID noise with standard deviation of 0.01.

FIG. 10B shows a graph of an approximation model using modulated Gaussian-Gaussian RBFs in the algorithm whose pseudo code is shown in FIGS. 1A-1C.

FIG. 11A shows a graph of an approximation model using regular Gaussian RBFs in the algorithm whose pseudo code is shown in FIGS. 1A-1C.

FIG. 11B shows a graph of the RMSE versus the number of regular Gaussian RBFs added when generating the approximation model graphed in FIG. 11A.

FIGS. 12A, 12B, and 12C, respectively show the behavior of the one-dimensional Gaussian-Gaussian, Cauchy-Cauchy, and Gaussian-Cauchy RBFs.

FIGS. 13A and 13B show two dimensional Gaussian-Gaussian and Cosine-Cauchy RBFs and their associated contour plots.

FIG. 14A shows the initial ACF(h) (computed on the training data; i.e., step 140 of FIGS. 1A-1C) for the Mackey-Glass Time Series.

FIG. 14B shows the final ACFs of the residuals (used in steps 144 through 188 of FIGS. 1A-1C) that indicates that the model fitting process should be terminated given 95% confidence has been achieved when modeling the Mackey-Glass Time Series.

FIG. 15A shows a plot of $\gamma(h^*)$ as new basis functions are added to the approximation model being generated when modeling the Mackey-Glass Time Series.

FIG. 15B shows a plot of the RMSE of the approximation model being generated as new basis functions are added to the model for modeling the Mackey-Glass Time Series.

FIG. 19A shows a plot of $\gamma(h^*)$ as new basis functions are added to the approximation model being generated when modeling the daily values of the Deutsche Mark/French Franc exchange rate data.

FIG. 19B shows a plot of the RMSE of the approximation model being generated as new basis functions are added to the model for modeling the daily values of the Deutsche Mark/French Franc exchange rate data.

FIGS. 20A through 20C show the Deutsche Mark/French Franc exchange rate data for the first 3 main RBFs approximation model generated. Note the need for the spatio-temporal window as evidenced in particular by FIGS. 20B and 20C. FIG. 20B shows two distinct time regions contributing to the local data indicating either a periodic or quasi-periodic behavior.

DETAILED DESCRIPTION

Figure 4A:
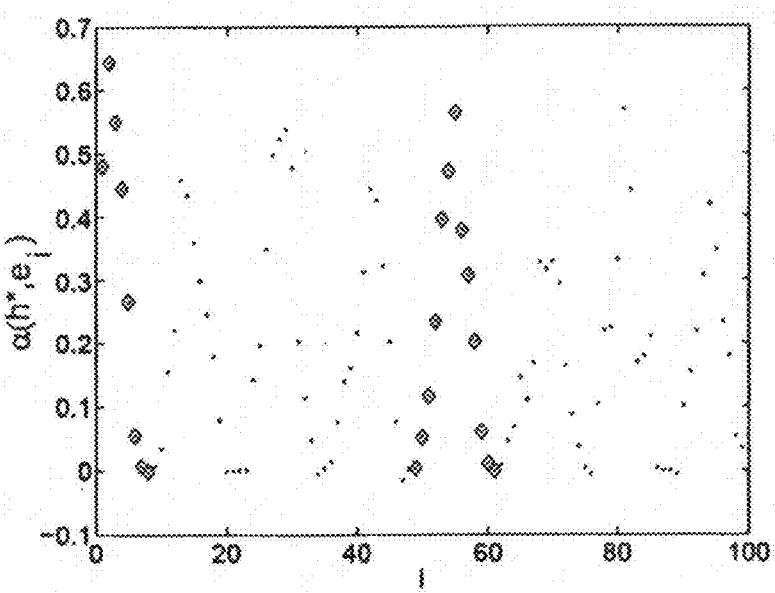
FIGS. 4A through 4D show plots of the autocorrelation (ACC) functions for the four major radial basis functions that capture the underlying structure of the data set of FIG. 3B.
Figure 4B:
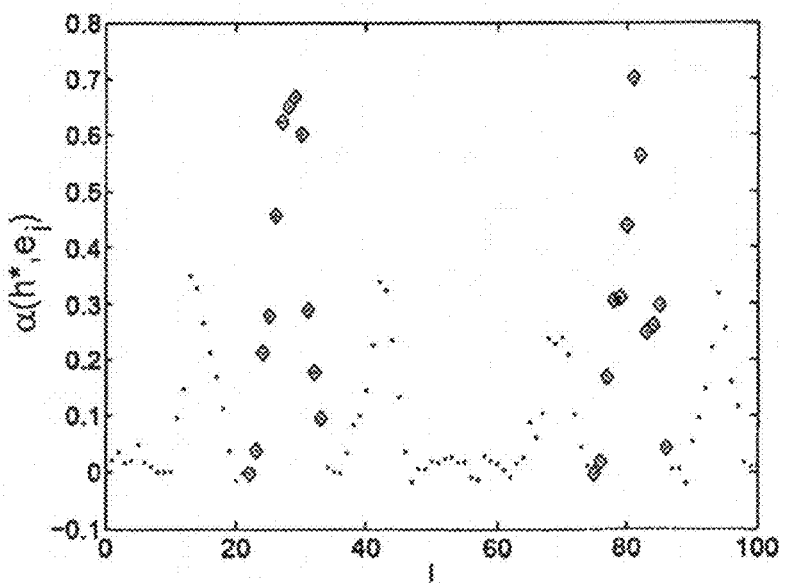
Figure 4C:
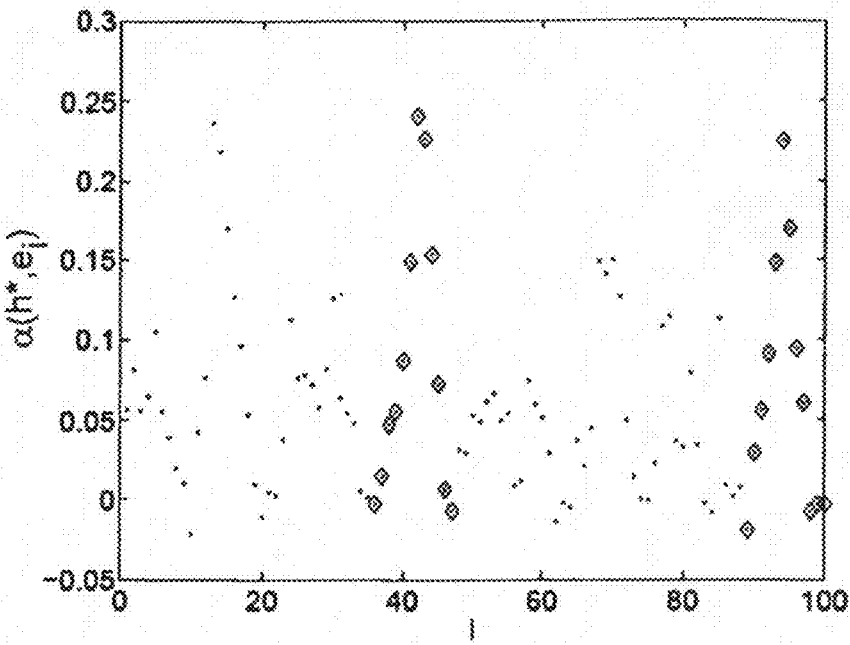
Figure 4D:
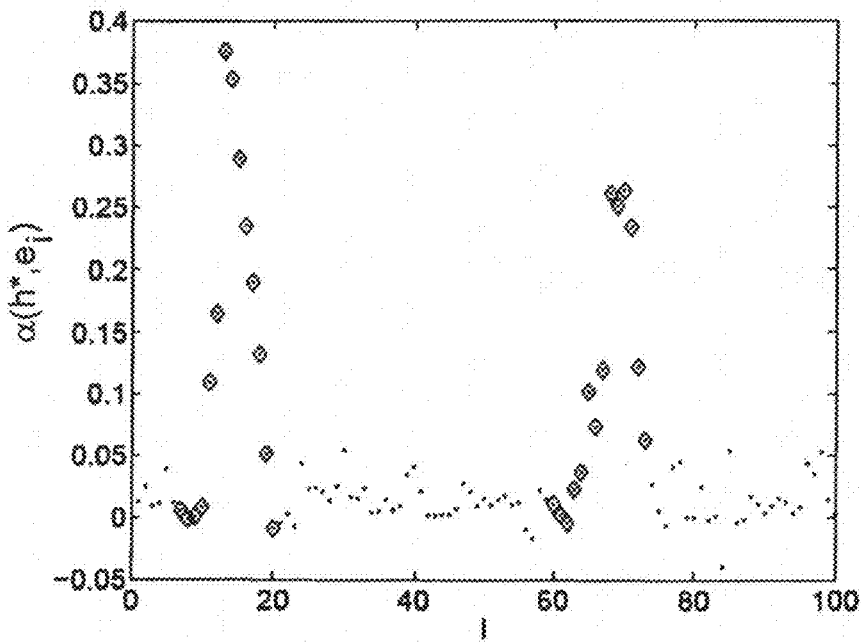
Figure 5C:
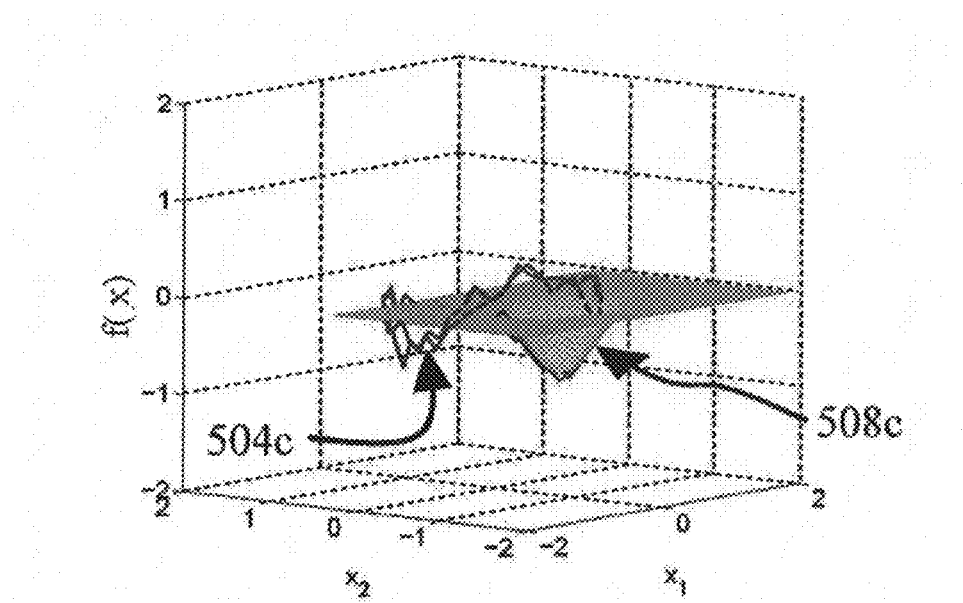
Figure 5D:
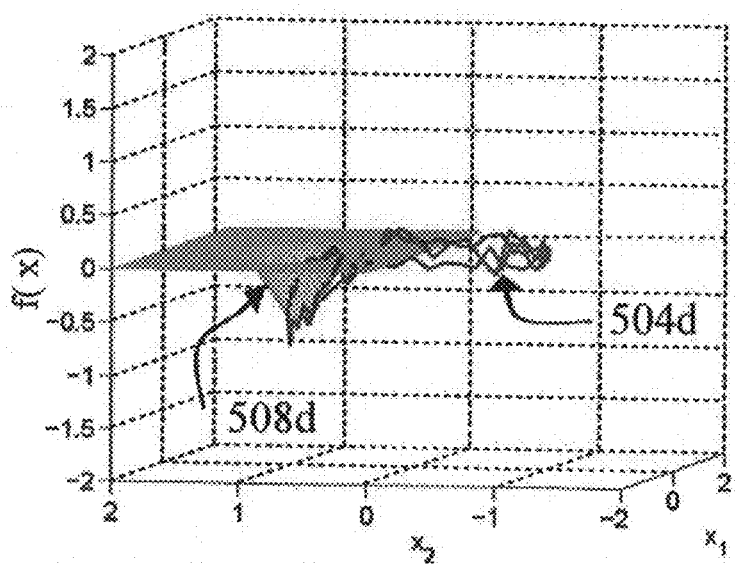

Radial Basis Functions.

Referring to the description of radial basis functions (RBF) in the Terms and Description section hereinabove, the general training problem for the RBF is the determination of the unknown parameters: $\{A, \alpha_k, c_k, W, K\}$. One object of the present disclosure is to determine an optimal value for K, i.e., the model order. Of course optimizing K depends on high quality values for the remaining parameters and we propose algorithms for this purpose.

The requirements of the RBF expansion are the same as standard data fitting problems, i.e., given a set of L input-output pairs $$\{(\chi_l, y_l)\}_{l=1}^{L}, \chi = \{\chi_l\}_{l=1}^{L} \text{ and } y = \{y_l\}_{l=1}^{L},$$

the goal is to find the underlying mapping f such that $y_l = f(x_l)$. In the standard situation, there is more data than equations so it is not possible to approximate each such mapping f exactly. Thus the problem is to minimize the cost function $$E(A, \alpha_k, c_k, W, K) = \frac{1}{2} \sum_{l=1}^{L} \|f(x_l) - y_l\|^2,$$

where now the metric $\|\cdot\|$ is generally the Euclidean inner product and is distinct from the W-weighted inner product used to compute the contributions of the basis functions.

One of the attractive features of RBFs is the variety of basis functions available for the expansion. In particular, these functions come in both local and global flavors and include $$\phi(r) = \{e^{-r^2}, r, r^2 \ln r, r^3\}.$$

These functions satisfy the criteria of radial basis functions as described in [38] and the associated theorem states that if D is a compact subset of $R^d$, then every continuous real valued function on D can be approximated uniformly by linear combinations of radial basis functions with centers in D. Thus, given any data set of D, such as X above, a function that approximates X can be constructed as a linear combination of radial basis functions with the center of each such radial basis function being in D as one of skill in the art will understand.

For simplicity, the present description is restricted to (local) Gaussian radial basis functions, i.e., $\phi(r)=\exp(-r^2)$ but the scope of the present disclosure is not limited to such specific functions. Indeed, the method disclosed herein is applicable to any admissible RBF; i.e., the interpolation matrix is nonsingular in the square case. Moreover, disclosed hereinbelow are several candidates for compact radial basis functions that are believed to have excellent conditioning properties associated with the over determined least squares problem.

It is conventional in function approximation problems to distinguish between: (a) situations where: the data for which a model is desired is available at the outset and (b) situations where the data becomes available as the model is being built. In keeping with standard terminology, situations as in (a) above are referred to as "batch" training problems, and situations as in (b) above are referred to "on-line training problems. Although, the approximation method and system disclosed herein is described for batch training, a similar method may be also used to generate an approximation model from on-line training. Accordingly, determining approximation models for on-line training problems is within the scope of the present disclosure as one of ordinary skill in the art will appreciate upon review of the novel approximation techniques described herein.

Testing for Structure in Model Residuals.

As indicated earlier, essential information can be inferred about the appropriateness of an approximation model by examining its residuals with the data set from which the model was derived. A premise for the present approximation method and system is that if there is (non-random) structure remaining in the residuals, then one or more additional basis functions should be added to the model to capture the structure residing in the residuals. On the other hand, if there is no discernible structure in such residuals, then it is presumed that there is substantially no information content in the residuals to be models, and according such lack of structure constitutes a stopping criterion for the development of the corresponding model.

Thus, the present approximation method and system is useful for modeling data that may be viewed as the superposition of, e.g., a signal together with IID noise. However, if perchance, the data is noise free then IID noise may be added to the data so that the present approximation method and system may be employed thereon. In view of this, when a model is derived according to the present approximation method and system, it is expected that the model residuals will be IID while the model itself should represent substantially all of the geometric structure residing in the data.

Hence, an indication that an RBF model, derived from an embodiment of the present approximation method and system, is unsatisfactory is the failure of the residuals to satisfy a hypothesis test for being entirely or substantially IID noise. This observation forms the basic idea for the stopping criterion used herein. The primary advantage of such a criterion is that the hypothesis test for the criterion does not involve any ad hoc parameters that require adjustment.

The IID test for determining structure in the residuals and its associated algorithm are described.

Statistical Background for Testing for IID Noise.

Assuming the terminology described hereinabove, wherein f denotes the (current version of the) approximation model, residual for the nth data point or sample from which the model was derived is defined as $$e_n = y_n - f(\chi_n).$$

Following [4], we denote the set of residuals for a model of order K, as $$R^K = \{e_n\}_{n=1}^L, \quad (3.1)$$

where L is the cardinality of the training set. The standard definition for the sample autocorrelation function, $\hat{\rho}(h)$, (ACF) for a set of residuals $e_1, e_2, e_3, \ldots, e_L$ with sample mean $\bar{e}$ and lag h is defined as $$\hat{\rho}(h) = \frac{\hat{\gamma}(h)}{\hat{\gamma}(0)}, \quad (3.2)$$

where $-L < h < L$, and $$\hat{\gamma}(h) = \frac{1}{L} \sum_{i=1}^{L-|h|} a(h, e_i). \quad (3.3)$$

As proposed in [4, 3] we decompose the ACF into its component terms $$\alpha(h, e_i) = (e_{i+|h|} - \bar{e})(e_i - \bar{e}). \quad (3.4)$$

For a fixed lag h (where $-L+1 \leq h \leq 0$, h an integer), the quantity $\alpha(h, e_i)$ is the contribution of the $i^{th}$ residual to the autocorrelation function. Below, the quantity $\alpha$ is further described, and it is shown that $\alpha$ reveals critical information concerning where the support for new basis functions should be relative to the series of points in the data set being modeled. Given the importance of $\alpha$, it is referred to herein as the autocorrelation contribution. Accordingly, there is a function $ACC_h$ (or simply ACC if there is no confusion in the value of h) which may written as $ACC(i) = \alpha(h, e_j)$, $i=1, \ldots, L-h$, for fixed h.

IID Hypothesis Test.

As indicated above, the addition of new basis functions is terminated when the residuals appear to have no further structure. As a test for structure in the residuals, a determination is made as to whether the sequence of residuals is IID (i.e., independent and identically distributed). The relevant theorem from statistics states that for large L, the sequence of sample autocorrelations of an IID sequence $U_1, U_2, \ldots, U_L$ with finite variance is approximately IID with normal distribution with mean zero and variance 1/L i.e., N(0, 1/L), as referred to in the literature [7]. Hence, if $e_1, e_2, \ldots, e_n$ is a realization of such an IID sequence, then the sequence of autocorrelations $\hat{\rho}(h)$, for $0 < |h| \leq L-1$ is approximately IID, as one skilled in the art will understand. Accordingly, this implies that at least 95% of the sample autocorrelations should be bounded as follows:

$$\frac{-1.96}{\sqrt{L}} < \hat{\rho}(h) < \frac{1.96}{\sqrt{L}}. \quad (3.5)$$

Note that (3.5) above is also a standard statistical result; since when L is relatively large, the value 1.96 corresponds to the 0.95 quantile of the normal distribution. Therefore, if one computes the sample autocorrelations for values of h wherein $0 < |h| \leq L-1$, and finds that more than $0.05|h|$ of the samples fall outside of the bounds of (3.5), then the IID hypothesis is rejected. Note, however, in practice such sample autocorrelations do not need be computed for $|h|$ up to $L-1$, since if one finds that for some $h_0$ more than $0.05|h_0|$ of the samples fall outside of the bounds of (3.5), the IID hypothesis is rejected. Additionally, if one sample autocorrelations fall far outside the bounds of (3.5), then the IID hypothesis is rejected, as is conventional in the statistical arts.

Note that if the underlying model is known, i.e., the data to be modeled is known, there is a more accurate bound for IID hypothesis test, described in [7].

The above test of (3.5) can equivalently be written in terms of $\chi^2$ distribution. Given $$Q = L\hat{\rho}^T \hat{\rho} = L \sum_{j=1}^{L-1} \hat{\rho}^2(j),$$

it has been shown in [7] that Q has a $\chi^2$ distribution with $L-1$ degrees of freedom. The adequacy of the current (version of the) approximation model is therefore rejected at the level $\alpha$, wherein $\alpha$ may be the confidence of the $\chi^2$ test as one of skill in the art will understand.

Additional Testing Possibilities.

To show rigorously that a sequence of random variables is truly IID, higher moments (if they exist) also need to be considered, wherein such each higher moment n (n=3, 4, ...) is the expectation of the residuals of the model raised to the $n^{th}$ power. Thus, a $3^{rd}$ order moment is the expectation of the cube of the random variables. Note that if a sequence of random variables is IID, then any function of the random variables is also IID. Thus, the autocorrelation function (ACF) is not only the sequence of residuals that may be used. In addition, e.g., squares, cubes and the absolute values of such residuals must also satisfy the termination test of (3.5) or its equivalent. Although such alternative/additional functions for higher moments are within the scope of the present disclosure, for simplicity the present disclosure primarily describes using the ACF of the residuals for determining IID and thereby terminating the generation of additional basis functions.

Note that it is believed that in many cases, the autocorrelation tests of (3.5) above and its equivalent may be sufficiently effective as a termination condition. Moreover, the test of (3.5) and its equivalent do indeed provide a necessary and sufficient condition for a sequence to be white noise, i.e., the residuals have no discernible pattern indicative of information content.

Lastly, it is noted that there are alternatives to the test described above based on the autocorrelation function for testing ND or white noise. Other such tests include the difference-sign test, the rank test, and a test based on turning point, as described in [7]. These tests might also be applied as stopping criteria individually, or in conjunction with the current test based on the autocorrelation function. In another embodiment, such a termination test may be formulated by considering the relationship between the data inputs and the residuals of the outputs, as described in [28]. For example, the covariance, g(h), between the residuals and input data, i.e., $$g(h) = (1/L) * \sum_{i=1}^{L} e_i * x_{(i-h)}$$

where $e_i$ is the $i^{th}$ residual and $\chi_{(i-h)}$ is the $(i-h)^{th}$ input value.

RBF Algorithm using Spatio-Temporal (Space-Time) Ball.

In this section the details for generating an approximation model from batch data is described with reference to FIGS. 1A-1C. In particular, the question of whether a new basis function should be added is answered by the IID test of (3.5) above (or its equivalent). Note that this test also indicates where the new basis function should be added. The concept of a space-time ball for defining local regions within the batch data is also described.

Initially, it is assumed that the residuals of the data are equal to the original data (i.e., the $x_i$'s hereinabove), and/or the original data with noise purposefully added thereto.

The variable ran_flag is a flag indicating whether to continue with the derivation of the approximation model, i.e., if ran_flag is 1, the derivation continues, and if ran_flag is 0, then the derivation terminates. Accordingly, in step 104, ran_flag is set to 1. The variable K identifies the current order of the model. Accordingly, in step 108, K is set to 0. In step 110, the identifier, MODEL, that provides access to the data structure for the approximation function being derived is initialized to NULL. Note that the data structure accessed by MODEL may be, e.g., a list of pointers, wherein each pointer may be used to access a particular approximation function. In step 112, a loop commences, the loop ending at step 216. Each iteration of this loop inserts an additional approximation function (e.g., a RBF) into the approximation model for MODEL. Accordingly, this loop continues for as long as ran_flag is set to 1. In the first step of the loop (step 116), a determination is made as to whether the approximation model being derived has no basis functions therein; i.e., MODEL is equal to NULL. If so, then in step 120 the values for the residuals, $\{e_n\}_{n=1}^{L}$, for this currently empty model are set to the training data set $\{f(x_n)\}_{n=1}^{L}$ used for generating the approximation model; i.e., each residual $e_i$ of $\{e_n\}_{n=1}^{L}$ is assigned the value $f(x_i)$.

Alternatively, if there is already at least one basis function in the model identified by MODEL, then the steps commencing at step 132 is performed.

Accordingly, in step 132, an inner loop (including steps 136 and 140) commences for computing an autocorrelation function ACF. In particular, in step 136, for each lag (or shift) in the time domain h, 0<h≦L−h, the following the autocorrelation term is computed for each residual $e_j$ where 1≦i≦L−|h|:

$$\alpha(h, e_j) = (e_{j+|h|} - \bar{e})(e_j - \bar{e})$$

wherein $\bar{e}$ is the mean of the residual samples $e_i$. Note that various data structures for α may be utilized. For example, since both h and i are integers, α(h, $e_j$) may be represented as an array or list ALPHA[h, i], −L+1≦h≦0, 1≦i≦L−|h|, wherein each ALPHA[h, i] refers to a corresponding data structure including the ordered pair ($e_i$, α(h, $e_j$)).

Then in step 140, the value of the autovariance function ACF for h is computed as $$ACF(h) = \frac{1}{L} \sum_{i=1}^{L-|h|} \alpha(h, e_i).$$

Accordingly, steps 136 and 140 are performed until all values of h, −L+1≦h≦0 are computed.

Subsequently, in step 144, a determination is made as to whether at least 95% of the ACF(h)'s do not satisfy equation (3.5), or at least one of the values ACF(h) is substantially outside of the range identified in (3.5) hereinabove. If the sequence of ACF(h)'s is not determined to be IID, then steps 148 through 184 are performed. Accordingly, in step 148 the value h* is determined as a lag h having a largest ACF value. Note, if there are two or more ACF(h) for this maximum, then one can be chosen at random. Accordingly, in step 152, a location for the center of a new basis function is determined. In one embodiment, this location is determined by first determining the index i* of an autocorrelation contribution term that is largest, i.e., determine a largest α(h*, $e_j$) for 1≦i≦L−|h*|. Then, the corresponding domain point x* is determined, i.e., x*←$x_i$*. Step 156 is now performed, wherein the autocorrelation function $ACC_h$*(i)=α(h*, $e_i$), i=1, . . . , L−|h*| is constructed. Note that since the array or list ALPHA[h, i] discussed above may be already computed, it is a simple matter to utilize the subarray/sublist ALPHA[h*, j], 1≦j≦L−|h| for the function $ACC_h$*. Subsequently, in step 160 as an optional step, the function may be denoised by performing a denoising algorithm such as a wavelet denoising algorithm from one or more such algorithms well known to those skilled in the art.

Now that the center x* of the new basis function has been found as described above, in step 164, a determination is made as to what data should be used to determine the scale and weight of the new basis function to be added to MODEL. For the function $ACC_h$*(i)=α(h*, $e_i$), the index i is inherited from the data labels of the input data ($x_i$), and in the case of a time-series, i corresponds to a time ordering. In practice, if $ACC_h$* is plotted (as a function of i), the values of $ACC_h$*(i) decrease as i gets further away from i* which is what is to be expected since i* was selected to correspond with a local maximum in Equation (4.2). How quickly the values of $ACC_h$*(i) decrease for both i>i* and i<i* is a property of the scale of the data and the approximation model (MODEL) being generated.

For simplicity, it is assumed that $ACC_h$*(i) decreases monotonically for both increasing and decreasing values of i until local minima are reached at the indices l*<i* and r*>i*; wherein l, r denote such left and right local minima, respectively. Accordingly, the following distances are computed in step 168

$$d_l = d(x_i^*, x_l^*) \text{ and } d_r = d(x_i^*, x_r^*),$$

wherein these distances indicate the size of the data ball around the center x*. Accordingly, in step 172, the subset of the data employed to update the new basis function to be added is then $X_{local} = \{x \in X : \|x - x^*\| \leq d_c\}$, where X is the entire training set, and the distance $d_c$ can be selected in a variety of ways. In one embodiment, $d_c$ may be selected as $$d_c = \max\{d_l, d_r\}.$$

However, alternative selections for $d_c$ may be where the ACC function either changes sign (where again we are moving away from the peak of the ACC function in both directions) or where the ACC function has a minimum where the value of the ACC function is small.

Note that $X_{local}$ may contain data whose indices have values that are substantially different from i*, l* and r*. For the original training data being time-series data, it is apparent that spatial neighbors within $X_{local}$ may not necessarily be temporal neighbors. Hence, this spatial-temporal windowing provided by $X_{local}$ has the potential to capture substantial training data that would not otherwise be captured. For periodic or quasi-periodic data, the inventors have found that the present space-time windowing is at least preferred if not essential. Note also that no smoothing of the $ACC_h^*(i)$ was required to accurately determine $X_{local}$ for the examples provided herein. However, it may be possible that the ACC function can be very irregular. In such cases, the application of a smoothing algorithm to the ACC function can facilitate the computation of the zero crossings or local minima of the ACC function.

Updating the Model.

Still referring to the pseudo code of FIGS. 1A-1C, in step 176, a new basis function to be added to MODEL is initialized, wherein preferably the new basis function is a radial basis function. However, other types of basis functions may be also added such as circle functions, bump functions, smooth piecewise defined functions with compact support where the non-zero segments could be cosines. Such other types of basis functions are within the scope of the present disclosure. For simplicity in the following description, it is assumed that the new basis function is radial basis function.

Note that the expansion of the approximation model MODEL having K adapted previously added basis function or terms together with the one new basis function h(x; v) may be written as $$f^{(K+1)}(x) = f^{(K)}(x) + h(x;v),$$

where $$h(x;v) = \alpha\phi(\|x-c\|w),$$

with
- $\phi$ being the radial basis function, e.g., any one of the radial basis functions described in the New Radial Basis Functions section hereinbelow;
- c being the center of this new radial basis function;
- $\alpha$ being the weight as described in the Terms and Descriptions section hereinabove;
- the parameter w is described in the Radial Basis Functions description provided in the Terms and Descriptions section hereinabove; and
- the parameter $v=[c, \sigma, \alpha]^T$ being the vector of parameters to be optimized, wherein $\sigma$ is a vector of width parameters that can be described as a special case of a weighted norm described below where W (as described hereinabove) is a diagonal matrix. Note that $\sigma$ determines the parameter W as described further below.

The new radial basis term h(x; v) is determined by an iterative optimization method using the error as a cost function, wherein the data set $X_{local}$ is used to perform the optimization according to Step 180. In one instance the optimization is unconstrained, but in another implementation it is constrained such that the error on the data not being used to fit the model parameters does not increase, or does not increase significantly. In our nonlinear optimization routine we use variations of steepest descent, the conjugate gradient method as well as other quasi-Newton methods and Newton's method in addition to alternating direction descent. Accordingly, h(x; v) is first initialized as $$h(x;v) = \alpha_0\phi(\|x-c_0\|w)$$

where:
- the center $c_0$ of this new radial basis function is x* which is where much of the residual structure appears to reside;
- the weight $\alpha_0$ which initialized as described hereinbelow; and
- the parameter w is described in the Radial Basis Functions description provided in the Terms and Description section hereinabove.

Note that the vector $\sigma$ can be initialized to the diagonal elements of the covariance matrix of the local data; i.e., $\sigma$ is initialized to $$\sigma_0 = \sqrt{\text{diag}(\text{cov}(X_{local}))}. \qquad (4.3)$$

Note that W is then the diagonal matrix having the elements of $\sigma_0$ on its diagonal. Accordingly, the diagonal matrix W is the weighting term in the inner product and has its diagonal elements equal to the components in $\sigma$. This initialization of the weights has proven to be extremely valuable in accelerating the convergence of the conjugate gradient iteration. The initial value for the weight, $\alpha_0$, is calculated via least squares using the initial values for center location and widths. That is, we use a singular value decomposition of the interpolation matrix to compute the least squares solution, as one skilled in the art will understand.

Given the above initializations, in step 180, the scale (width), weight and the center location, (i.e., these values collectively being the parameter v above), of the new basis function are optimized using the conjugate gradient method with cost function $$E(v) = \min_v \sum_{x \in X_{local}} \|h(x;v) - y\|_2^2.$$

over the values in the domain neighborhood $X_{local}$ where the metric $\|*\|_2^2$ is standard Euclidean norm. Weighted Euclidean norms and Lp norms are also standard error measures in the present disclosure. Only the parameters associated with the new basis function are optimized; i.e., all other parameters are kept fixed. It another embodiment parameters associated with neighboring basis functions may be adapted simultaneously.

Subsequently, in step 184, the optimized new basis function h(x; v) is added to the approximation model MODEL, and in step 188, the order of MODEL is updated to indicate the current number of basis functions therein.

After step 188, step 196 is performed wherein MODEL is evaluated over the entire training data set. Then in step 200, a new set of residuals is determined over the entire training set for the current version of MODEL. Subsequently, in step 204, runtime performance measurements may be also computed. In particular, a root mean square error (RMSE), as provided in (4.4) hereinbelow, may be computed together with the value, ACF(h*), of the autocorrelation function ACF. Then in step 208, a confidence level or measurement is computed that is indicative of how closely MODEL approximates the training set. In one embodiment, such a confidence level may be determined using the hypothesis test for IID noise using the autocorrelation function, as described in the IID Hypothesis Test section hereinabove. Note that this test is only a necessary condition when applied to the residuals. In one embodiment, the confidence level may be determined by applying the autocorrelation test to functions of the residuals, e.g., the squares of the residuals. The confidence levels for the different functions of residuals may be computed simultaneously to produce a more robust test. For example, the IID test may be applied simultaneously to the residuals, the squares of the residuals and the cubes of the residuals and the confidence level of each set of residuals may be required to be at the 95% confidence level. Alternatively, the different functions of residuals may be computed sequentially to reduce the expense of step 208.

The confidence level is used in step 212 to determine whether the approximation model fits the training data close enough. That is, if the confidence level is above a predetermined threshold (e.g., 95% or higher), then in step 216, the flag, ran_flag is set to 0 which will cause the process to terminate when step 112 is subsequently evaluated.

Examples are presented hereinbelow that illustrate the effectiveness of this stopping criterion of step 204. However, other stopping conditions are also within the scope of the present disclosure. In particular, the stopping confidence level may be provided as a parameter that may vary depending, e.g., on the training set, etc. Thus, confidence levels in the range of 87% to 97% may be appropriate. Additionally, it is within the scope of the present disclosure, to determine trends in the autocovariance function as well as the RMSE. Note that these stopping criteria are evaluated on the training data as well as the validation data, wherein the training data is a subset of the data from which training progress may be inferred.

If in step 144, it is determined that the disjunction of this step is false, then step 192 is $$RMSE = \sqrt{\frac{1}{T}\sum_{i=1}^{T} e_i^2}, \quad (4.4)$$

performed. That is, ran_flag is set to 0 for terminating the loop commencing a step 112, and thus terminating the process. where T is the number of test points. To compare the results provided herein with other various other approximation technique, two forms of the Normalized Prediction Error (NPE) are also computed, namely, $$NPE_1 = \frac{\sum_{i=1}^{T} |e_i|}{\sum_{i=1}^{T} |y_i - \bar{y}|} \quad (4.5)$$

and $$NPE_2 = \frac{\sum_{i=1}^{T} e_i^2}{\sum_{i=1}^{T} (y_i - \bar{y})^2}. \quad (4.6)$$

It is also interesting to note that the quantity ACF(h*), i.e., the total contribution to the autocorrelation function at lag h*, monotonically decreases with the number of basis functions and becomes very flat when the algorithm of FIGS. 1A-1C has converged. Hence, ACF(h*) may be used as a sort of statistical no progress criterion. We have compared the usual no progress criterion on the root mean square error with the idea of a no progress criterion on ACF(h*) and have found the latter to be more robust. Although we did not need to use either as stopping criteria for the example applications hereinbelow, it is possible they could be useful as a no progress criterion with other data sets.

Thus, unlike currently available techniques for nonlinear function fitting over scattered data, the method disclosed hereinabove requires no ad hoc parameters. Thus, the number of basis functions required for an accurate fit is determined automatically by the algorithm of FIGS. 1A-1C. After the introduction of a collection of new radial basis functions in the following section, approximation modeling to several illustrative problems including modeling data on manifolds and the prediction of financial time-series are presented, wherein the models are determined using the algorithm of FIGS. 1A-1C. Moreover, note that FIGS. 1A-1C is presented in the context of RBFs but in principle can be employed with other methods for function approximation such as multi-layer perceptrons.

Extensions of the Algorithm to High-Dimensional Domains and Ranges

An algorithm for constructing nonlinear models from high-dimensional domains to high-dimensional ranges from scattered data is now disclosed. Similar to the univariate case hereinabove, the algorithm progresses iteratively adding a new function at each step to refine the model. The placement of the functions is driven by a statistical hypothesis test in higher dimension that reveals geometric structure when it fails. At each step the added function is fit to data contained in a higher dimensional spatio-temporally defined local region to determine the parameters, in particular, the scale of the local model. Unlike the available non-linear function fitting methods that leave the extension of the algorithm to higher-dimensional ranges as a trivial extension of the single-dimensional range, we provide more parsimonious models using inter-correlation among the successive outputs. As in the univariate range case, this algorithm does not require ad hoc parameters. Thus, the number of basis functions required for an accurate fit is determined automatically by the algorithm. These advantages extend the scope of applicability of the univariate algorithm to a much larger class of problems that arise in nature and addressed in different areas of science. A novel feature of present disclosure is the development of the statistical hypothesis test that leads to a geometrical interpretation of structure in higher dimensions.

Testing for Structure in Multivariate Model Residuals

Denote the set of residuals for a model of order K, as $$R^K = \{e_n\}_{n=1}^{L},$$

where $e=y-f(x_n)$, is the m-variate residual of the $n^{th}$ data point. L is the cardinality of the training set, u is the mean vector E(e), and $\Gamma(h)=E(e_{n+h}e')-\mu\mu'$ is the covariance matrix at lag h. An unbiased estimate for u is given by $$\bar{e} = (1/L)\sum_{n=1}^{L} e_n.$$

A natural estimate of the covariance matrix $\Gamma(h)=E[(e_{n+h}-\mu)(e_n-\mu)']=[\gamma_{ij}(h)]^m_{i,j=1}$ is given by the description hereinbelow, wherein the ACVF term refers to the autocovariance function of the multi-variant residuals.

$$\hat{\Gamma}(h) = \begin{cases} \frac{1}{L}\sum_{k=1}^{L-h} \alpha(h, e_k), & \text{if } 0 \leq h \leq n-1 \\ \hat{\Gamma}'(-h), & \text{if } -n+1 \leq h \leq 0 \end{cases}$$

Similar to the univariate case we decompose the ACVF into its components as $\alpha(h, e_k)=(e_{k+h}-\bar{e})(e_k-\bar{e})'$. Further more $\alpha(h, e^i{}_k, e^j{}_k) = (e^i{}_{k+h} - \bar{e}^i)(e^j{}_k - \bar{e}^j)$ is the (i, j)-component of $\alpha(h, e_k)$. In other words, $$\gamma_{ij}(h) = \text{Cov}(e^i_{k+h}, e^j_k) = \frac{1}{L}\sum_{k=1}^{L-h} \alpha(h, e^i_k, e^j_k).$$

For a fixed lag h the quantity $\alpha(h, e_k)$ is the contribution of the kth residual to the autocorrelation function. And the quantity $\alpha(h, e^i{}_k, e^j{}_k)$ is the contribution of the i and jth time series at kth residual to the autocovariance function. Later we focus on this quantity $\alpha$ and will illustrate that it reveals critical information concerning where new basis functions should be placed.

The estimate of the correlation matrix function R(·) is given by $$\hat{R}(h) = [\hat{\rho}_{i,j}(h)]_{i,j=1}^{m} = \left[\hat{\gamma}_{i,j}(h)(\hat{\gamma}_{ii}(0)\hat{\gamma}_{jj}(0))^{\frac{-1}{2}}\right]_{i,j=1}^{m}. \quad (4.3)$$

Where $\hat{\gamma}_{ij}(h)$ is the (i, j)-component of $\hat{\Gamma}(h)$. If i=j, $\hat{\rho}_{i,j}$ reduces to the sample autocorrelation function of the ith series. For the asymptotic behavior and the convergence properties of the sample mean and covariance functions see [7].

As was mentioned in the univariate case described hereinabove, we seek to terminate the addition of new basis functions when the residuals appear to have no further structure. As a test for structure, we consider whether the residuals are IID. In what follows we provide the definition of multivariate white noise. The m-variate series $\{e_t\}$, $t \in \mathbb{Z}$ is said to be white noise with mean 0 and covariance matrix $\Sigma$, written as $\{e_t\} \sim WN(0, \Sigma)$ if and only if $e_t$ is stationary with mean vector 0 and covariance matrix function $$\Gamma(h) = \begin{cases} \Sigma, & \text{if } h = 0 \\ 0, & \text{otherwise} \end{cases} \quad (4.4)$$

$\{e_t\} \sim IID(0, \Sigma)$ indicates that the random vectors $\{e_t\}$ are independently and identically distributed with mean 0 and variance $\Sigma$.

In general, the derivation of the asymptotic distribution of the sample cross-correlation function is quite complicated even for multivariate moving averages, [7]. The methods of the univariate case are immediately adaptable to the multivariate case. An important special case arises when the two component time series are independent moving averages. The asymptotic distribution of $\hat{\rho}_{12}(h)$ for such a process is given in the following theorem, Theorem [7]: Suppose that $$X_{t1} = \sum_{j=-\infty}^{\infty} \alpha_j Z_{t-j,1}, \{Z_{t1}\} \sim IID(0, \sigma_1^2), \quad (4.5)$$

$$X_{t2} = \sum_{j=-\infty}^{\infty} \beta_j Z_{t-j,2}, \{Z_{t2}\} \sim IID(0, \sigma_2^2), \quad (4.6)$$

where the two sequences $\{Z_{t1}\}$ and $\{Z_{t2}\}$ are independent, $\Sigma_j |\alpha_j| < \infty$ and $\Sigma_j |\beta_j| < \infty$. Then if $h \geq 0$, $$\hat{\rho}_{12}(h) \text{ is AN}\left(o, n^{-1} \sum_{j=-\infty}^{\infty} \rho_{11}(j)\rho_{22}(j)\right). \quad (4.7)$$

If h, $k \geq 0$ and $h \neq k$, then the vector $(\hat{\rho}_{12}(h), \hat{\rho}_{12}(h))'$ is asymptotically normal with mean 0, variances as above and covariance, $$n^{-1} \sum_{j=-\infty}^{\infty} \rho_{11}(j)\rho_{22}(j+k-h). \quad (4.8)$$

Without knowing the correlation function of each of the processes it is impossible to decide if the two processes are uncorrelated with one another. The problem is resolved by prewhitening the two series before computing the cross-correlation $\hat{\rho}_{12}(h)$, i.e., transfer the two series to white noise by application of suitable filters. In other words any test for independence of the two component series cannot be based solely on estimated values of the cross-correlation without taking in to account the nature of the two component series. Note that since in practice the true model is nearly always unknown and since the data $X_j$, $t \leq 0$, are not available, it is convenient to replace the sequences $\{Z_t\}$ by the residuals, which if we assume that the fitted models are in fact the true models, are white noise sequences. To test the hypothesis $H_0$ that $\{X_{t1}\}$ and $\{X_{t2}\}$ are independent series, we observe that under $H_0$, the corresponding two prewhited series $\{Z_{t1}\}$ and $\{Z_{t2}\}$ are also independent. Under $H_0$, the above theorem implies that the sample autocorrelations $\hat{\rho}_{12}(h)$ and $\hat{\rho}_{12}(k)$, $h \neq k$ of $\{Z_{t1}\}$ and $\{Z_{t2}\}$ are asymptotically independent normal with mean 0 and variances $n^{-1}$. An appropriate test for independence can therefore be obtained by comparing the values of $|\hat{\rho}_{12}(h)|$ with $$1.96 n^{\frac{-1}{2}}.$$

If we prewhiten only one of the two original series, say $\{X_{t1}\}$, then under $H_0$ the above theorem implies that the sample cross-correlations $\hat{\rho}_{12}(h)$ and $\hat{\rho}_{12}(k)$, $h \neq k$, of $\{Z_{t1}\}$ and $\{X_{t2}\}$ are asymptotically independent normal with mean 0 and variances $n^{-1}$ and covariance $n^{-1}\rho_{22}(k-h)$. Hence for any fixed h, $\hat{\rho}_{12}(h)$ also falls (under $H_0$ between the bounds $$\pm 1.96 n^{\frac{-1}{2}}$$

with a probability of approximately 0.95.

Therefore, if one computes the sample cross-correlation up to lag h and finds that more than 0.05 h of the samples fall outside the bound, or that one value falls far outside the bounds, the IID hypothesis is rejected. This test can equivalently be written in terms of $\chi^2$ distribution. Given $$Q = L\hat{p}_{12}^T \hat{p}_{12} = L\sum_{j=1}^{L-1} \hat{p}_{12}^2(j),$$

it has been shown in [32] that Q has a $\chi^2$ distribution with L−1 degrees of freedom. The adequacy of the model is therefore rejected at level $\alpha$ if $$Q > \chi^2_{1-\alpha}(L-1).$$

The discussion hereinabove of the Theorem closely follows the presentation in [7].

Multivariate Incremental Algorithm

Pseudo code of this algorithm is provided in FIG. 8.

Although the notation is somewhat different, the main difference between the univariate algorithm of FIGS. 1A-1C and the multivariate algorithm of FIG. 8 is the statistical hypothesis test. The question of whether a new basis function should be added is answered by the IID test. We shall see that this test also indicates where the new basis function should be initialized. First we compute the autocorrelation functions of all m time series. If all of these pass the WN test, then the cross-correlations among the time series are considered. If there is structure in the auto-correlations or cross-correlations of the time series then the IID will be rejected.

The next requirement is to determine where the new basis function should be located to optimally reduce the structure in the model residuals. We look for the point in the domain that makes the largest contribution to the auto or cross correlation which has caused the test to fail.

This is accomplished by observing that the residuals are associated with the data in the domain in a one-to-one manner, i.e., there is a mapping, say $\psi$, from a data point to its higher dimensional residual of the form $e_k = \psi(\chi_k)$. Thus, by identifying the residual associated with the largest contribution to auto or cross correlation we may identify the location in the domain where the basis function should be added. To actually find this point first we determine the exact lag for which the correlation function, $\gamma_{i,j}(h)$ reaches its maximum value $h^*$, i.e., $$h^* = \arg\max \hat{\gamma}_{i,j}(h), h>0. \quad (4.9)$$

Then, we find the point in the spatial domain that has the may contribution to the associated ACF for lag $h=h^*$ by solving $$i^* = \arg\max_{k=1,\ldots,n-h^*} \alpha(h^*, e_k^i, e_k^j). \quad (4.10)$$

Thus the center for the new basis function is given by $$\chi_{i,j}^* = \psi^{-1}(e_i^*),$$

where $\psi^{-1}$ is the inverse of the function For simplicity, we will refer to this center location as $\chi^*$.

Now that the center of the new basis function has been found it is necessary to determine what data should be used to determine the scale and weight of the new RBF. Similar to the univariate case, [65,89], consider the function $\beta^{i,j}_k = \alpha(h^*, e_k^i, e_k^j)$. The index k is inherited from the data labels and in the case of a time-series corresponds to a time ordering. For simplicity, we assume that $\beta^{i,j}_k$ decreases monotonically for both increasing and decreasing values of k until crosses zero at the indices $l^* < i^*$ and $r^* > i^*$; here we use l, r to indicate left and right, respectively. We now compute the distances $$d_l = d(\chi_i^*, \chi_l^*)$$

and $$d_r = d(\chi_i^*, \chi_r^*)$$

as these indicate the size of the data ball around the center $\chi^*$. The subset of the data employed to update the added basis function is then $$\chi_{local} = \{\chi \in \chi : \|\chi - \chi^*\| \le d_c\}$$

where $\chi$ is the entire training set. The distance $d_c$ can be selected in a variety of ways and here we select $$d_c = \max\{d_l, d_r\}.$$

Note that $\chi_{local}$ now may contain data whose indices have values that are substantially different from $i^*$, $l^*$ and $r^*$.

The new term in the expansion is initialized and optimized similar to the univariate case. The center $c_0$ is initialized at the point of most structure according to our test, i.e., $c_0 = \chi^*$. The vector of widths a is very effectively initialized using the diagonal elements of the covariance matrix of the local data, $$\sigma_0 = \sqrt{\text{diag}(\text{cov}(\chi_{local}))}.$$

Note here that $W = \text{diag}(\sigma_0)$. The initial value for the multivariate weight, $\alpha_0$, is calculated via least squares using the initial values for center location and widths. Then the parameters associated to the new basis function is optimized in a nonlinear optimization procedure.

Similar to the univariate case we could use one of the statistical tests, RMSE or normalized prediction error or another measure of structure as stopping criteria.

A Novel Alternative Method

In the present section, the multivariate range values are considered as points in higher dimensions. We intend to use a test analogous to the univariate case, but extended for higher dimensions. FIG. 9, provides an embodiment for such an extension for higher dimensions.

Note that although the notation appears very similar to the univariate algorithm in this algorithm we are dealing with multi-dimensional domain and range values.

As an initial step to adapt a statistical test we employ $\chi^2$ with $m^2-1$ degrees of freedom for each lag. Note that both the nature of the hypothesis test as well as the number of degrees of freedom employed may be varied.

The details of the algorithm for the determination of the local ball (i.e., the domain neighborhood), initialization of the center, width and weight of the new RBF are given in FIG. 9.

Modulated Asymmetric Radial Basis Functions

In the present section, a new class of functions is presented that can be used as RBFs and show their flexibility in data fitting over high dimensional domains. This includes nonsymmetric RBFs with compact or non-compact support. The developed RBFs are well suited for a wide range of training algorithm that is being used for data fitting, [21]. We refer to this extended class of functions as modulated asymmetric RBFs or, alternatively, skew RBFs.

In general, model order determination via both regularization and growing and pruning algorithms can be computationally intensive and data hungry, however the right choice of RBFs makes this job substantially easier. Hereinabove we have observed that the nature of the condition number associated to an RBF model depends very significantly on the type of RBFs and the number and scale of representation functions. The advantage of modulated asymmetric RBFs is that they are able to better fit the geometric structure of the data at each step during the training procedure. For certain types of data, in particular data which is heavily skewed such as boundaries, or edges, in images, modulated asymmetric RBFs afford more parsimonious models than their non-modulated RBF counterparts.

Carefully observing data fitting using the non-modulated symmetric RBFs, indicates that there is significant room to improve on the way these functions match the structure of the data. We present a simple example to illustrate this idea. For purposes of illustration, we have created a time series from a single mode skew Gaussian with Gaussian IID noise with standard deviation of 0.01. The training and testing data sets are shown in FIG. 10A, wherein the testing and training data sets for the skewed data set were generated with the parameters, c=2, t=−7, α=1, σ=1. And the output of the single mode model using modulated RBFs. The fit using modulated Gaussian-Gaussian RBFs via the algorithm given hereinabove, is shown in FIG. 10B. The skew Gaussian fit is done only with one RBF and the RAISE of the final fit is 0.0029. The algorithm terminates with 98.8% of confidence. The fit using regular Gaussian RBFs is shown in FIG. 11A. In this case, as shown in FIG. 11B, the fit requires 13 RBFs and RMSE of the final model is 0.0035, while 96.80% of confidence was achieved at termination of the algorithm.

Definition of Modulated RBFs

Based on the observations made in the previous section, if the data being fit is asymmetric, then breaking the symmetry of the basis functions may produce models of lower order and potentially higher accuracy. For example, fitting a discontinuous Heaviside function with symmetric radial basis functions gives rise to a Gibbs type phenomenon that is not present with appropriately skewed RBFs. Modulated RBFs may be generated by multiplying a non-symmetric scalar function (that possesses multiple shape parameters) to any form of symmetric RBFs. This basic idea is reminiscent of skewed distributions studied in probability theory but is more general in that we do not require the shape function to be a cumulative distribution function nor the symmetric RBF to be a probability distribution function. Note that it is also distinct from asymmetric RBFs referred to as normalized RBFs which are motivated by probabilistic considerations and do not afford the same variety of shape parameters.

The idea of modeling skewed distribution functions in statistics can be traced back to 1908, [82], where perturbation of the normal density via a uniform distribution function leads to a form of skew-normal density. Although it is mathematically somewhat different from the form that is presented in current literature, its underlying stochastic mechanism is intimately related. Fundamental skew-symmetric distributions are studied in [53]. For specific references on skew Cauchy distributions, see [66, 85, 54], for skew t distributions, [96, 59], skew-logistic distributions, [141], and skew-elliptical distributions, [70]. We would like to concentrate on the specific formulation of skew-normal distribution. The formal definition of the univariate skew-normal (SN) family is due to Azzalini [56]. A random variable Z has an SN distribution with skewness parameter λ, and is denoted by Z~SN(λ), if its density is $f(z|\lambda)=2\phi(z)\Phi(\lambda z)$, with z is a member of R, λ is a member of R. φ and Φ are pdf and cdf of N(0, 1), respectively. The case where λ=0, reduces to N(0, 1). Further probabilistic properties of this distribution are studied in [56, 57]. The multivariate SN family of densities are introduced in [60] which is given by $f(z|\lambda)=2\phi_k(z)\Phi_1(\lambda^T z)$, z is a member of $R^k$, λ is a member of $R^k$. $\phi_k$ is the probability density functions of k-dimensional normal distribution, $N_k(0, 1)$. Similar to what is mentioned above the case where λ=0 corresponds to $N_k(0, I_k)$. Further properties of the multivariate SN distribution are studied in [58].

A closer look at two types of multivariate skew-normal distributions is provided, and connections are drawn to RBFs, [92]. They are:

$$f_p(y; \mu, \Sigma, D) = \frac{1}{\Phi_p(0; I+D\Sigma D')}\phi_p(y; \mu, \Sigma)\Phi_p[D(y-\mu)]$$

where $\mu \in \mathbb{R}^p$, Σ>0, D(p×p), $\phi_p(\cdot; \mu, \Sigma)$ and $\Phi_p(\cdot, \Sigma)$ denote the pdf and the cdf of p-dimensional symmetric distribution with mean μ and covariance matrix Σ>0, respectively. Note that in this case we have a p integral with upper bounds of D(γ−μ), [80].

$$f_p(\gamma; \mu, \Sigma, \lambda) = 2\phi_p(\gamma; \mu, \Sigma)\Phi_1[\lambda^T(\gamma-\mu)]$$

where λ is a vector of length p and $\Phi_1$ is the one dimensional cdf of the given distribution. In other words $$\Phi_1[\lambda^T(y-\mu)] = \int_{-\infty}^{\lambda^T(y-\mu)} \phi_1(x; \mu, \Sigma) dx, . \quad [60]$$

The latter formulations is used to motivate modulated RBFs.

Let $$f(x) = \sum_{i=1}^{n} w_i \phi_s^{(i)}(x),$$

where $\phi_s^{(i)}(\chi) = s_p(\chi, \mu_i, W_i)\phi(\|\chi-\mu_i\|w_i)$, and $$s_p(x, \mu_i, W_i) = \int_{-\infty}^{\tilde{x}^T\lambda} \phi_1(y) dy$$

with $$\tilde{x}_j = \frac{x_j - \mu_{ij}}{\sigma_{ij}}.$$

$s_p(\cdot)$ is the asymmetric component of the RBF. The parameters $\omega_i$, $\sigma_i = \text{diag}(W_i)$, $\mu_i$ and $W_i$ are learned from the data. Note that RBFs do not require the normalization factor given in their analogue probability distributions.

To generate modulated RBFs we could combine different cdfs and pdfs of variety of distributions. For examples, Gaussian-Cauchy RBFs, Cosine-Sine RBFs, Cosine-Cauchy RBFs, and many others. All we need is a nonlinear modulator that can produce flexibility.

FIGS. 12A, 12B, and 12C, respectively show the behavior of the one-dimensional Gaussian-Gaussian, Cauchy-Cauchy, and Gaussian-Cauchy RBFs. The skew parameter ranges from −10 to 10 with the increments of one. FIGS. 13A and 13B show two dimensional Gaussian-Gaussian and Cosine-Cauchy RBFs and their associated contour plots.

It is important to note that compactly supported modulated RBFs can be generated using compactly supported RBFs introduced hereinabove.

We propose a class of RBFs that are symmetric with adaptive curvature. The flexibility in the curvature produces a better fit to data. Note that some of these classes remain positive definite for different values of the curvature parameter.

Modulated RBFs that are Positive Definite

Traditionally, RBFs are developed in the context of interpolation. Here we would like to show that it is possible to generate modulated RBFs that produce positive definite interpolation matrix. We pursue an approximation theoretic solution to the problem. We start with a positive definite function and show that up to certain limits for the modulation parameter the interpolation matrix remains positive definite. We utilize ideas form perturbation theory and the lower bounds of the inverse of an interpolation matrix [69, 118, 128, 133, 114, 117, 129].

5.3 Impact on Other Type of Networks

We have also considered the connections to other type of networks, e.g., support vector machines. The support vector machines (see e.g., [139]) are connected to radial basis functions via the RBF Kernels [132]. At the heart of the SVM there is an inner product which could be computationally expensive. Based on Mercer's theorem [113], the positive definite inner product kernel's are used to facilitate this work. In this study we would like to introduce modulated Kernel SVMs. Clearly modulated RBFs possess the property that $K(\chi, \chi') = K(\chi', \chi)$ and we have shown the bounds in which the given kernel remains positive definite. For relation between RBFs and multilayered perceptrons see, e.g., [11, 88]. The method of mixture models immediately benefit from this structure if it assumes the basis functions to be modulated.

5.4 Impact on Signal and Image Processing

To show the promise of these RBFs we look at Mackey-Glass time series, which produces a map from $\mathbb{R}^4$ to $\mathbb{R}$. In [89] we report 76 RBFs to get the 95% confidence with RMSE of 0.0116. The same confidence with a similar error rate is achieved with 42 modulated Gaussian RBFs.

The numerical experiments suggest that the proposed radial functions significantly extend the scope of currently used RBFs and improve the computational cost as well as the the complexity of the models. It is important to note that the modulated RBFs are capable of producing models with smaller error even if the the model based on symmetric RBFs has the same order as the model based on asymmetric RBFs. We intend to explore the capability of these innovative RBFs in the context of modeling data on manifold and prediction of financial time-series using the algorithms proposed hereinabove (i.e., FIGS. 1A-1C, 8, and 9).

Image Reconstruction Application

Also within the scope of the present disclosure are applications of these RBFs in the context of image reconstruction, or, more generally, where the data is spatial and there is no time parameterization. For this purpose, it is believed that the following algorithm is useful.

Algorithm A Proposed Algorithm for Image Reconstruction.

Identify the edges using a simple edge detector.
Find the most dominate edge.
Adapt a modulated RBF to a patch of data around the identified point. Repeat the procedure till a satisfactory result is achieved.

This algorithm differs from that described in FIGS. 1A-C in that there is no time ordering of the data points. Of course one may artificially endow a set of data with a time-parameterization by connecting the points arbitrarily by a curve. Alternatively, it is useful to identify points in the spatial image that have the most structure and these should be candidates for adding basis functions. In image processing a measure of structure is the image gradient which reflects the presence of an edge when it is large. Thus, one embodiment of the proposed algorithm proceeds by iteratively placing functions where the image gradient is a maximum. This process continues until the image gradient at all points on the image is sufficiently small. The size of small is application dependent. Of course the IID test may be employed in conjunction with this algorithm.

More generally, one may use other measures of geometric structure to guide the placement of basis functions.

Since the above algorithm fits the structure of the data and does not capture the noise, by design, this approach is well suited for image de-noising as well as image compression.

Another Variation (Symmetric) on RBFs

An RBF based on subtraction of two log-sigmoid functions is used in [111], to generate localized robust RBFs. In [55], an extension of the robust RBFs is presented that uses a composite product of log-sigmoidal functions to make localized RBFs. In [98], and related prior work on reformulated RBFs aim to facilitate training by supervised learning based on gradient descent. The approach is based on selecting an admissible generator functions. For example, for in $>1$, the exponential generator function $g_{j0}(x) = \exp(\beta_j \chi)$, $\beta_j > 0$, corresponds to $g_j(\chi^2) = \exp(\beta_j \chi / 1 - m)$ which leads to Gaussian RBF $$\phi_j(x) = g_j(x^2) = \exp\left(\frac{-x^2}{\sigma_j^2}\right),$$

with $$\sigma_j^2 = \frac{m-1}{\beta_j}.$$

Linear generator function $g_{j0} = \alpha_j \chi + b_j$, $\alpha_j > 0$, $b_j \geq 0$, produces RBFs of the form $$\phi_j(x) = g_j(x^2) = (a_j x^2 + b_j)^{\frac{1}{1-m}},$$

with m>1. For m=3, this corresponds to the inverse multiquadratic RBF, $$\phi_j = g_j(x^2) = \frac{1}{x^2 + \gamma_j^2}^{\frac{1}{2}}.$$

In [77] a certain class of oscillatory radial functions are proposed as suitable candidates for RBFs that lead to non-singular interpolants with the feature that the scaled version becomes increasingly flat. The aim is to generalize traditional spectral methods to completely general noise layouts. The RBF has the following form $$\phi_d(r) = \frac{J_{\frac{d}{2}-1}(\varepsilon(r))}{(\varepsilon(r))^{\frac{d}{2}-1}},$$

d=1, 2, . . . , where $J_\alpha(r)$ denotes Bessel function of the first kind of order $\alpha$. These RBFs will give nonsingular interpolation up to d dimensions and $d \geq 2$.

Additional New Radial Basis Functions

Most applications employ activation or basis functions from a relatively small list, including Gaussians, multi-quadrics and thin plate splines. Recently several functions with compact support have proposed as candidate RBFs, see, e.g., [143, 142, 144]. For example, the $C^2$ function $$\phi(r)=(1-r)^4+(1+4r), \quad (5.1)$$

has been derived as an RBF explicitly for domain dimension 4 in the sense that the resulting square interpolation matrix is a (conditional) positive definite matrix [143]. In many cases of practical interest it appears that this interpolation condition is overly restrictive. In general, data fitting problem one is usually confronted with solving an over determined least squares problem. In this setting it seems adequate to require only that the approximating basis functions be dense in an appropriate function space. As described in [121], the conditions required of basis functions to be dense in $L"$ ($R"$) are very weak. We introduce several new candidate compactly supported RBFs for approximating functions in $L"$ ($R"$) via over-determined least squares.

First, in [23], we propose the bump function widely used in differential geometry $$\phi(r) = \exp\left(\frac{1}{r^2 - \gamma^2}\right) H(1 - r^2), \quad (5.2)$$

for use as an RBF activation function where H is the usual Heaviside step function. This compactly supported and infinitely differential function is also widely referred to as a mollifier. It is shown in FIG. 2A, and is qualitatively similar in nature to the widely applied non-compact Gaussian RBF, $\exp(-r^2)$. Interestingly, the failure of the Gaussian to have compact support has led some researches to arbitrarily truncate it. We observe that the Gaussian RBF satisfies the positive definiteness of the interpolation matrix for all space dimensions $d \geq 1$. Note that while the mollifier function satisfies the postulates of Park and Sandberg's theorem, it has non-positive values in its Fourier transform and hence does not satisfy Wendland's interpolation criterion for a compact RBF [69a, 142].

A compact activation function with constant curvature is provided by $$\phi(r)=\sqrt{1-r^2}H(1-r^2). \quad (5.3)$$

This is just the quarter circle shown in FIG. 2B. Clearly this function satisfies the postulates of Park and Sandberg's theorem.

Our last proposed activation function in [23] with compact support is the Hanning filter $$\phi(r)=(\cos(r\pi)+1)H(1-r). \quad (5.4)$$

Like the bump function, this function is also infinitely differentiable; see FIG. 2C. It has advantages over the mollifier function in the manner in which the function approaches zero, i.e., there is no vanishing term in a denominator.

While the quality of performance of a model can be assessed using a variety of directions (e.g., regularization methods and cross validation) the inherent conditioning of the model plays a critical role in its ability to generalize. In practice, if the data model is represented generally by the mapping $y=f(\chi)$, of importance is how the output of the model changes as a consequence of perturbation of the input. For nonlinear mappings, such as those generated by multilayer perceptrons, the estimation of the condition number is complicated by the fact that the Jacobian of the map must be estimated at every point of interest [105]. This is also true in general for RBFs. However, in the case of RBFs we can determine the condition number associated with the perturbation of the parameters simply by computing the singular values of the interpolation matrix. This information provides an important measure of the sensitivity of the approximation model.

We have observed that the nature of the condition number of the interpolation matrix (here we mean both the interpolation problem where this matrix is square and the overdetermined least squares problem where this matrix is tall) depends very significantly on the type of RBFs that are employed. The proposed three compactly supported functions (5.2)-(5.4) above possess especially good conditioning properties. We illustrate their utility on the benchmark Mackey-Glass time series data, [48, 36, 25, 47], in [23]. The Mackey-Glass time series is a mapping from a time-delay embedding of the univariate time-series to a future value. The Mackey-Glass time-delay equation $$\frac{ds(t)}{dt} = -bs(t) + a\frac{s(t-\tau)}{1+s(t-\tau)^{10}}.$$

generates a chaotic time series with short-range time coherence, where long time prediction is very difficult; it has become a standard benchmark for testing model fitting algorithms. Further details regarding the Mackey-Glass time series is provided in the section titled "Mackey-Glass Time Series" hereinbelow.

As a measure the performance of the various RBFs on the Mackey-Glass time series, we compare the root-mean-square error (RMSE), the number of basis functions required and the sensitivity of the models via the condition number of the interpolation matrix of the full model. We present the final result of the fit using the mollifier in FIG. 2A. In this figure the output of the model and the associated target values are presented. The results of using other RBFs are summaries in Table 5.1. Note that all the results are aimed for 95% confidence in the statistical test [3, 4].

TABLE 1

This table shows the performance of different RBFs under identical strategy of fit.

|  | Wendland RBF | Circle RBF | Mollifier |
| --- | --- | --- | --- |
| ConditionNumber | 3.0057e+003 | 12.5845 | 284.3114 |
| RMSE | 0.0109 | 0.0344 | 0.0167 |
| NumberofRBFs | 51 | 26 | 37 |
| Confidence % | 95 | 95.27 | 95.53 |

Additional Numerical Examples.

This section presents several additional applications to demonstrate the performance of the algorithm of FIGS. 1A-1C in higher dimensional domains (e.g., algorithms such as those disclosed in FIGS. 8 and 9). The successful extension of this algorithm from one to higher dimensional domains requires the introduction of the notion of a space-time window; i.e., the spatio-temporal ball described hereinabove. Here we illustrate the impact of this concept on several applications. Note that throughout all the following examples the same code was employed, in particular, there were no parameters that were adjusted or tuned to the data set.

A Simple Manifold Example.

In the present example a representation of data on a manifold as the graph of a function is provided for modeling. In particular, a graph 304 of the pringle data set is shown in FIG. 3A, named as such given its similarity to the boundary of a potato chip by the same name; see also [9, 8]. The task is to construct a mapping from an (x, y) value in the plane to its corresponding z value on the pringle data set. Thus, we are attempting to fit or approximate the graph of a function from $R^2$ to R. Such graph fitting problems are at the center of the Whitney's manifold embedding theorem where 2m+1 dimensional domains suffice (in general) to write m dimensional manifolds as graphs; see [9, 8] for a discussion.

Note that the pringle data set, as proposed in [10], can be generated as the solution to the following systems of ordinary differential equations $$\frac{dx}{dt} = y$$
$$\frac{dy}{dt} = -x - (x^2 + y^2 - 1)y$$
$$\frac{dz}{dt} = -\lambda z + 2(\lambda xy + w(x^2 - y^2)),$$

where γ and ω are parameters. In FIG. 3A, a numerically integrated trajectory of an attracting cycle (308) is also shown, as one skilled in the art will understand. In this example, we are only concerned with fitting data on the limit cycle and ignore transients; i.e., points off of the limit cycle. From the fitted data of FIG. 3A, the data points of FIG. 3B were generated by corrupting the fitted data with Gaussian noise with standard deviation of 0.1, wherein there are 54 data points per cycle about the pringle graph 304. In particular, FIG. 3B shows the training set having of 101 points (almost two cycles) and testing data set consisting of 500 points, or almost 9 cycles. The fact that the solution is periodic will clearly illustrate the need for spatial as well as temporal windowing of the data. The algorithm of FIGS. 1A-1C is capable of learning a specific part of the trajectory with a small amount of data and generalizes well to the data that resides in the same region.

FIGS. 4A through 4D show the $ACC_h^*$ functions for the four major radial basis functions that capture the underlying structure of this data set. The diamonds in these figures indicate the points in the $ACC_h^*$ function that contribute to the RBF at the corresponding stage, i.e., they belong to $\chi_{local}$. In FIG. 4A we see that the spatio-temporal window collects data from two peaks indicating that we have cycled through the data twice in that region. This example clearly illustrates the difference between spatio-temporal windowing and temporal windowing: a time window would only use data from one cycle. We see the same effect in FIGS. 4B through 4D.

FIGS. 5A through 5D show the location and shape of the four RBFs that are generated by the algorithm of. FIGS. 1A-1C when modeling the data set of FIG. 3B before the IID stopping criteria described hereinabove is satisfied. In each of the figures, the training data (i.e., $\chi_{local}$) is identified by a corresponding one of the jagged graphs 504a through 504d. Additionally in each of the figures, a graph (identified by the labels 508a through 508d) of the corresponding RBF generated by the algorithm of FIGS. 1A-1C is displayed.

Figure 6A:
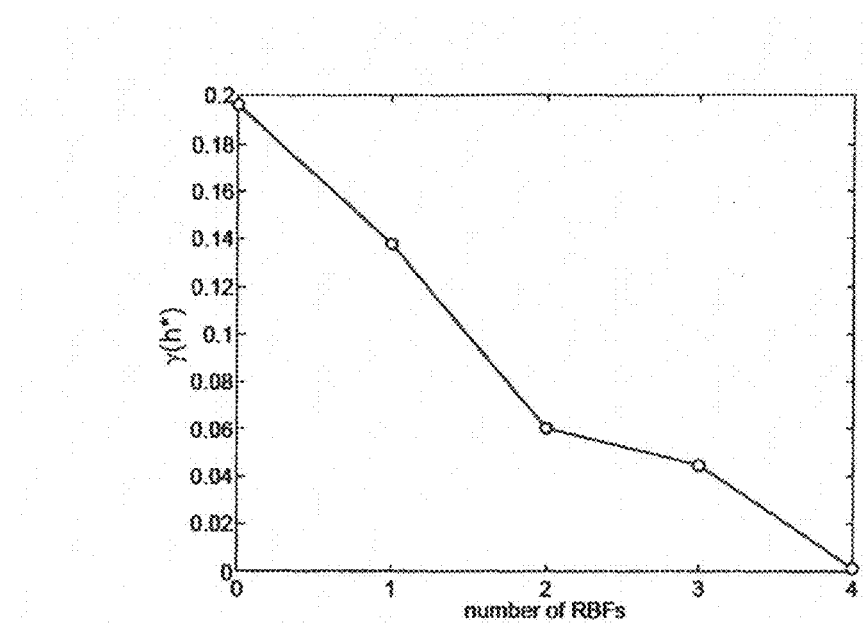
FIG. 6A shows the maximum values of the corresponding $ACC_h{}^*$ function for each step in the training process of FIGS. 1A-1C (i.e., steps 112 through 212).

FIG. 6A shows the maximum values of the corresponding $ACC_h^*$ function for each step in the training process of FIGS. 1A-1C (i.e., steps 112 through 212).

Figure 6B:
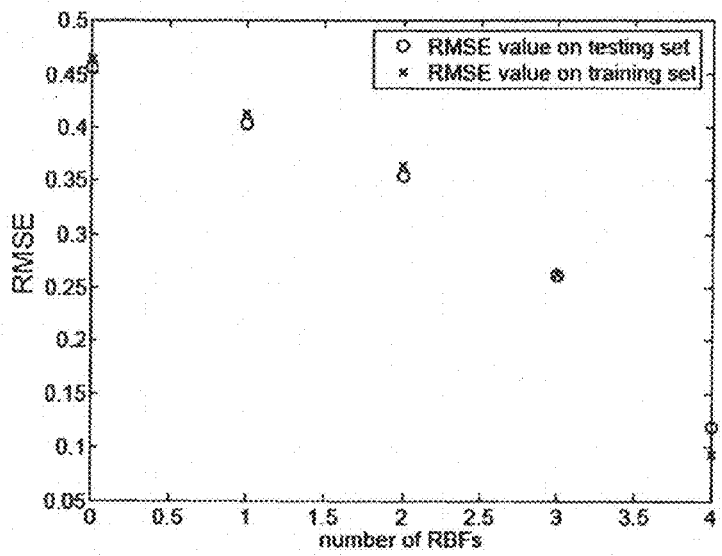
FIG. 6B shows the performance of the approximation model for approximating the data set of FIG. 3B in the RMSE sense as the number of assigned RBFs increases.
Figure 6C:
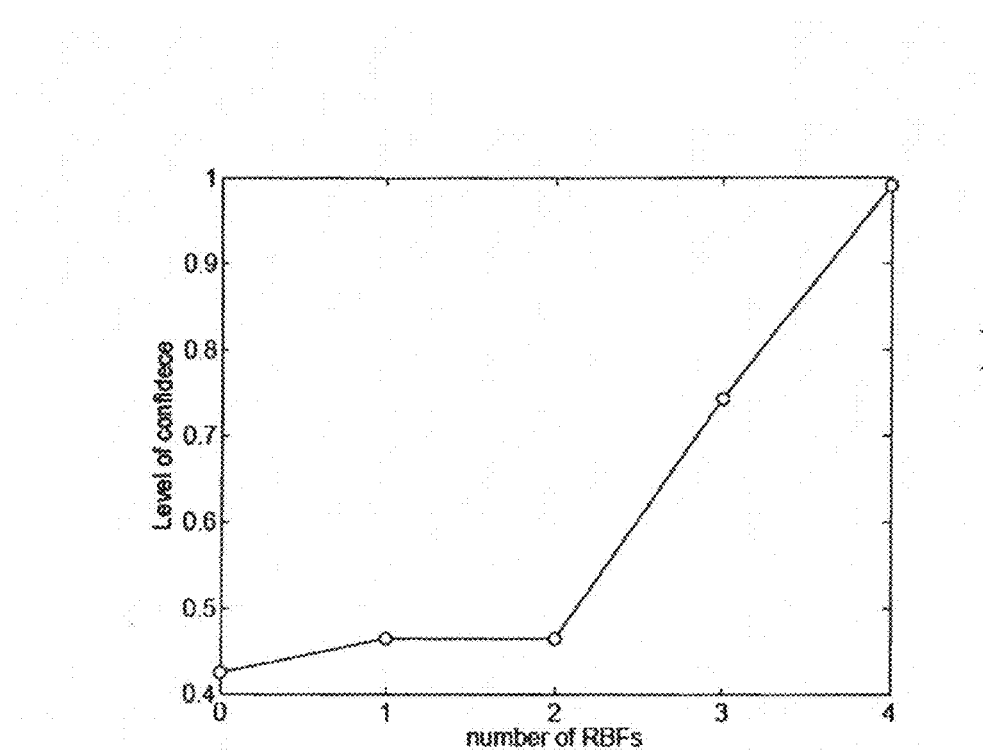
FIG. 6C shows the confidence level at each stage of training for approximating the data set of FIG. 3B.
Figure 7:
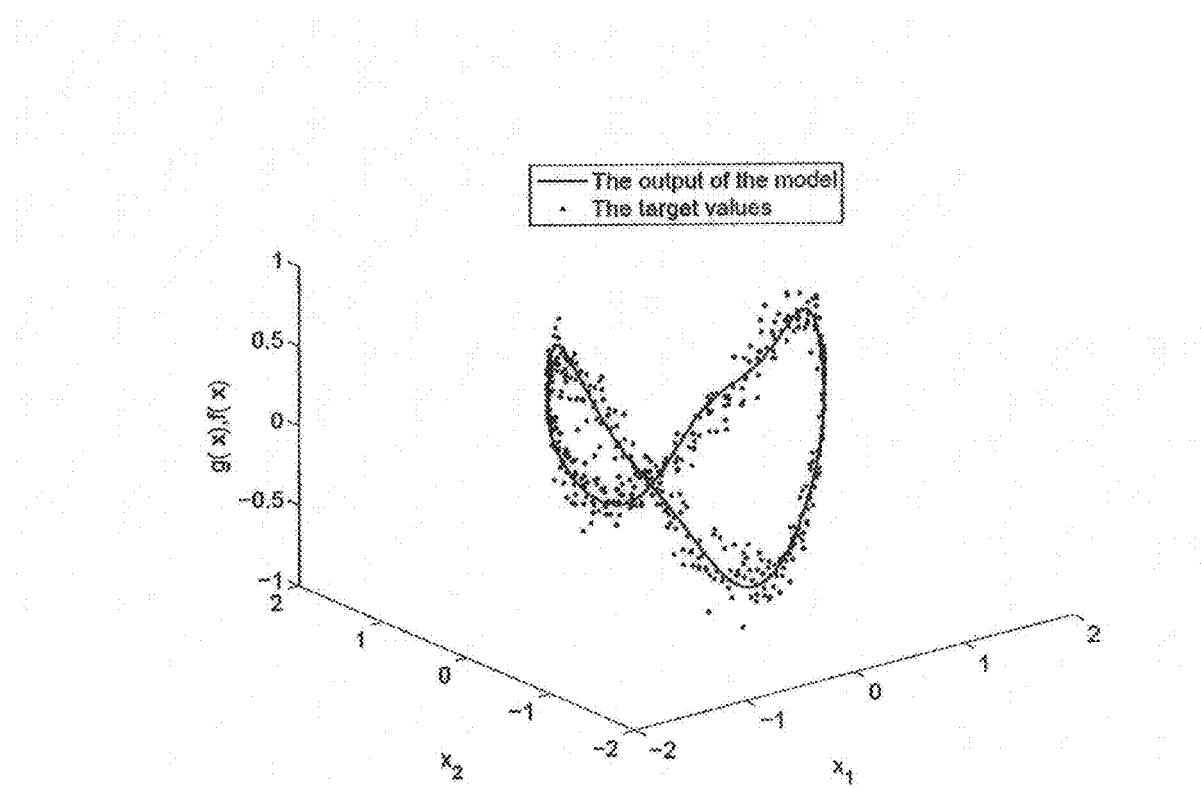
FIG. 7 shows a plot of the output of the approximation model generated using the four RBFs described FIGS. 4A through 6C together with the target values of the testing set.

FIG. 6B shows the performance of the model in the RMSE sense as the number of assigned RBFs increases while FIG. 6C shows the confidence level at each stage of training. Note that the four RBFs model the data with RMSE of 0.1187 and 99% of points in the autocorrelation function resides in the 95% confidence bands. Also note that neither the RMSE nor the values of γ(h*) provide reliable stopping criteria in this example. FIG. 7 shows a plot of the output of the approximation model generated using the four RBFs described FIGS. 4A through 6C together with the target values of the testing set.

In contrast to [89], in the present disclosure the notion of $\chi_{local}$ has been modified in such a way that it includes the data points between the two zero crossing of the ACC function, as one of skill in the art will understand. The reason for this modification is due to the fact that there is structure between the two places that the ACC(h) departs from the null state and there is less structure in the places that the amount of the ACC(h) is less than a certain value. There is a modification to the optimization routine. Additionally, in one embodiment, we have implemented the alternative decent directions method which only optimizes one parameter in each iteration.

In addition, to avoid the overflow effect of the RBFs to the regions that are not in the local ball, in one embodiment, constraints in the optimization procedure may be implemented such that it penalizes the growth of RBF when increasing the error on the complement of the local space-time ball.

Mackey-Glass Time Series.

The Mackey-Glass Time-Delay Equation:

$$\frac{ds(t)}{dt} = -bs(t) + a\frac{s(t-\tau)}{1+s(t-\tau)^{10}}. \qquad (5.1)$$

generates a chaotic time series with short-range time coherence, where long time prediction is very difficult; it has become a standard benchmark for testing model fitting algorithms [36, 25, 47].

The time series is generated by integrating the equation with model parameters α=0.2, b=0.1 and τ=17 using the trapezoidal rule with Δt=1, with initial conditions χ(t−τ)=0.3 for 0<t<τ (τ=17). The initial 1000 data points corresponding to transient behavior are discarded. Then 4000 data points are reserved for the training set. The test set consists of 500 data points starting from point 5001. Note that not all 4000 training points collected were actually used for training the model. (These conditions are very similar to those in Platt [36].)

For purposes of comparison with [48], the series is predicted with ν=50 samples ahead using four past samples: $s_n$, $s_{n-6}$, $4_{n-12}$ and $4_{n-18}$. Hence, we require that the model fit the input value $$\chi_n = (s_n, s_{n-6}, s_{n-12}, s_{n-18})$$

to the output value $s_{n+\eta}$. The η step prediction error is then $\epsilon = s_{n+\eta} - f(s_n, s_{n-6}, s_{n-12}, s_{n-18})$. As such, this time series provides a good example for illustrating the construction of a nontrivial mapping from $R^4$ to R.

Figure 14C:
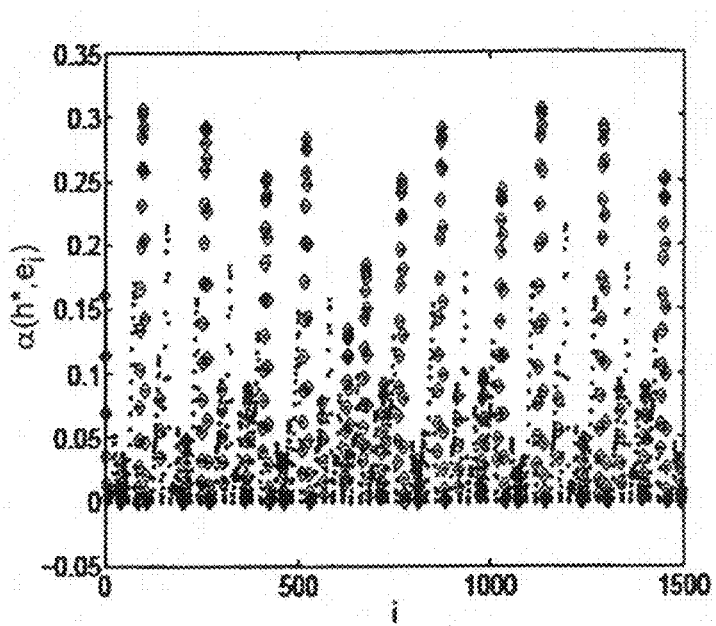
FIG. 14C and FIG. 14D show the associated ACC functions, i.e., the point-wise values $\beta_i$, corresponding to the maximum value of the ACF in FIG. 14A and FIG. 14B, respectively when modeling the Mackey-Glass Time Series.
Figure 14D:
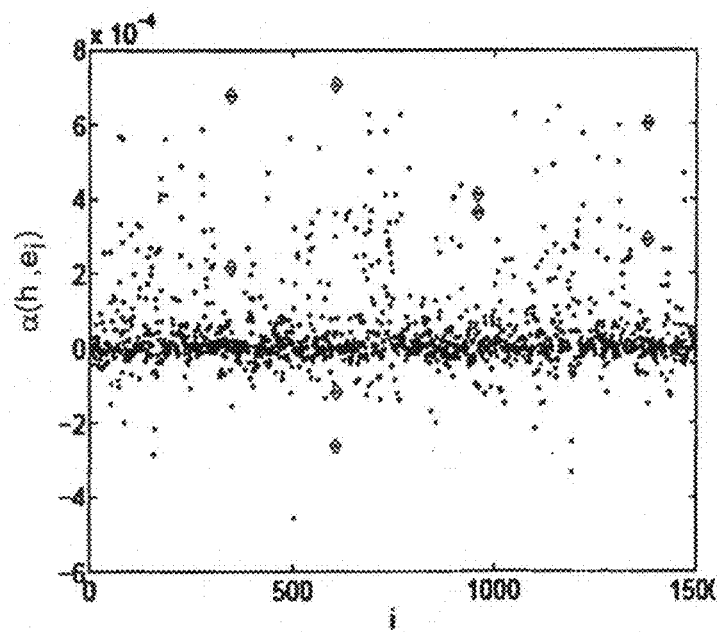
Figure 15C:
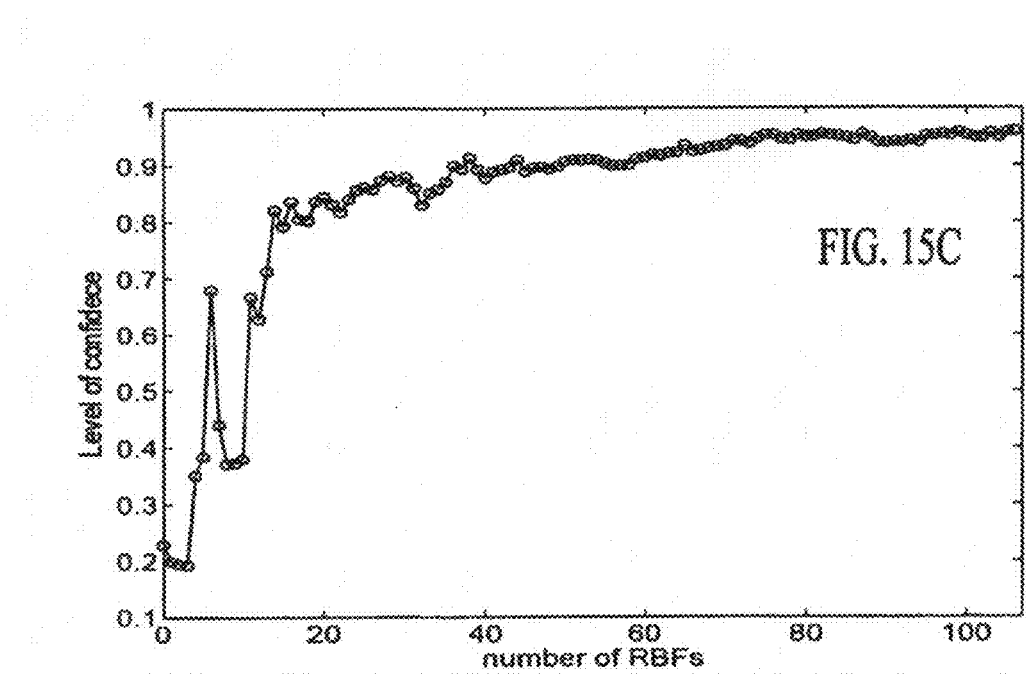
FIG. 15C shows a plot of the confidence level of the approximation model being generated as new basis functions are added for modeling the Mackey-Glass Time Series.
Figure 16:
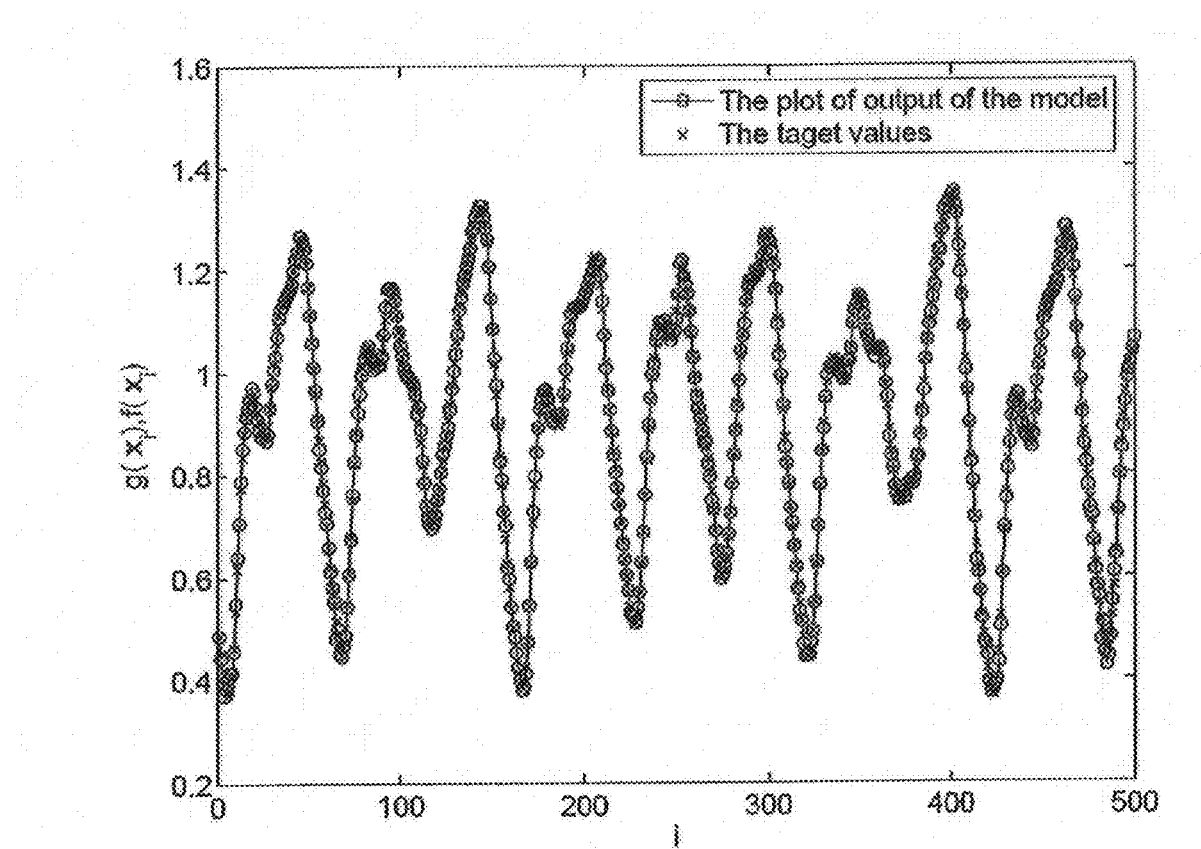
FIG. 16 shows the output of a 76 mode approximation model for the test set of the Mackey-Glass Time Series compared to the actual or target values of this test set. For this present approximation model, an RMSE value of 0.0116 was obtained, and the 95% level of confidence for the stopping criteria (of FIGS. 1A-1C) was satisfied.

FIG. 14A shows the initial ACF(h) values (computed on the training data; i.e., step 140 of FIGS. 1A-1C) plotted against h, while FIG. 14B shows the final ACF of the residuals (used in steps 144 through 188 of FIGS. 1A-1C) that indicates that the model fitting process should be terminated given 95% confidence has been achieved. FIG. 14C and FIG. 14D show the associated ACC functions, i.e., the point-wise values $\beta_i$, corresponding to the maximum value of the ACF in FIG. 14A and FIG. 14B, respectively. From FIGS. 15A through 15C we see it is sufficient to use only 76 centers to get the 95% confidence fit for the Mackey-Glass data set with a resulting RMSE of 0.0116 (See FIG. 16, wherein the output of the 76 mode model for the testing data set appears to fit the actual or target values very well. This example is interesting in that a large number of modes are required to attain the stopping criterion).

The algorithm of, e.g., FIGS. 1A-1C, based on space-time balls, provides a result similar to MRAN [47] (RMSE of 0.035) using 1500 data points with 21 centers. However, at this level of RMSE, both our algorithm (21 modes) and MRAN (24 modes and 4000 data points), produce sporadic but significant overshoots and undershoots of the function in regions of high gradient. These large pointwise errors are hidden to some degree by a relatively small RMSE. The IID test is, of course, point-wise and reveals local un-modeled structure in the data and prevents the algorithm from terminating prematurely.

Yet, one might argue that stopping at 95% confidence and 76 modes is still premature stopping since a slightly improved final RMSE value of 0.0090 on the test data is achieved with 109 modes (but then does not improve with more). However, this example is for the special case of noise-free data. In such instances it is recommended that the IID test be coupled with the RMSE test to draw optimal conclusions, unless, of course, one chooses to add noise artificially to the data. Given how close the RMSE errors are at 76 and 109 modes one must seriously consider that even in this case the 95% confidence level is arguably superior.

Time Series Prediction Using Exchange Rate Data Set.

Figure 17:
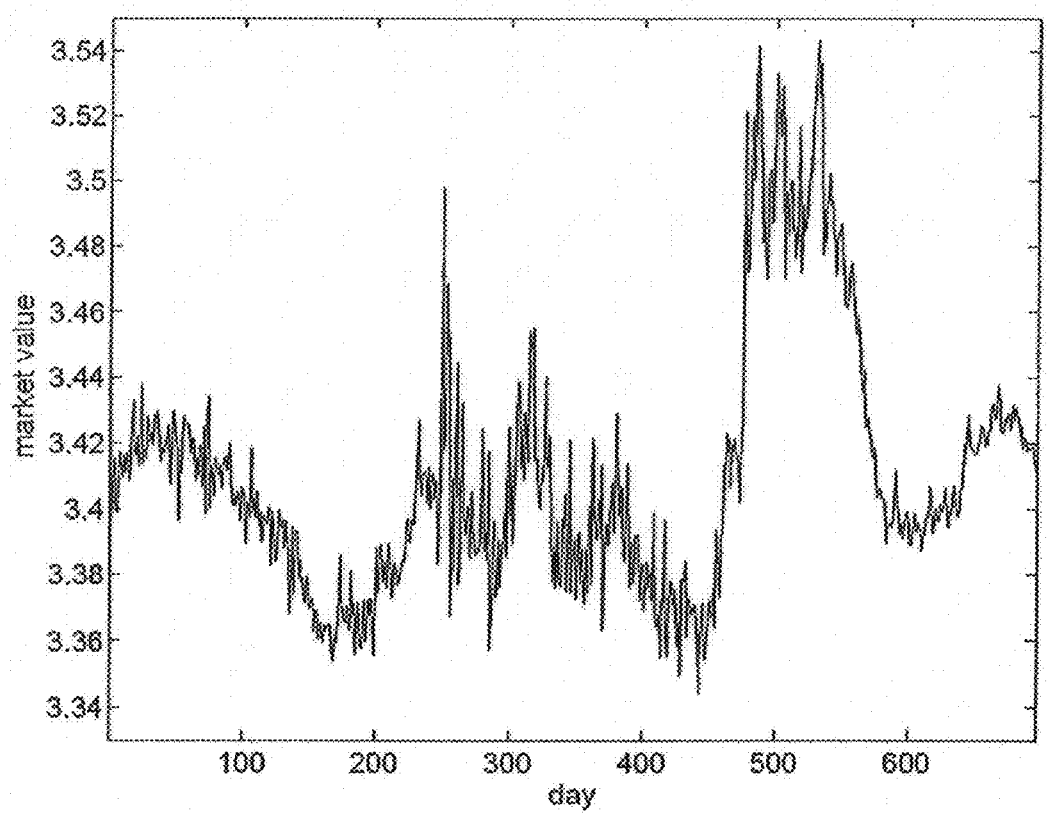
FIG. 17 shows a graph of a data set consisting of daily values of the Deutsche Mark/French Franc exchange rate over 701 days.

The data set for the present example consists of daily values of the Deutsche Mark/French Franc exchange rate over 701 days; FIG. 17 shows a graph of this data set. As mentioned in [30], this data set has irregular non-stationary components due to government intervention in the Europe exchange rate mechanism. Following [30], since there can be "day of week" effects in such data, a window of 5 previous values can be used as input, giving a data set of 696 patterns. Hence, this data set forms an interesting example of a mapping from $R^5$ to R.

Figure 18:
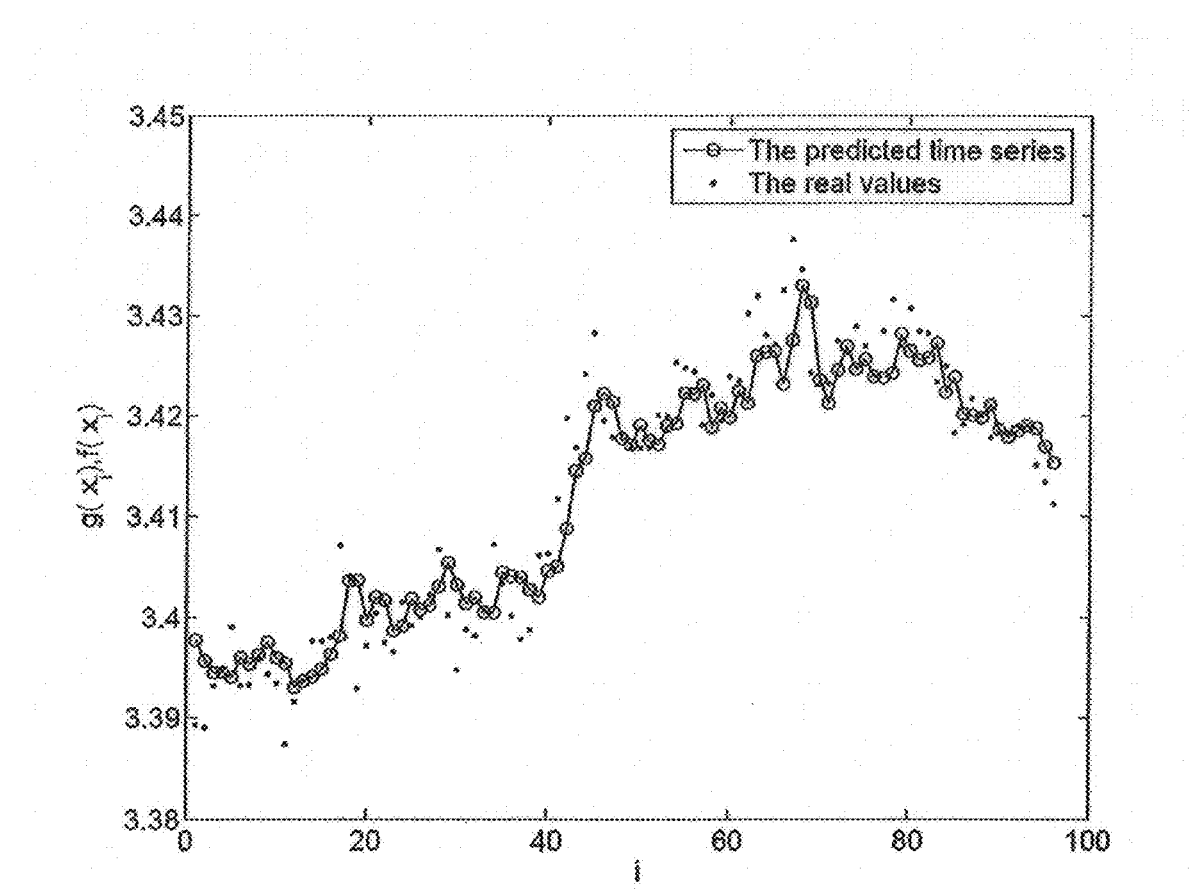
FIG. 18 shows the output of the resulting model (1-step prediction values) and the target (market) values for the test data from the daily values of the Deutsche Mark/French Franc exchange rate data.
Figure 19C:
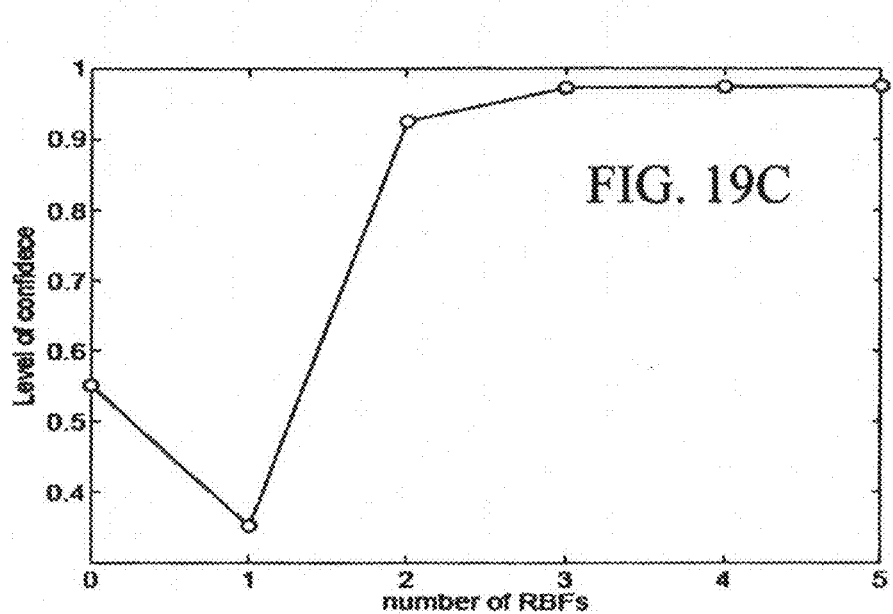
FIG. 19C shows a plot of the confidence level of the approximation model being generated as new basis functions are added for modeling the daily values of the Deutsche Mark/French Franc exchange rate data.

The training data for the approximation model generated was taken to be the first 600 data points. The test data set was taken to be the last 96 data points. FIG. 18 shows the output of the resulting model (1-step prediction values) and the target (market) values for the test data. The modeling process terminated with a model of order three when the 95% confidence threshold was attained (actually 97.17%). The ACC and RMSE criteria are also in agreement with the model order of three; see FIGS. 19A through 19C. The 3 mode model produces the RMSE value of 0.0043, $NPE_1$=0.2760 and $NPE_2$=0.1033. The model has centers at (3.4933, 3.9292, 3.2870, 3.8574, 4.0983), (3.2793, 3.3475, 3.3337, 3.18433.2718) and (3.3666, 3.4187, 3.6620, 3.2056, 3.6457) with widths (0.4501, 2.7037, 2.2175, 2.5672, 2.9234), (0.1136, 0.1336, 8.5380, 0.6561, 0.5541) and (0.0555, 0.0358, 0.1740, 0.1939, 0.4015), and weights 3.8595, 0.5751 and 1.3805 respectively.

FIGS. 20A through 20C highlight the patterns in the ACC functions associated to the maximum contributions of the ACFs in the process of adding the first 3 main RBFs. Note again, the need for the spatio-temporal window as evidenced in FIGS. 20B and 20C. FIG. 20B shows two distinct time regions contributing to the local data indicating either a periodic or quasi-periodic behavior. FIG. 20B illustrates the utility of the space time ball. The diamonds around points 150 to 200 occur is a single time window whereas the diamonds around points 420 to 480 (approximately) belong to another time window. However, all these points taken together form the local space-time ball. The resulting data set is more complete and affords better approximations. Moreover, a time-local windowing procedure such as used in prior art does not capture this global structure in the data.

The embodiments of the various methods disclosed hereinabove for generating approximations of data sets may be applied to various fields of endeavor. In addition to the fields of financial analysis and image reconstruction described above, applications of FIGS. 1A-1C, 8 and/or 9 may be applied to simulations of:

dynamic systems such as fluid dynamics of an airflow around a physical object, or a water flow over a boat hull, etc., wherein a training data set may be, e.g., sensor measurements at various points in time and space during a test in, e.g., a wind tunnel. Thus, the approximation model generated according to the present disclosure may be used to interpolate and/or extrapolate between and/or beyond the training data set;

reconstruction of complex signals such as radio signals in noisy environments, e.g., the training data set may be measurements of noisy radio signal carrying a particular information content;

target recognition (e.g., missile, aircraft, water and/or ground vehicle recognition), e.g., the training data set may measurements of heat signatures of targets, optical spectral measurements of paint on a target, optical silhouette of a target;

an automatic guidance or targeting system of a mobile device, such as an unmanned aircraft, rocket, or other vehicle, wherein the training and testing data sets may be, e.g., indicative of previous operations (successful and/or otherwise) of the mobile device;

an automatic guidance or targeting system of a stationary device, such as stationary missile launcher, wherein the training and testing data sets may be, e.g., indicative of previous operations (successful and/or otherwise) of the stationary device;

a real time physical process being modeled adaptively in (near) real time; such a process may be, e.g., data from a heat exchanger related to heat transfer efficiency, or real time stock market price fluctuations, wherein the training and testing data sets may be, e.g., indicative of previous operations (successful and/or otherwise) of the physical process;

technical financial modeling and/or prediction, such modeling may be similar to the analysis of the daily values of the Deutsche Mark/French Franc exchange rate described hereinabove. However, other types of financial analysis are within the scope of the present disclosure such as stock market analysis (particularly stocks for a particular market sector), bond market analysis, etc.;

failure prediction of, e.g., a complex system such as a chemical plant, a munitions plant, a space station, etc., wherein the training data set is measurements from a plurality of sensors for monitoring conditions that relate to the safety and/or efficacy of one or more processes being performed;

market research, wherein the training data set includes interview responses from a population sample, and wherein the resulting approximation model may be used to, e.g., provide suggestions to a particular product or service customer as to the options the customer might find desirable.

Figure 21:
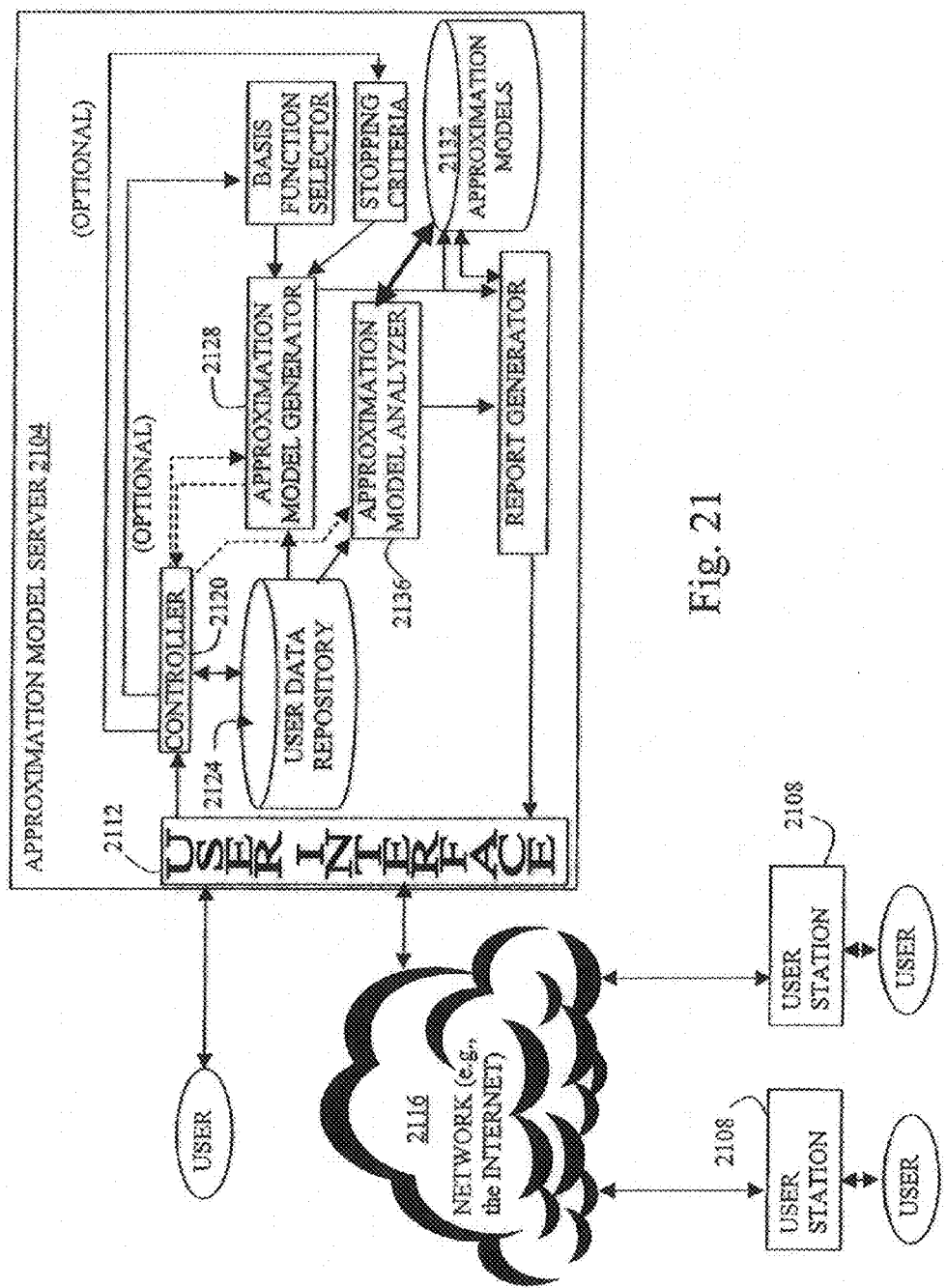
FIG. 21 shows an operative embodiment of a system for generating approximation models according to FIGS. 1A-1C through 20C hereinabove, and the description herein.

Note that since there are no ad hoc parameters that require setting in order to generate an appropriate model, an embodiment of one or more of the approximation techniques of FIGS. 1A-1C, 8 and/or 9 may be provided on a network such as the Internet, wherein a user need only provide a data type (or data structure) characterization of the training and testing data sets. Accordingly, once such a data characterization is provided, then the training and testing data sets may be provided for analysis by a user having substantially no background in modeling, simulation, approximation theory and/or artificial intelligence. FIG. 21 shows an illustrative embodiment of a system for providing modeling services according to one or more of the processes of FIGS. 1A-1C, 8, and/or 9. Accordingly, an approximation server 2104 may be accessed by users at various user stations 2108, or directly as shown. In particular, a user may:

(i) request modeling services from the server 2104 via the user interface 2112, wherein this user interface may include a capability of connecting to the network 2116, or alternatively, the user interface may allow a user to interact directly with the server 2104;

(ii) supply data structure information for data to be modeled, e.g., training data or testing data, e.g., such formatting may indicate a maximum number of digits in each input value, the maximum number digits in model data output to the user, the dimension of the input data, the dimension of output model data, etc.;

(iii) input training data;

(iv) input testing data;

(v) input control information such as the maximal number of basis functions to use, optionally, the type of basis functions to use, and/or optionally, a stopping condition for indicating when a model being generated is sufficiently accurate;

(vi) receive reports related to, e.g., the accuracy of a model generated on the training data, such as RMSE.

Accordingly, at a high level a user first request to initiate a modeling session with the server 2104, wherein the user interface 2112 contacts the controller 2120 for initiating the session. Since the user data repository 2124 contains identification of each user as well as modeling data (both training and testing data) for each model (to be) generated, the controller 2120 accesses the user data repository 2124 for identifying the user, for initiating a new modeling session (e.g., with new data), for continuing a previous modeling session. Accordingly, the controller 2120 may input training and/or testing data into the user data repository, wherein such data is identified both by, e.g., a user identifier and an identifier indicative of the model (to be) generated. After at least the training data for a particular model is stored in the user data repository 2124, the user whose identification is associated with the training data may request that the controller 2120 activate the approximation model generator 2128 for generating a model, e.g., based on the pseudo code of FIGS. 1A-1C, 8 or 9. Note that as an option, a user may provide control information such as the type of basis functions to use (e.g., regular Gaussian RBFs, or Gaussian-Gaussian RBFs, RBFs based on the mollifier function or the quarter circle), and/or a stopping criterion (e.g., a confidence level of 95% or 98%, or a RMSE of some particular value). However, it is within the scope of the present disclosure that such options can be automatically activated in various combinations by the controller 2120 upon receiving feedback from the approximation model generator 2128. Additionally, note that the generator 2128 may perform utilize parallel computing techniques for generating a model. For example, each of a plurality of processors (CPUs) may be activated for determining one of the basis functions of the model on a particular $X_{local}$ as described hereinabove. Note that in one embodiment, different processors may perform the methods described herein (e.g., those of FIGS. 1A-1C, 8, and/or 9), wherein the optimization tasks are performed according to different cost functions, e.g., different norms such as an $L_2$ norm, $L_1$ norm, or $L_\infty$ norm.

Accordingly, once the generator 2128 has completed an instance of training, the generator 2128 outputs the data defining the generated model to the approximation models database 2132 together with various other types of information such as the final ACF, the final RMSE, a confidence level (e.g., as described hereinabove) the number of basis functions used in generating the model, etc. Moreover, the user may be notified of such results.

As indicated above, the user may also input testing data. Such testing data is also associated with the particular user and model to which such testing data corresponds. Accordingly, the controller 2120 may activate an approximation model analyzer 2136 performing various statistical tests regarding how well the model conforms to and/or predicts the testing data.

Output from the model generator 2128 and/or the approximation model analyzer 2136 may include various statistics and/or graphs related to how well the generated model conforms to the training data. In particular, one or more of the various graphs and/or statistics illustrated in FIGS. 4A-4D, 5A-5D, 6A-6C, 7, 10A-10B, 11A, 11B, 12A-12C, 13A, 13B, 14A-14D, 15A-15C, 16, 17, 18, 19, and/or 20. Note that the data for such output may be stored in the approximation models database 2132, and associated with the data for defining the corresponding generated model (e.g., the list of RBFs instantiated in the generated model). Moreover, note that the user data repository 2124 and the approximation models database 2132 can be combined into a single data repository as one skilled in the art will understand.

The foregoing discussion of the invention has been presented for purposes of illustration and description. Further, the description is not intended to limit the invention to the form disclosed herein. Consequently, variation and modification commiserate with the above teachings, within the skill and knowledge of the relevant art, are within the scope of the present invention. The embodiment described hereinabove is further intended to explain the best mode presently known of practicing the invention and to enable others skilled in the art to utilize the invention as such, or in other embodiments, and with the various modifications required by their particular application or uses of the invention.

What is claimed is:

1. A method for facilitating voice recognition using a modeling relationship between first and second data collections, wherein for each member of the first data collection, there is a corresponding member of the second collection, comprising:

determining residuals between the first and second collections;

determining, using the residuals, a position of one of the members of the first data collection;

determining proximity data relative to a value (V) for the one member of the first data collection at the position;

determining a subcollection of the first collection, wherein each member of the subcollection has a value that is in proximity to the value V according to the proximity data;

generating a basis function by a computer from the subcollection for obtaining a model of the relationship; and outputting model information for presentation to a user or a predetermined process for affecting or identifying a physical event, wherein the model information includes at least one of: (a) data indicative of a correspondence between the model and the relationship, (b) data indicative of a variance between the model and the relationship, (c) an extrapolation of the relationship, (d) an interpolation of the relationship, (e) multi-dimensional model output, and (f) notification of the physical event and wherein an approximation function is modulated, or skewed, by a shape function; and facilitating voice recognition by using the modeling relationship between the first and second data collections.

2. The method of claim 1, wherein the approximation function is selected form the group consisting of basis functions, multi-layer perceptrons, and feed-forward neural networks.

3. The method of claim 1, wherein the steps of claim 1 are iteratively performed for generating a model of the relationship, and with at least most iterations, a step of determining structure or information content in the residuals.

4. The method of claim 3, wherein for each of at least most of the iterations, the corresponding instance of the subcollection is determined accordingly to an instance of the position determined as a function of a plurality of autocorrelation components.

5. The method of claim 3, wherein the second collection has a dimensionality greater than one, and the step of determining the position includes, for each of at least most of the iterations, performing a test on the residuals for determining whether or not the steps of claim 1 are to be performed again.

6. The method of claim 5, wherein the test includes using the residuals to determine an error that is a function of more than one of the dimensions of the second collection.

7. The method of claim 1, wherein the step of determining the position includes performing an autocorrelation for independent identically and distributed in the residuals.

8. The method of claim 1, wherein the approximation function is a basis function, wherein the step of generating includes determining at least one parameter value for the basis function by iteratively adjusting the parameter value for reducing a result of a function dependent upon a difference between an instance of the basis function, and members of the second data collection that correspond to the members of the subcollection.

9. The method of claim 1, wherein the approximation function is a basis function, wherein the basis function is generated using a mollifier, circle or bump function.

10. The method of claim 1 further including a step of testing the model on additional data indicative of the relationship, wherein the additional data includes at least one of a first member related to a second member according to the relationship, and wherein at least one of: the first member is not a member of the first data collection, and the second member is not a member of the second data collection.

11. The method of claim 1, wherein the physical event includes one of: an airflow around a physical object, a water flow over an object, a radio signal, and recognition of an object, maneuvering of an object.

12. The method of claim 1, wherein a confidence level for a plurality of functions of the residuals is determined at least one of simultaneously and sequentially.

13. The method of claim 1, wherein the data collections are high-dimensional data collections.

14. The method of claim 1, wherein the data collections are spatial and without time parameterization.

15. The method of claim 1, wherein the approximation function is selected from the group consisting of radial basis functions and modulated asymmetric radial basis functions.

16. The method of claim 1, wherein at least one of the first data collection and second data collection is substantially noise free.

17. The method of claim 1, wherein the approximation function is a non-symmetrical radial basis function with at least one of compact support and non-compact support.

18. A method for failure prediction using a modeling relationship between first and second data collections, wherein for each member of the first data collection, there is a corresponding member of the second collection, comprising:
  determining residuals between the first and second collections;
  determining, using the residuals, a position of one of the members of the first data collection;
  determining proximity data relative to a value (V) for the one member of the first data collection at the position;
  determining a subcollection of the first collection, wherein each member of the subcollection has a value that is in proximity to the value V according to the proximity data;
  generating a basis function by a computer from the subcollection for obtaining a model of the relationship; and
  outputting model information for presentation to a user or a predetermined process for affecting or identifying a physical event, wherein the model information includes at least one of: (a) data indicative of a correspondence between the model and the relationship, (b) data indicative of a variance between the model and the relationship, (c) an extrapolation of the relationship, (d) an interpolation of the relationship, (e) multi-dimensional model output, and (f) notification of the physical event and wherein an approximation function is modulated, or skewed, by a shape function; and facilitating failure prediction by using the modeling relationship between the first and second data collections.

19. A method for image processing using a modeling relationship between first and second data collections, wherein for each member of the first data collection, there is a corresponding member of the second collection, comprising:
  determining residuals between the first and second collections;
  determining, using the residuals, a position of one of the members of the first data collection;
  determining proximity data relative to a value (V) for the one member of the first data collection at the position;
  determining a subcollection of the first collection, wherein each member of the subcollection has a value that is in proximity to the value V according to the proximity data;
  generating a basis function by a computer from the subcollection for obtaining a model of the relationship; and
  outputting model information for presentation to a user or a predetermined process for affecting or identifying a physical event, wherein the model information includes at least one of: (a) data indicative of a correspondence between the model and the relationship, (b) data indicative of a variance between the model and the relationship, (c) an extrapolation of the relationship, (d) an interpolation of the relationship, (e) multi-dimensional model output, and (f) notification of the physical event and wherein an approximation function is modulated, or skewed, by a shape function; and facilitating image processing by using the modeling relationship between the first and second data collections.

20. A method for financial time series analysis using a modeling relationship between first and second data collections, wherein for each member of the first data collection, there is a corresponding member of the second collection, comprising:

determining residuals between the first and second collections;
determining, using the residuals, a position of one of the members of the first data collection;
determining proximity data relative to a value (V) for the one member of the first data collection at the position;
determining a subcollection of the first collection, wherein each member of the subcollection has a value that is in proximity to the value V according to the proximity data;
generating a basis function by a computer from the subcollection for obtaining a model of the relationship; and
outputting model information for presentation to a user or a predetermined process for affecting or identifying a physical event, wherein the model information includes at least one of: (a) data indicative of a correspondence between the model and the relationship, (b) data indicative of a variance between the model and the relationship, (c) an extrapolation of the relationship, (d) an interpolation of the relationship, (e) multi-dimensional model output, and (f) notification of the physical event and wherein an approximation function is modulated, or skewed, by a shape function; and facilitating financial time series analysis by using the modeling relationship between the first and second data collections.

* * * * *